US010977927B2

(12) United States Patent
Katz et al.

(10) Patent No.: US 10,977,927 B2
(45) Date of Patent: Apr. 13, 2021

(54) EMERGENCY COMMUNICATION FLOW MANAGEMENT AND NOTIFICATION SYSTEM

(71) Applicant: RapidSOS, Inc., New York, NY (US)

(72) Inventors: Henry Katz, Brookline, MA (US); Zvika Ferentz, Rye Brook, NY (US); Jeffrey Sternberg, New York, NY (US); Nicholas Edward Horelik, Long Island City, NY (US); William Thomas Guthrie, Fairplay, CO (US)

(73) Assignee: RAPIDSOS, INC., New York, NY (US)

(*) Notice: Subject to any disclaimer, the term of this patent is extended or adjusted under 35 U.S.C. 154(b) by 0 days.

(21) Appl. No.: 16/663,295

(22) Filed: Oct. 24, 2019

(65) Prior Publication Data

US 2020/0135005 A1    Apr. 30, 2020

Related U.S. Application Data

(60) Provisional application No. 62/750,175, filed on Oct. 24, 2018.

(51) Int. Cl.
| | | |
|---|---|---|
| *G08B 25/00* | (2006.01) | |
| *G08B 25/08* | (2006.01) | |
| *G08B 25/01* | (2006.01) | |
| *G06F 3/0486* | (2013.01) | |
| *G06F 9/54* | (2006.01) | |
| *G06F 3/0482* | (2013.01) | |
| *G08B 27/00* | (2006.01) | |

(52) U.S. Cl.
CPC ......... *G08B 25/001* (2013.01); *G06F 3/0482* (2013.01); *G06F 3/0486* (2013.01); *G06F 9/542* (2013.01); *G08B 25/016* (2013.01); *G08B 25/08* (2013.01); *G08B 27/001* (2013.01)

(58) Field of Classification Search
CPC .... G08B 25/001; G08B 25/016; G08B 25/08; G08B 27/001; G06F 3/0482; G06F 3/486; G06F 9/0486
USPC .................................................. 340/540, 541
See application file for complete search history.

(56) References Cited

U.S. PATENT DOCUMENTS

| | | |
|---|---|---|
| 5,379,337 A | 1/1995 | Castillo et al. |
| 5,479,482 A | 12/1995 | Grimes |

(Continued)

FOREIGN PATENT DOCUMENTS

| | | |
|---|---|---|
| CA | 2662606 A1 | 10/2009 |
| CA | 2697986 A1 | 9/2010 |

(Continued)

OTHER PUBLICATIONS

Abel et al. Semantics + Filtering + Search= Twitcident exploring information in social web streams. HT'12—Proceedings of 23rd ACM Conference on Hypertext and Social Media (10 pgs) (2012).

(Continued)

*Primary Examiner* — Ojiako K Nwugo
(74) *Attorney, Agent, or Firm* — Wilson Sonsini Goodrich & Rosati

(57) ABSTRACT

Described herein are systems, devices, methods, and media for connecting a user for providing emergency assistance based on emergency alerts from triggering devices such as voice or sound triggered emergency alerts. In some cases, the location of the emergency is provided.

20 Claims, 25 Drawing Sheets

(56) References Cited

U.S. PATENT DOCUMENTS

| | | |
|---|---|---|
| 5,563,931 A | 10/1996 | Bishop et al. |
| 5,596,625 A | 1/1997 | Leblanc |
| 5,710,803 A | 1/1998 | Kowal et al. |
| 5,742,666 A | 4/1998 | Alpert |
| 6,014,555 A | 1/2000 | Tendler |
| 6,133,853 A | 10/2000 | Obradovich et al. |
| 6,167,255 A | 12/2000 | Kennedy et al. |
| 6,249,674 B1 | 6/2001 | Verdonk |
| 6,252,943 B1 | 6/2001 | Johnson et al. |
| 6,256,489 B1 | 7/2001 | Lichter et al. |
| 6,262,655 B1 | 7/2001 | Yoshioka et al. |
| 6,363,138 B1 | 3/2002 | Aprile |
| 6,459,782 B1 | 10/2002 | Bedrosian et al. |
| 6,477,362 B1 | 11/2002 | Raith et al. |
| 6,502,030 B2 | 12/2002 | Hilleary |
| 6,510,315 B1 | 1/2003 | Arnson |
| 6,556,816 B1 | 4/2003 | Gafrick et al. |
| 6,571,092 B2 | 5/2003 | Faccin et al. |
| 6,574,323 B1 | 6/2003 | Manuel et al. |
| 6,587,545 B1 | 7/2003 | Antonucci et al. |
| 6,594,666 B1 | 7/2003 | Biswas et al. |
| 6,600,812 B1 | 7/2003 | Gentillin et al. |
| 6,628,933 B1 | 9/2003 | Humes |
| 6,680,998 B1 | 1/2004 | Bell et al. |
| 6,707,421 B1 | 3/2004 | Drury et al. |
| 6,731,610 B2 | 5/2004 | Sajikawa et al. |
| 6,993,118 B2 | 1/2006 | Antonucci et al. |
| 7,054,611 B2 | 5/2006 | Eisner et al. |
| 7,058,385 B2 | 6/2006 | Lauper |
| 7,177,400 B2 | 2/2007 | Eisner et al. |
| 7,224,773 B2 | 5/2007 | Croak et al. |
| 7,271,704 B2 | 9/2007 | McSheffrey et al. |
| 7,313,402 B1 | 12/2007 | Rahman |
| 7,324,801 B2 | 1/2008 | Droste et al. |
| 7,349,706 B2 | 3/2008 | Kim et al. |
| 7,409,044 B2 | 8/2008 | Leduc |
| 7,409,428 B1 | 8/2008 | Brabec et al. |
| 7,436,938 B2 | 10/2008 | Savaglio et al. |
| 7,437,143 B1 | 10/2008 | Williams |
| 7,469,138 B2 | 12/2008 | Dayar et al. |
| 7,483,519 B2 | 1/2009 | Binning |
| 7,519,351 B2 | 4/2009 | Malone, III |
| 7,519,372 B2 | 4/2009 | MacDonald et al. |
| 7,548,158 B2 | 6/2009 | Titus et al. |
| 7,565,131 B2 | 7/2009 | Rollender |
| 7,646,854 B2 | 1/2010 | Anderson |
| 7,676,215 B2 | 3/2010 | Chin et al. |
| 7,684,782 B2 | 3/2010 | Ashley, Jr. et al. |
| 7,848,733 B2 | 12/2010 | Bull et al. |
| 7,937,067 B2 | 5/2011 | Maier et al. |
| 7,949,326 B2 | 5/2011 | Gallagher et al. |
| 8,009,810 B2 | 8/2011 | Seidberg et al. |
| 8,041,335 B2 | 10/2011 | Khetawat et al. |
| 8,041,341 B1 | 10/2011 | Malackowski et al. |
| 8,045,954 B2 | 10/2011 | Barbeau et al. |
| 8,068,881 B2 | 11/2011 | Schrager |
| 8,102,972 B2 | 1/2012 | Poremba |
| 8,126,424 B2 | 2/2012 | Piett et al. |
| 8,150,367 B1 | 4/2012 | Malladi et al. |
| 8,165,560 B2 | 4/2012 | Stenquist |
| 8,165,562 B2 | 4/2012 | Piett et al. |
| 8,185,087 B2 | 5/2012 | Mitchell, Jr. et al. |
| 8,195,121 B2 | 6/2012 | Dunn et al. |
| 8,219,135 B2 | 7/2012 | De Amorim et al. |
| 8,244,205 B2 | 8/2012 | Wu |
| 8,249,546 B1 | 8/2012 | Shah et al. |
| 8,249,547 B1 | 8/2012 | Fellner |
| 8,289,953 B2 | 10/2012 | Ray et al. |
| 8,306,501 B2 | 11/2012 | Moodbidri et al. |
| 8,326,260 B1 | 12/2012 | Bradish et al. |
| 8,369,488 B2 | 2/2013 | Sennett et al. |
| 8,396,970 B2 | 3/2013 | Black et al. |
| 8,401,565 B2 | 3/2013 | Sandberg et al. |
| 8,417,090 B2 | 4/2013 | Fleming |
| 8,417,212 B2 | 4/2013 | Cepuran et al. |
| 8,442,481 B2 | 5/2013 | Maier et al. |
| 8,442,482 B2 | 5/2013 | Maier et al. |
| 8,472,973 B2 | 6/2013 | Lin et al. |
| 8,484,352 B2 | 7/2013 | Piett et al. |
| 8,489,062 B2 | 7/2013 | Ray et al. |
| 8,494,868 B2 | 7/2013 | Saalsaa |
| 8,509,729 B2 | 8/2013 | Shaw |
| 8,516,122 B2 | 8/2013 | Piett et al. |
| 8,538,370 B2 | 9/2013 | Ray et al. |
| 8,538,468 B2 | 9/2013 | Daly |
| 8,588,733 B2 | 11/2013 | Ferguson et al. |
| 8,594,015 B2 | 11/2013 | Dunn et al. |
| 8,606,218 B2 | 12/2013 | Ray et al. |
| 8,625,578 B2 | 1/2014 | Roy et al. |
| 8,626,112 B2 | 1/2014 | Ray et al. |
| 8,630,609 B2 | 1/2014 | Ray et al. |
| 8,644,301 B2 | 2/2014 | Tamhankar et al. |
| 8,649,806 B2 | 2/2014 | Cuff et al. |
| 8,682,279 B2 | 3/2014 | Rudolf et al. |
| 8,682,281 B2 | 3/2014 | Dunn et al. |
| 8,682,286 B2 | 3/2014 | Dickinson et al. |
| 8,712,366 B2 | 4/2014 | Greene et al. |
| 8,747,336 B2 | 6/2014 | Tran |
| 8,751,265 B2 | 6/2014 | Piett et al. |
| 8,755,767 B2 | 6/2014 | Maier et al. |
| 8,760,290 B2 | 6/2014 | Piett et al. |
| 8,761,721 B2 | 6/2014 | Li |
| 8,792,867 B1 | 7/2014 | Negahban et al. |
| 8,811,935 B2 | 8/2014 | Faccin et al. |
| 8,825,687 B2 | 9/2014 | Marceau et al. |
| 8,848,877 B2 | 9/2014 | Seidberg et al. |
| 8,866,606 B1 | 10/2014 | Will et al. |
| 8,868,028 B1 | 10/2014 | Kaltsukis |
| 8,880,021 B2 | 11/2014 | Hawkins |
| 8,890,685 B1 | 11/2014 | Sookman et al. |
| 8,918,075 B2 | 12/2014 | Maier et al. |
| 8,948,732 B1 | 2/2015 | Negahban et al. |
| 8,971,839 B2 | 3/2015 | Hong |
| 8,983,424 B2 | 3/2015 | Binning |
| 8,984,143 B2 | 3/2015 | Serra et al. |
| 9,008,078 B2 | 4/2015 | Kamdar et al. |
| 9,014,657 B2 | 4/2015 | Rohde et al. |
| 9,019,870 B2 | 4/2015 | Khan et al. |
| 9,020,462 B2 | 4/2015 | Hodgson et al. |
| 9,071,643 B2 | 6/2015 | Saito et al. |
| 9,077,676 B2 | 7/2015 | Price et al. |
| 9,078,092 B2 | 7/2015 | Piett et al. |
| 9,094,816 B2 | 7/2015 | Maier et al. |
| 9,129,219 B1 | 9/2015 | Robertson et al. |
| 9,167,379 B1 | 10/2015 | Hamilton et al. |
| 9,244,922 B2 | 1/2016 | Marceau et al. |
| 9,258,680 B2 | 2/2016 | Drucker |
| 9,277,389 B2 | 3/2016 | Saito et al. |
| 9,351,142 B2 | 5/2016 | Basore et al. |
| 9,369,847 B2 | 6/2016 | Borghei |
| 9,384,491 B1 | 7/2016 | Briggs et al. |
| 9,402,159 B1 | 7/2016 | Self et al. |
| 9,408,051 B2 | 8/2016 | Finney et al. |
| 9,420,099 B1 | 8/2016 | Krishnan et al. |
| 9,426,638 B1 | 8/2016 | Johnson |
| 9,497,585 B1 | 11/2016 | Cooley et al. |
| 9,503,876 B2 | 11/2016 | Saito et al. |
| 9,544,260 B2 | 1/2017 | Cuff et al. |
| 9,544,750 B1 | 1/2017 | Self et al. |
| 9,591,467 B2 | 3/2017 | Piett et al. |
| 9,609,128 B2 | 3/2017 | Dahan et al. |
| 9,629,185 B1 | 4/2017 | Gluckman et al. |
| 9,635,534 B2 | 4/2017 | Maier et al. |
| 9,659,484 B1 | 5/2017 | Mehta et al. |
| 9,693,213 B2 | 6/2017 | Self et al. |
| 9,734,721 B2 | 8/2017 | Stenneth et al. |
| 9,736,670 B2 | 8/2017 | Mehta et al. |
| 9,756,169 B2 | 9/2017 | Mehta et al. |
| 9,805,430 B2 | 10/2017 | Miasnik et al. |
| 9,838,858 B2 | 12/2017 | Anand et al. |
| 9,877,177 B2 | 1/2018 | Lesage et al. |
| 9,924,043 B2 | 3/2018 | Mehta et al. |
| 9,942,739 B2 | 4/2018 | Bozik et al. |
| 9,986,404 B2 | 5/2018 | Mehta et al. |

(56) References Cited

U.S. PATENT DOCUMENTS

| | | |
|---|---|---|
| 9,992,655 B2 | 6/2018 | Anand et al. |
| 9,998,507 B2 | 6/2018 | Mehta et al. |
| 10,002,375 B1 | 6/2018 | Scythes et al. |
| 10,089,854 B2 | 10/2018 | Hender et al. |
| 10,136,294 B2 | 11/2018 | Mehta et al. |
| 10,140,482 B2 | 11/2018 | Mehta et al. |
| 10,140,842 B2 | 11/2018 | Mehta et al. |
| 10,142,213 B1 | 11/2018 | Hart et al. |
| 10,142,469 B2 | 11/2018 | Klaban |
| 10,142,816 A1 | 11/2018 | Cavendish et al. |
| 10,165,431 B2 | 12/2018 | Bozik et al. |
| 10,375,558 B2 | 8/2019 | Katz et al. |
| 10,419,915 B2 | 9/2019 | Mehta et al. |
| 10,447,865 B2 | 10/2019 | Mehta et al. |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang et al. |
| 2002/0120698 A1 | 8/2002 | Tamargo |
| 2003/0069035 A1 | 4/2003 | Shurvinton |
| 2003/0109245 A1 | 6/2003 | McCalmont et al. |
| 2004/0203572 A1 | 10/2004 | Aerrabotu |
| 2004/0229620 A1 | 11/2004 | Zhao et al. |
| 2004/0266390 A1 | 12/2004 | Faucher et al. |
| 2005/0085215 A1 | 4/2005 | Kokko et al. |
| 2005/0104745 A1 | 5/2005 | Bachelder et al. |
| 2005/0111630 A1 | 5/2005 | Potorny et al. |
| 2005/0151642 A1 | 7/2005 | Tupler et al. |
| 2005/0190892 A1 | 9/2005 | Dawson et al. |
| 2005/0220277 A1 | 10/2005 | Blalock et al. |
| 2005/0222829 A1 | 10/2005 | Dumas |
| 2005/0239477 A1 | 10/2005 | Kim et al. |
| 2005/0242944 A1* | 11/2005 | Bankert ............... G08B 25/00 340/531 |
| 2005/0282518 A1 | 12/2005 | D'Evelyn et al. |
| 2006/0085275 A1 | 4/2006 | Stokes et al. |
| 2006/0109960 A1 | 5/2006 | D'Evelyn et al. |
| 2006/0217105 A1 | 9/2006 | Kumar et al. |
| 2006/0293024 A1 | 12/2006 | Benco et al. |
| 2007/0003024 A1 | 1/2007 | Olivier et al. |
| 2007/0030144 A1 | 2/2007 | Titus et al. |
| 2007/0030146 A1 | 2/2007 | Shepherd |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1 | 7/2007 | Monroe |
| 2007/0171854 A1 | 7/2007 | Chen et al. |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0077474 A1 | 3/2008 | Dumas et al. |
| 2008/0081646 A1 | 4/2008 | Morin et al. |
| 2008/0194238 A1 | 8/2008 | Kwon |
| 2008/0253535 A1 | 10/2008 | Sherry et al. |
| 2008/0294058 A1 | 11/2008 | Shklarski |
| 2008/0309486 A1 | 12/2008 | McKenna et al. |
| 2009/0041206 A1 | 2/2009 | Hobby et al. |
| 2009/0134982 A1 | 5/2009 | Robertson et al. |
| 2009/0186596 A1 | 7/2009 | Kaltsukis et al. |
| 2009/0214000 A1 | 8/2009 | Patel et al. |
| 2009/0257345 A1 | 10/2009 | King |
| 2009/0311987 A1 | 12/2009 | Edge et al. |
| 2009/0322513 A1 | 12/2009 | Hwang et al. |
| 2010/0002846 A1 | 1/2010 | Ray et al. |
| 2010/0003964 A1 | 1/2010 | Khare et al. |
| 2010/0093305 A1 | 4/2010 | Reich et al. |
| 2010/0156626 A1 | 6/2010 | Story |
| 2010/0159871 A1 | 6/2010 | Tester |
| 2010/0159976 A1 | 6/2010 | Marocchi et al. |
| 2010/0190468 A1 | 7/2010 | Scott et al. |
| 2010/0202368 A1 | 8/2010 | Hans |
| 2010/0238018 A1 | 9/2010 | Kelly |
| 2010/0262668 A1 | 10/2010 | Piett et al. |
| 2011/0009086 A1 | 1/2011 | Poremba et al. |
| 2011/0029600 A1 | 2/2011 | Theimer |
| 2011/0071880 A1 | 3/2011 | Spector |
| 2011/0086607 A1 | 4/2011 | Wang et al. |
| 2011/0134897 A1 | 6/2011 | Montemurro et al. |
| 2011/0151829 A1* | 6/2011 | Velusamy ............... H04W 4/02 455/404.2 |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2011/0263319 A1 | 10/2011 | Haemaelaeinen et al. |
| 2012/0002792 A1 | 1/2012 | Chang |
| 2012/0028599 A1 | 2/2012 | Hatton et al. |
| 2012/0029970 A1 | 2/2012 | Stiles et al. |
| 2012/0040636 A1 | 2/2012 | Kazmi |
| 2012/0092161 A1 | 4/2012 | West |
| 2012/0157795 A1 | 6/2012 | Chiu et al. |
| 2012/0202428 A1 | 8/2012 | Mirbaha et al. |
| 2012/0210325 A1 | 8/2012 | De Lind Van Wijngaarden et al. |
| 2012/0218102 A1 | 8/2012 | Bivens et al. |
| 2012/0256745 A1 | 10/2012 | Piett et al. |
| 2012/0257729 A1 | 10/2012 | Piett et al. |
| 2012/0258680 A1 | 10/2012 | Piett et al. |
| 2012/0289243 A1 | 11/2012 | Tarlow et al. |
| 2012/0295575 A1 | 11/2012 | Nam |
| 2012/0309341 A1 | 12/2012 | Ward |
| 2013/0005295 A1 | 1/2013 | Park et al. |
| 2013/0012155 A1 | 1/2013 | Forstall et al. |
| 2013/0030825 A1 | 1/2013 | Bagwandeen et al. |
| 2013/0065569 A1 | 3/2013 | Leipzig et al. |
| 2013/0082837 A1 | 4/2013 | Cosentino et al. |
| 2013/0084824 A1 | 4/2013 | Hursey |
| 2013/0102351 A1 | 4/2013 | Mo |
| 2013/0122932 A1 | 5/2013 | Patel et al. |
| 2013/0138791 A1 | 5/2013 | Thomas et al. |
| 2013/0183924 A1 | 7/2013 | Saigh et al. |
| 2013/0185368 A1 | 7/2013 | Nordstrom et al. |
| 2013/0203373 A1 | 8/2013 | Edge |
| 2013/0203376 A1 | 8/2013 | Maier et al. |
| 2013/0222133 A1 | 8/2013 | Schultz et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0309994 A1 | 11/2013 | Hellwig et al. |
| 2013/0331055 A1 | 12/2013 | McKown et al. |
| 2013/0331058 A1 | 12/2013 | Harvey |
| 2014/0031000 A1 | 1/2014 | Hanover |
| 2014/0045450 A1 | 2/2014 | Ballantyne et al. |
| 2014/0051379 A1 | 2/2014 | Ganesh et al. |
| 2014/0086108 A1 | 3/2014 | Dunn et al. |
| 2014/0087680 A1 | 3/2014 | Luukkala et al. |
| 2014/0096195 A1 | 4/2014 | Morgan |
| 2014/0113606 A1 | 4/2014 | Morken et al. |
| 2014/0126356 A1 | 5/2014 | Lee et al. |
| 2014/0134969 A1 | 5/2014 | Jin et al. |
| 2014/0142979 A1 | 5/2014 | Mitsunaga |
| 2014/0148117 A1 | 5/2014 | Basore et al. |
| 2014/0148120 A1 | 5/2014 | Buck |
| 2014/0155017 A1 | 6/2014 | Fan et al. |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0213212 A1 | 7/2014 | Clawson |
| 2014/0248848 A1 | 9/2014 | Mufti et al. |
| 2014/0253326 A1 | 9/2014 | Cho et al. |
| 2014/0257846 A1 | 9/2014 | Hermiz et al. |
| 2014/0302810 A1 | 10/2014 | Inha et al. |
| 2014/0324351 A1 | 10/2014 | Dannevik et al. |
| 2014/0359008 A1 | 12/2014 | Finney et al. |
| 2014/0368601 A1 | 12/2014 | Decharms |
| 2014/0370841 A1 | 12/2014 | Roberts et al. |
| 2015/0011176 A1 | 1/2015 | Zhu |
| 2015/0029836 A1 | 1/2015 | Hans et al. |
| 2015/0031324 A1 | 1/2015 | Zentner et al. |
| 2015/0055453 A1 | 2/2015 | Chaki et al. |
| 2015/0055554 A1 | 2/2015 | Sedlacek et al. |
| 2015/0081209 A1 | 3/2015 | Yeh et al. |
| 2015/0085997 A1 | 3/2015 | Biage et al. |

(56) References Cited

U.S. PATENT DOCUMENTS

| | | |
|---|---|---|
| 2015/0087259 A1 | 3/2015 | Hinsen |
| 2015/0094095 A1 | 4/2015 | Johnson et al. |
| 2015/0099481 A1 | 4/2015 | Maitre et al. |
| 2015/0109125 A1 | 4/2015 | Kaib et al. |
| 2015/0111524 A1 | 4/2015 | South et al. |
| 2015/0137972 A1 | 5/2015 | Nepo et al. |
| 2015/0172897 A1 | 6/2015 | Mariathasan et al. |
| 2015/0289121 A1 | 10/2015 | Lesage et al. |
| 2015/0304827 A1 | 10/2015 | Price et al. |
| 2015/0317809 A1 | 11/2015 | Chellappan et al. |
| 2015/0319284 A1 | 11/2015 | Leonessi |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0057595 A1 | 2/2016 | Ahmed et al. |
| 2016/0065748 A1 | 3/2016 | Li et al. |
| 2016/0088455 A1 | 3/2016 | Bozik et al. |
| 2016/0173689 A1 | 6/2016 | Klaban |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1 | 8/2016 | Marshall et al. |
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0330769 A1 | 11/2016 | Edge |
| 2016/0337831 A1 | 11/2016 | Piett et al. |
| 2016/0345171 A1 | 11/2016 | Kulkarni et al. |
| 2016/0353266 A1 | 12/2016 | Winkler et al. |
| 2016/0363931 A1 | 12/2016 | Yang et al. |
| 2016/0371973 A1 | 12/2016 | Holleczek et al. |
| 2017/0004427 A1 | 1/2017 | Bruchal et al. |
| 2017/0012815 A1 | 1/2017 | Nekrestyanov et al. |
| 2017/0046216 A1 | 2/2017 | Stenneth et al. |
| 2017/0078226 A1 | 3/2017 | Daly et al. |
| 2017/0099579 A1 | 4/2017 | Ryan et al. |
| 2017/0108862 A1 | 4/2017 | Mikkelsen |
| 2017/0124670 A1 | 5/2017 | Becker et al. |
| 2017/0124852 A1 | 5/2017 | Pauws et al. |
| 2017/0140637 A1 | 5/2017 | Thurlow et al. |
| 2017/0142568 A1 | 5/2017 | Saito et al. |
| 2017/0150335 A1 | 5/2017 | Self et al. |
| 2017/0161614 A1 | 6/2017 | Mehta et al. |
| 2017/0180963 A1 | 6/2017 | Cavendish et al. |
| 2017/0180966 A1 | 6/2017 | Piett et al. |
| 2017/0188218 A1 | 6/2017 | Corley et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2017/0287085 A1 | 10/2017 | Smith et al. |
| 2017/0310827 A1 | 10/2017 | Mehta et al. |
| 2017/0316698 A1 | 11/2017 | Stenneth et al. |
| 2017/0325056 A1 | 11/2017 | Mehta et al. |
| 2017/0359712 A1 | 12/2017 | Meredith et al. |
| 2017/0374538 A1 | 12/2017 | Gellens et al. |
| 2018/0020091 A1 | 1/2018 | Self et al. |
| 2018/0053401 A1 | 2/2018 | Martin et al. |
| 2018/0077282 A1 | 3/2018 | Herron et al. |
| 2018/0176271 A1 | 6/2018 | Laurent |
| 2018/0242133 A1 | 8/2018 | Anand et al. |
| 2018/0262544 A1 | 9/2018 | Mehta et al. |
| 2018/0352408 A1 | 12/2018 | Baer et al. |
| 2019/0020993 A1 | 1/2019 | Nguyen |
| 2019/0073894 A1 | 3/2019 | Mehta et al. |
| 2019/0104395 A1 | 4/2019 | Mehta et al. |
| 2019/0130719 A1 | 5/2019 | D'Amico |
| 2019/0166480 A1 | 5/2019 | Rauner |
| 2019/0174288 A1 | 6/2019 | Bozik et al. |
| 2019/0174289 A1 | 6/2019 | Martin et al. |
| 2019/0253861 A1 | 8/2019 | Horelik et al. |
| 2019/0281165 A1 | 9/2019 | Mehta et al. |
| 2019/0306664 A1 | 10/2019 | Mehta et al. |
| 2019/0320310 A1 | 10/2019 | Horelik et al. |
| 2019/0327597 A1 | 10/2019 | Katz et al. |
| 2019/0335310 A1 | 10/2019 | Anand et al. |
| 2020/0100084 A1 | 3/2020 | Martin et al. |
| 2021/0006961 A1 | 1/2021 | King-Berkman et al. |
| 2021/0014659 A1 | 1/2021 | Mehta et al. |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CA | 2697986 C | 5/2018 |
| CN | 104487976 A | 4/2015 |
| CN | 104539776 A | 4/2015 |
| CN | 106021508 A | 10/2016 |
| EP | 2161912 A2 | 3/2010 |
| JP | H10314133 A | 12/1998 |
| JP | H1170086 A | 3/1999 |
| JP | 2006319946 A | 11/2006 |
| JP | 2006334369 A | 12/2006 |
| JP | 2011223285 A | 11/2011 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| KR | 20170100422 A | 9/2017 |
| WO | WO-0022593 A1 | 4/2000 |
| WO | WO-0165763 A2 | 9/2001 |
| WO | WO-0167419 A2 | 9/2001 |
| WO | WO-2007109599 A2 | 12/2007 |
| WO | WO-2012129561 A1 | 9/2012 |
| WO | WO-2014025563 A1 | 2/2014 |
| WO | WO-2014063121 A1 | 4/2014 |
| WO | WO-2014074420 A1 | 5/2014 |
| WO | WO-2014176646 A1 | 11/2014 |
| WO | WO-2015196155 A1 | 12/2015 |
| WO | WO-2016044540 A1 | 3/2016 |
| WO | WO-2017001655 A1 | 1/2017 |
| WO | WO-2017079354 A1 | 5/2017 |
| WO | WO-2017083571 A1 | 5/2017 |
| WO | WO-2017100220 A1 | 6/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |
| WO | WO-2018039142 A1 | 3/2018 |
| WO | WO-2019113129 A1 | 6/2019 |
| WO | WO-2020172612 A1 | 8/2020 |
| WO | WO-2020205033 A1 | 10/2020 |

OTHER PUBLICATIONS

ArcGIS REST Services Directory. Folder: TIGERWeb. Available at https://tigerweb.geo.census.gov/arcgis/rest/services/TIGERweb. (1 pg.) (Accessed Sep. 2017).

Chowdhury et al. Tweet4act: Using incident-specific profiles for classifying crisis-related messages. Proceedings of the 10th International ISCRAM Conference (pp. 834-839) (2013).

Cipolla et al. A tool for Emergency Detection with Deep Learning Neural Networks. KDWeb (2016) How to predict a disaster. ICAR—National Research Council of Italy—Palermo, Italy (10 pgs).

Co-pending U.S. Appl. No. 16/436,810, filed Jun. 10, 2019.
Co-pending U.S. Appl. No. 16/526,195, filed Jul. 30, 2019.
Co-pending U.S. Appl. No. 16/537,377, filed Aug. 9, 2019.
Co-pending U.S. Appl. No. 16/539,946, filed Aug. 13, 2019.

(56) References Cited

OTHER PUBLICATIONS

Homeland Security Science and Technology. Using Social Media for Enhanced Situational Awareness and Decision Support. Virtual Social Medial Working Group and DHS First Responders Group. (44 pgs.) (Jun. 2014).
Marcus et al. TwitInfo: Aggregating and Visualizing Microblogs for Event Exploration. ACM CHI Conference 2011 (10 pgs).
Meier. MatchApp: Next Generation Disaster Response App? iRevolution (12 pgs.) (Feb. 27, 2013).
National Emergency Number Association (Nena) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-vl_Functional_Interface_Standards_NG911_i3.pdf [retrieved on Feb. 5, 2018] (121 pgs).
National Emergency Number Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (2012).
PCT/US2015/050609 International Preliminary Report on Patentability dated Mar. 30, 2017.
PCT/US2015/050609 International Search Report and Written Opinion dated Dec. 16, 2015.
PCT/US2016/060189 International Preliminary Report on Patentability dated May 17, 2018.
PCT/US2016/060189 International Search Report and Written Opinion dated Feb. 24, 2017.
PCT/US2016/065212 International Preliminary Report on Patentability dated Jun. 21, 2018.
PCT/US2016/065212 International Search Report and Written Opinion dated Feb. 20, 2017.
PCT/US2016/067366 International Preliminary Report on Patentability dated Jun. 28, 2018.
PCT/US2016/067366 International Search Report and Written Opinion dated Mar. 31, 2017.
PCT/US2016/068134 International Preliminary Report on Patentability dated Jul. 5, 2018.
PCT/US2016/068134 International Search Report and Written Opinion dated Apr. 21, 2017.
PCT/US2017/029465 International Preliminary Report on Patentability dated Nov. 8, 2018.
PCT/US2017/029465 International Search Report and Written Opinion dated Aug. 9, 2017.
PCT/US2017/031605 International Search Report and Written Opinion dated Jul. 31, 2017.
PCT/US2017/047854 International Preliminary Report on Patentability dated Mar. 7, 2019.
PCT/US2017/047854 International Search Report and Written Opinion dated Nov. 28, 2017.
PCT/US2018/063935 International Search Report and Written Opinion dated Mar. 22, 2019.
PCT/US2019/027538 International Search Report and Written Opinion dated Aug. 2, 2019.
Seattle Real Time Fire 911 Calls. Available at https://catalog.data.gov/dataset/seattle-real-time-fire-911-calls-6cdf3 (3 pgs.) (Accessed Sep. 2017).
Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (2010).
U.S. Census Bureau. Developers: Population Estimates APIs. Available at https://www.census.gov/data/developers/data-sets/popest-popproj/popest.html (2 pgs.) (Accessed Sep. 2017).
U.S. Appl. No. 14/794,780 Office Action dated Feb. 2, 2016.
U.S. Appl. No. 14/794,780 Office Action dated Mar. 7, 2017.
U.S. Appl. No. 14/794,780 Office Action dated Nov. 15, 2016.
U.S. Appl. No. 14/856,818 Office Action dated Apr. 12, 2017.
U.S. Appl. No. 15/371,117 Office Action dated Aug. 5, 2019.
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,379 Office Action dated Nov. 2, 2017.
U.S. Appl. No. 15/436,484 Office Action dated May 8, 2017.
U.S. Appl. No. 15/436,484 Office Action dated Sep. 14, 2017.
U.S. Appl. No. 15/444,133 Office Action dated Apr. 4, 2017.
U.S. Appl. No. 15/444,133 Office Action dated Aug. 17, 2017.
U.S. Appl. No. 15/497,067 Office Action dated Jun. 23, 2017.
U.S. Appl. No. 15/588,343 Office Action dated Feb. 26, 2018.
U.S. Appl. No. 15/589,847 Office Action dated Jun. 23, 2017.
U.S. Appl. No. 15/589,847 Office Action dated Nov. 30, 2017.
U.S. Appl. No. 15/589,847 Office Action dated Nov. 6, 2018.
U.S. Appl. No. 15/667,531 Office Action dated Apr. 5, 2018.
U.S. Appl. No. 15/667,531 Office Action dated Nov. 8, 2017.
U.S. Appl. No. 15/682,440 Office Action dated Jul. 10, 2019.
U.S. Appl. No. 15/880,208 Office Action dated Aug. 7, 2018.
U.S. Appl. No. 15/958,186 Office Action dated Oct. 18, 2018.
U.S. Appl. No. 15/958,398 Office Action dated Oct. 12, 2018.
U.S. Appl. No. 16/150,099 Office Action dated Jun. 25, 2019.
U.S. Appl. No. 16/162,171 Office Action dated Nov. 4, 2019.
U.S. Appl. No. 16/178,476 Office Action dated May 30, 2019.
U.S. Appl. No. 16/209,892 Office Action dated Feb. 8, 2019.
U.S. Appl. No. 16/271,634 Office Action dated Jun. 13, 2019.
U.S. Appl. No. 16/378,363 Office Action dated Jul. 19, 2019.
U.S. Appl. No. 16/436,810 Office Action dated Aug. 9, 2019.
Weather Company Data for IBM Bluemix APIs. Available at https://twcservice.mybluemix.net/rest-api/ (100 pgs.) (Accessed Sep. 2017).
PCT/US2020/019341 International Search Report and Written Opinion dated Jun. 29, 2020.
U.S. Appl. No. 15/976,600 Office Action dated Aug. 3, 2020.
U.S. Appl. No. 16/162,171 Office Action dated Sep. 24, 2020.
U.S. Appl. No. 16/384,600 Office Action dated Oct. 2, 2020.
U.S. Appl. No. 16/421,355 Office Action dated Oct. 19, 2020.
U.S. Appl. No. 16/509,296 Office Action dated Sep. 3, 2020.
U.S. Appl. No. 16/740,207 Office Action dated Aug. 17, 2020.
U.S. Appl. No. 16/798,049 Office Action dated Jul. 17, 2020.
Co-pending U.S. Appl. No. 16/740,207, filed Jan. 10, 2020.
Co-pending U.S. Appl. No. 16/798,049, filed Feb. 21, 2020.
Co-pending U.S. Appl. No. 16/823,192, filed Mar. 18, 2020.
Co-pending U.S. Appl. No. 16/834,914, filed Mar. 30, 2020.
PCT/US2020/013176 International Search Report and Written Opinion dated May 8, 2020.
Song. Next Generation Emergency Call System with Enhanced Indoor Positioning, Columbia University. Thesis [online] [retrieved Apr. 20, 2020 from < url:https://scholar.google.co.kr/citations/?user=h_4uUqAAAAAJ&hl=ko > (156 pgs) (2014) < /url: < a > .
U.S. Appl. No. 15/976,600 Office Action dated Jan. 30, 2020.
U.S. Appl. No. 16/162,171 Office Action dated Apr. 9, 2020.
U.S. Appl. No. 16/271,634 Office Action dated Dec. 16, 2019.
U.S. Appl. No. 16/384,600 Office Action dated Apr. 2, 2020.
U.S. Appl. No. 16/421,355 Office Action dated Feb. 4, 2020.
U.S. Appl. No. 16/436,810 Office Action dated Dec. 17, 2019.
U.S. Appl. No. 16/526,195 Office Action dated Dec. 27, 2019.
U.S. Appl. No. 16/740,207 Office Action dated Mar. 11, 2020.
U.S. Appl. No. 16/378,363 Office Action dated Jan. 14, 2020.
PCT/US2020/046857 International Search Report and Written Opinion dated Nov. 18, 2020.
U.S. Appl. No. 16/823,192 Office Action dated Dec. 4, 2020.
U.S. Appl. No. 16/834,914 Office Action dated Dec. 2, 2020.
U.S. Appl. No. 16/684,366 Office Action dated Dec. 23, 2020.

* cited by examiner

| DOCUMENT | Call Flow | | CODE EXAMPLE | API REQUEST | ALI DISPLAY |
|---|---|---|---|---|---|
| OVERVIEW | company_contacts | | | | |
| CUSTOMIZATIONS | Company | | public static void main(String[] args) { | | |
| | RapidSOS | | try { | | |
| AUTHENTICATION | User | |   OkHttpClient client = new OkHttpClient(); | | |
| | M. M. | 555-5555 |   MediaType tokenMediaType = MediaType.parse("application/x-www-form-urlencoded"); | | |
| API | Contacts | |   RequestBody tokenBody = RequestBody.create(tokenMediaType, "client_id=ab3IKpmeVfDGHHIPrsNmhuSa5ReEwcPd&client_secret=Fa5JzxCB2psSOrvs&grant_type=client_credentials"); | | |
| | N. H. | 666-6666 |   Request tokenRequest = new Request.Builder() | | |
| MANAGE | + Add Contacts | | | | |
| | Location | | | | |
| TEST | 40.7128 | -74.0060 | | | |
| | INITIATE CALL FLOW | | | | |

| DOCUMENT | OVERVIEW | CUSTOMIZATIONS | AUTHENTICATION | API | MANAGE | TEST |
|---|---|---|---|---|---|---|

Call Flow
[company_contacts]

Company
[RapidSOS]

User
[M. M.] [555-5555]

Contacts
[N. H.] [666-6666]
+ Add Contacts

Location
[40.7128] [-74.0060]

[INITIATE CALL FLOW]

| CODE EXAMPLE | API REQUEST | ALI DISPLAY |
|---|---|---|

PSAP DISPLAY SIMULATOR

7/25/2017 9:21:07 PM

15555551234 OMBL ID = 162

BEINHARD AKL – COMPANY

COMPANY OPS CENTER

GOLDEN GATE BRIDGE, SAN FRANCISCO, CA, USA

CO = RSOS   P# (850) 580-8367

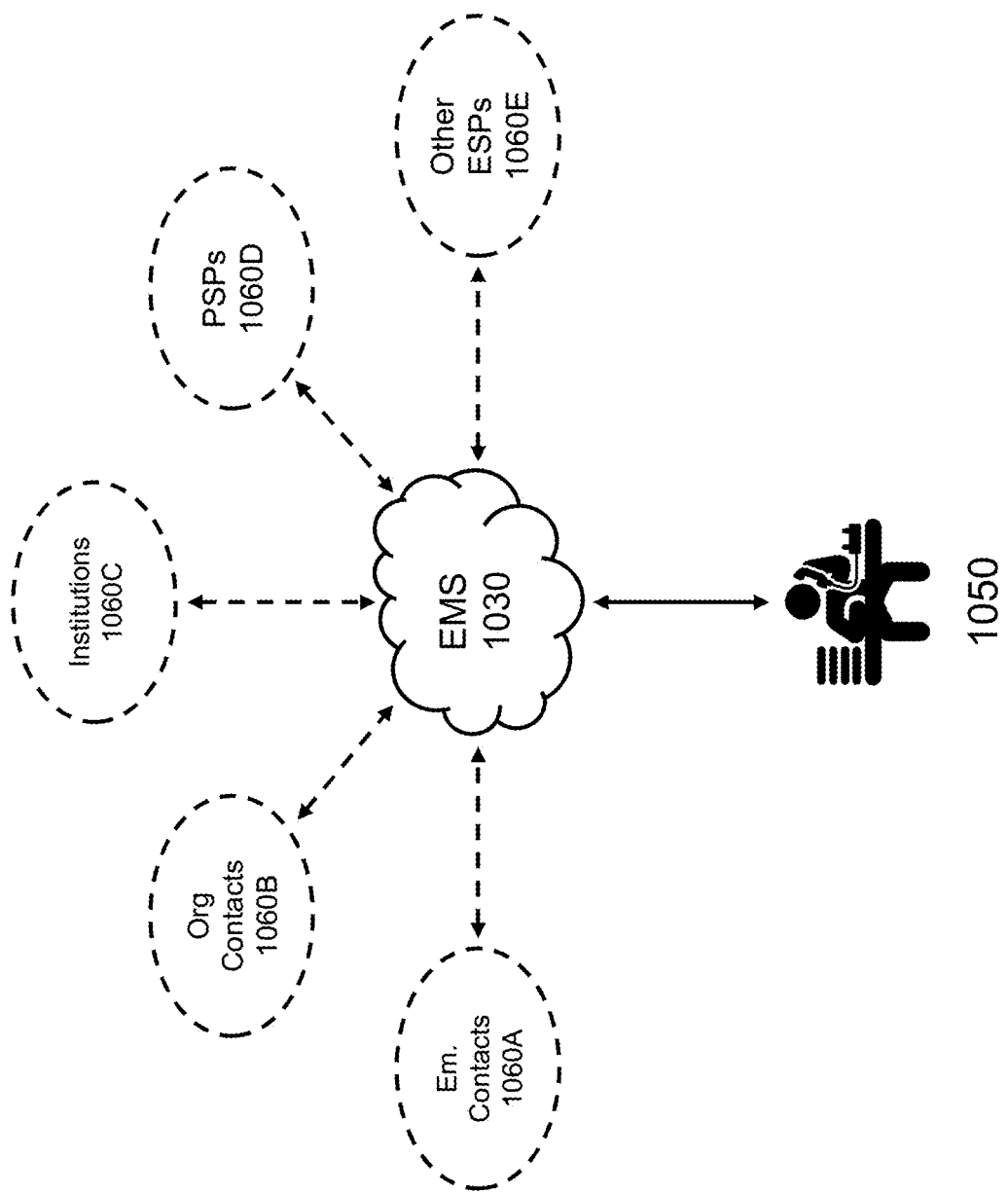

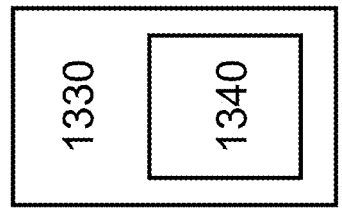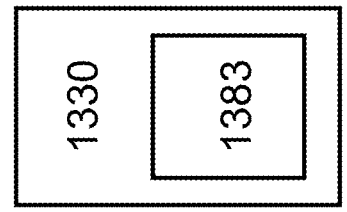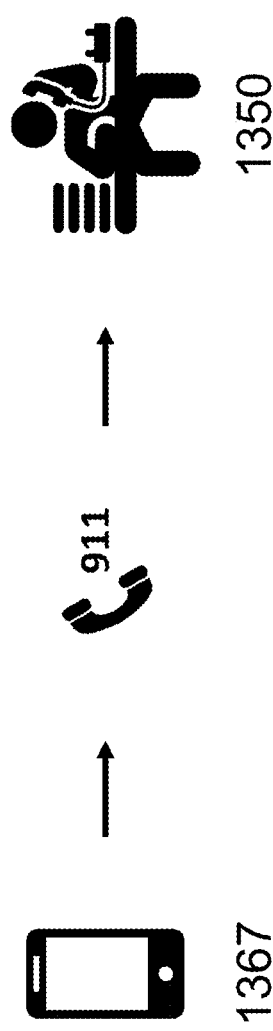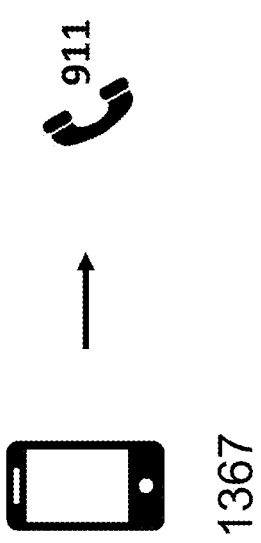
FIG. 13A
FIG. 13B

EMERGENCY COMMUNICATION FLOW MANAGEMENT AND NOTIFICATION SYSTEM

CROSS-REFERENCE

This application claims the benefit of U.S. Provisional Application No. 62/750,175, filed Oct. 24, 2018, the contents of which is hereby incorporated herein by reference.

BACKGROUND OF THE INVENTION

A person in an emergency situation may request help using a mobile communication device such as a cell phone to dial a designated emergency number like 9-1-1 or a direct access phone number for the local emergency service provider (e.g., an emergency dispatch center). This call is assigned to one or more first responders by the emergency service provider. However, these communications are typically limited to audio calls with narrow functionality since most emergency service providers that receive emergency calls currently lack the capacity for more sophisticated communications.

SUMMARY OF THE INVENTION

One advantage provided by the systems, servers, devices, methods, and media of the instant application is the ability to easily and efficiently make customized emergency flow scripts for handling emergency alerts. In some embodiments, emergency flows scripts are assembled into custom emergency flows using various emergency flow building blocks. These blocks provide a modular structure that allows authorized users to select specific building blocks as desired to create unique emergency flows that are tailored to the needs of the users. In some embodiments, the blocks are depicted on a graphic user interface that allows users to drag and drop building blocks to generate emergency flows with ease.

Another advantage provided by the systems, servers, devices, methods, and media of the instant application are emergency response management processes that execute customized emergency flow scripts based on the emergency alert. In some embodiments, an emergency alert comprises an emergency flow identifier that is used to determine the emergency flow script to execute in response to receiving the alert. Thus, a single call management system may provide multiple customized emergency flow scripts based on various parameters (e.g., type of device sending the emergency alert, device functionality, type of emergency, etc.).

Another advantage provided by the systems, servers, devices, methods, and media of the instant application is the facilitation of emergency response communications. Many companies and institutions provide devices and services for monitoring potential emergencies, such as wearable devices that monitor heart rates or intelligent vehicular systems that can detect when a vehicle has been in an accident. However, due to the regulatory requirements for emergency communications (e.g., calling 9-1-1 in the United States), few of the aforementioned services and devices are capable of connecting end users directly to emergency responders. The management systems provided herein provide these services and devices with the infrastructure necessary to connect their end users with emergency responders through a simple and customizable integration.

Another advantage provided by the systems, servers, devices, methods, and media of the instant application are emergency response management processes that execute emergency flow scripts or notification procedures in response to receiving an emergency indication (e.g., a query for emergency information) from an emergency service provider (e.g., a public safety answering point (PSAP)). By executing emergency flow scripts or notification procedures in response to emergency indications received from emergency service providers, the emergency management system can eliminate the need for additional hardware and software to be installed on communication devices in order to initiate emergency flow scripts or notification procedures.

Another advantage provided by the systems, servers, devices, methods, and media of the instant application are emergency flows or notification procedures that allow to continue a sequence of notification until a user who is available and willing to call for emergency help is found. In addition, automated notification messages and status updates can also be sent during an emergency situation.

Another advantage provided by the systems, servers, devices, methods, and media of the instant application is an emergency management system (EMS) for receiving emergency data from an emergency service provider (ESP; e.g., a public safety answering point (PSAP)) and share the emergency data with one or more "upstream" recipients. By sharing emergency data upstream, the EMS can help facilitate faster and more intelligent emergency responses. In some embodiments, the EMS can use emergency data received from an ESP to trigger a notification procedure or an emergency flow. In some embodiments, the EMS can use emergency data received from an ESP to provide the ESP with functional enhancements, such as the ability to remotely activate a school building's emergency lockdown system.

In one aspect, disclosed herein is a method for notifying one or more contacts of an emergency by an emergency management system, the method comprising: (a) receiving a query comprising a user identifier from an emergency service provider (ESP), wherein the user identifier is associated with a user in an emergency; (b) determining a personalized notification procedure associated with the user identifier; (c) identifying the one or more contacts to be notified regarding the emergency according to the personalized notification procedure; and (d) initiating communication with the one or more contacts according to the personalized notification procedure. In some embodiments, the personalized notification procedure comprises sending at least one message to a contact list comprising one or more emergency contacts to be notified regarding the emergency. In some embodiments, the step of initiating communication with the one or more contacts in (d) comprises calling one or more emergency contacts to be notified regarding the emergency. In some embodiments, the query is received based on a proxy emergency communication made by an emergency contact from the contact list on behalf of the user in an emergency. In some embodiments, the user is in a data sharing group comprising the one or more contacts linked to one or more member devices. In some embodiments, the user has authorized location sharing with the one or more member devices associated with the one or more emergency contacts during the emergency. In some embodiments, the method further comprises obtaining a location of the user and sharing the location with one or more member devices authorized for location sharing according to the personalized notification procedure. In some embodiments, the location of the user is determined using location services for an electronic device associated with the user. In some embodiments, one or more emergency contacts of the user are authorized to receive additional data comprising images, video feed, sensor data, or ESP or response data during an emergency. In some embodiments, the one or more contacts comprise an emergency contact associated with the user identifier, or an organizational contact associated with the user identifier, or both. In some embodiments, the one or more contacts includes an organizational contact. In some embodiments, the one or more contacts comprises a call center. In some embodiments, the user identifier is a phone number. In some embodiments, the user identifier is an email address, user account ID or username. In some embodiments, the user identifier identifies an electronic device associated with the user. In some embodiments, the user identifier is an international mobile equipment identity (IMEI) number for a user device, a device ID, Mac address, an internet protocol (IP) address, Wi-fi or Bluetooth access point, or a SIM card number. In some embodiments, the method further comprises: (a) receiving submission of the user identifier to be associated with the personalized notification procedure; (b) configuring the personalized notification procedure based on user instructions or organizational customizations; and (c) associating the user identifier with the personalized notification procedure in a user identification database. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is a method for identifying and executing emergency flows by an emergency management system, the method comprising: (a) receiving a query comprising a user identifier from an emergency service provider (ESP); (b) identifying at least one emergency flow script associated with the user identifier, said emergency flow script defining a pathway of execution of two or more emergency flow building blocks, wherein each of said two or more emergency flow building blocks comprises instructions to perform an emergency response function; and (c) executing the emergency flow script associated with the user identifier. In some embodiments, the at least one emergency flow script comprises two emergency flow scripts associated with the user identifier. In some embodiments, the two emergency flow scripts comprise a main emergency flow and an auxiliary emergency flow. In some embodiments, the two emergency flow scripts comprise a home emergency flow and a work emergency flow. In some embodiments, the ESP is a public safety answering point (PSAP). In some embodiments, the user identifier is a phone number. In some embodiments, the method further comprises: (a) providing a graphical user interface comprising a plurality of emergency flow building blocks; and (b) providing an interactive digital environment within which two or more emergency flow building blocks are visually assembled into the emergency flow script. In some embodiments, the emergency flow script is stored within an emergency flow database comprising a plurality of emergency flow scripts. In some embodiments, the method further comprises: (a) receiving submission of the user identifier to be associated with the emergency flow script; and (b) associating the user identifier with the emergency flow script. In some embodiments, executing the emergency flow script comprises: (a) accessing a prioritized list of accounts associated with the user identifier; (b) attempting to connect with an account on the prioritized list in order of priority; and (c) attempting to connect with a next account on the prioritized list in order of priority when a connection with a preceding account on the prioritized list is unsuccessful. In some embodiments, executing the emergency flow script comprises delivering an emergency notification to an electronic device associated with an emergency contact associated with the user identifier. In some embodiments, the emergency notification is an SMS text message. In some embodiments, executing the emergency flow script further comprises: (a) querying a location database using the user identifier; and (b) retrieving a location associated with the user identifier from the location database; wherein the emergency notification comprises the location associated with the user identifier. In some embodiments, the location database receives the location associated with the user identifier from an electronic device associated with the user identifier before being queried using the user identifier. In some embodiments, executing the emergency flow script comprises: (a) transmitting an interactive message to an electronic device linked to an emergency contact associated with the user identifier; (b) receiving confirmation of receipt of the interactive message; and (c) establishing a communication link between an emergency service provider and the electronic device associated with the emergency contact. In some embodiments, the communication link comprises a data channel. In some embodiments, the communication link comprises a voice over IP (VoIP) channel. In some embodiments, the method further comprises: (a) querying an emergency database using the user identifier; (b) retrieving emergency data associated with the user identifier from the emergency database; and (c) transmitting the emergency data associated with the user identifier to the emergency service provider. In some embodiments, the method further comprises establishing a communicative link with an electronic device associated with the user identifier. In some embodiments, the method further comprises gathering emergency data from the electronic device through the communicative link. In some embodiments, executing the emergency flow script comprises transmitting the emergency data gathered from the electronic device to an emergency contact associated with the user identifier or an emergency service provider. In some embodiments, the electronic device is a computer, a tablet, a mobile phone, a smartphone, a laptop, a vehicle emergency system, a server, a panic button, a wearable device, an IoT device, a sensor, or a home security device. In some embodiments, the method further comprises delivering an emergency notification to the electronic device according to the emergency flow script. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is a method for identifying and executing emergency flows by an emergency management system, the method comprising: (a) receiving a query comprising a user identifier from an emergency service provider (ESP); (b) identifying an organizational identifier associated with the user identifier; (c) identifying an emergency flow script associated with the organizational identifier, the emergency flow script defining a pathway of execution of emergency functions; and (d) executing the emergency flow script associated with the organizational identifier. In some embodiments, identifying the organizational identifier in step (b) comprises searching for an associated organization in one or more databases using the user identifier. In some embodiments, organizational identifier is associated with one or more organizational credentials. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is a method for providing notification of an emergency by an emergency management system, the method comprising: (a) receiving a query comprising a user identifier from an emergency service provider (ESP); (b) identifying an organizational identifier associated with the user identifier; (c) identifying a notification procedure associated with the organizational identifier; and (d) executing the notification procedure associated with the organizational identifier. In some embodiments, the notification procedure comprises connecting with one or more organizational emergency contacts. In some embodiments, connecting with one or more organizational emergency contacts comprises sending a text message, sending an email message, sending a chat message, and calling the organizational emergency contacts. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is a method for providing notification of an emergency by an emergency management system, the method comprising: (a) receiving a query comprising a user identifier from an emergency service provider (ESP); (b) querying a location database using the user identifier to retrieve a location associated with the user identifier; (c) determining that the location associated with the user identifier is located within an organizational geofence associated with an organizational identifier; (d) identifying an emergency flow script associated with the organizational identifier, the emergency flow script defining a pathway of execution of emergency functions comprising steps for notifying one or more emergency contacts; and (e) executing the emergency flow script associated with the organizational identifier. In some embodiments, the emergency flow script specifies an organizational contact to be notified of an emergency. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is an emergency management system comprising: (a) a user identification database storing a plurality of user identifiers associated with notification procedures; (b) a server comprising at least one processor and a memory; and (c) non-transitory computer readable storage medium encoded with a server application including instructions executable by the at least one processor, the server application comprising: (i) a query module configured to receive a query comprising a user identifier from an emergency service provider (ESP); (ii) a user identification module configured to locate a notification procedure associated with the user identifier in the user identification database; and (iii) an emergency notification module configured to execute the notification procedure associated with the user identifier, wherein the notification procedure defines a pathway of execution of emergency functions comprising steps for notifying one or more emergency contacts. In some embodiments, the system further comprises a registration application configured to: (a) receive a submission of the user identifier; (b) receive a definition of the notification procedure; and (c) associate the user identifier with the notification procedure within the user identification database. In some embodiments, the registration application is a mobile application or web application and comprises a graphical user interface for receiving the submission of the user identifier and the definition of the notification procedure.

Disclosed herein, in another aspect, is an emergency management system for identifying and executing emergency flows, the system comprising: (a) an emergency flow database configured to: (i) store a plurality of emergency flow scripts; and (ii) store a plurality of user identifiers, wherein each user identifier is associated with one or more emergency flow scripts; and (b) an emergency response server configured to: (i) receive a query comprising a user identifier from an emergency service provider (ESP); (ii) identify an emergency flow script associated with the user identifier from the emergency flow database; and (iii) execute the emergency flow script associated with the user identifier, wherein the emergency flow script defines a pathway of execution of emergency functions comprising steps for notifying one or more emergency contacts regarding an emergency. In some embodiments, the system further comprises an emergency flow editor application providing a graphical user interface comprising: (a) a plurality of emergency flow building blocks, wherein each emergency flow building block comprises instructions to perform an emergency response function; and (b) an interactive digital environment within which two or more emergency flow building blocks are visually assembled into the emergency flow script.

Disclosed herein, in another aspect, is a system for emergency communications comprising: (a) an emergency triggering device configured to transmit an emergency alert when an emergency is detected; and (b) at least one server providing an emergency management system server application configured to: (i) receive the emergency alert from the triggering device, the emergency alert comprising a list of at least one associated device of the triggering device; and (ii) connect to an associated device from the list; (iii) prompt the associated device for confirmation of the emergency by a user of the associated device; and (iv) establish a conference bridge with the user and an appropriate dispatch center for responding to the emergency. In some embodiments, the emergency alert is triggered autonomously based on sensor data. In some embodiments, the emergency alert is triggered when sensor values exceed a threshold. In some embodiments, the server application is configured to determine an appropriate emergency dispatch center based on location information from the emergency alert. In some embodiments, the server application is configured to connect with the triggering device before connecting with the at least one associated device. In some embodiments, the list is a prioritized list having a plurality of associated devices. In some embodiments, the server application is configured to connect to a next associated device in the prioritized list in order of priority when a connection with a preceding associated device is unsuccessful. In some embodiments, the server application attempts to connect to at least two associated devices concurrently. In some embodiments, the system further comprises a database storing user account information comprising at least one phone number and any emergency contacts for one or more users. In some embodiments, the server application looks up the at least one associated device by querying the at least one database using a telephone number associated with the triggering device. In some embodiments, the emergency alert comprises an authorization code or credential for initiating an emergency call. In some embodiments, the server application looks up an associated device by querying the at least one database using one of an email address, physical address, x-y coordinate, BSSID, SSID, and MAC address of the associated device. In some embodiments, the user is connected to the emergency dispatch center by an audio call, wherein an emergency management system establishes a conference bridge with the user and the emergency dispatch center. In some embodiments, the user is connected to an appropriate emergency dispatch center based on the location information in the emergency alert through a proxy emergency call. In some embodiments, a notification is sent to the user when the emergency alert has been triggered and the server application was unable to connect to a user. In some embodiments, a unique session identification for the emergency is included in the emergency alert and included in session updates. In some embodiments, the emergency is triggered by user interaction with the triggering device, wherein the user interaction comprises at least one of pressing a soft or hard button, a gesture, or a voice command.

Disclosed herein, in another aspect, is a method for notifying one or more contacts of an emergency by an emergency management system, the method comprising: (a) receiving a query comprising a user identifier from an emergency service provider (ESP), wherein the user identifier is associated with a user in an emergency; (b) sending location data for the user identifier to the ESP through a secure pathway; (c) identifying a personalized notification procedure associated with the user identifier; (d) executing the notification procedure associated with the user identifier, said notification procedure comprising identifying the one or more contacts to be notified regarding the emergency and communicating with the one or more contacts. In some embodiments, the user identifier is used to query for location data in one or more emergency databases. In some embodiments, the location data is device-based hybrid location determined on one or more devices associated with the user. In some embodiments, the location data comprises latitude, longitude and location accuracy. In some embodiments, the location data is shared with the one or more contacts. In some embodiments, additional data associated with the user identifier is shared with the one or more contacts, wherein the additional data comprises user data, medical data, webcam images, video feed, audio files, or any combination thereof. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is a method for notifying one or more contacts of an emergency by an emergency management system, the method comprising: (a) receiving a query comprising a user identifier from an emergency service provider (ESP), wherein the user identifier is associated with a user in an emergency; (b) identifying a personalized notification procedure associated with the user identifier wherein the personalized notification procedure takes the location data as an input for selecting an emergency flow script from a plurality of emergency flow scripts; (c) executing the selected emergency flow script associated with the user identifier. In some embodiments, the selected emergency flow script is an organizational emergency flow, wherein the location data indicates that the user was on the premises of the associated organization. In some embodiments, the selected emergency flow script is a family emergency flow, wherein the location data is shared with verified emergency contacts. In some embodiments, the selected emergency flow script is a work emergency flow, wherein the time of the emergency indicates that the user is working. Disclosed herein, in another aspect, is an emergency management system configured to carry out the method of any of the preceding embodiments. Disclosed herein, in another aspect, is non-transitory computer readable medium including instructions executable by a processor to create an application configured to carry out the method of any of the preceding embodiments.

Disclosed herein, in another aspect, is a system for emergency communications comprising: (a) a triggering device detecting an audio emergency trigger and sending an emergency alert to the emergency management system; and (b) at least one server providing a server application at the emergency management system, said server application comprising: (i) a software module receiving the emergency alert from the triggering device; (ii) a software module determining a callback number for the triggering device, wherein the callback number is selected and assigned to the triggering device when the triggering device does not have a phone number; (iii) a software module determining a location of the triggering device, pairing the location with the callback number, and updating a location database accessible by emergency service providers with the paired location and callback number; (iv) a software module identifying an appropriate emergency service provider for responding to the emergency alert based on the location of the triggering device and facilitating an emergency communication session with the appropriate emergency service provider, wherein the callback number enables the emergency communication session with the triggering device to be re-established in case of disconnection. In some embodiments, the triggering device comprises a microphone for picking up voice and sound triggers. In some embodiments, the triggering device comprises a microphone and speakers for establishing an emergency call. In some embodiments, the audio emergency trigger is a voice command. In some embodiments, the emergency communication session is initiated after receiving a confirmation of the emergency selected from the list comprising a second voice command, background sounds, webcam images, and video feed. In some embodiments, the emergency communication session is initiated after receiving confirmation of the emergency by first connecting with a call center. In some embodiments, determining the location of the triggering device comprises getting a user to provide or confirm the location of the emergency. In some embodiments, the emergency communication session is initiated after verifying user consent for initiating the emergency communication session. In some embodiments, the emergency alert comprises an API request to the emergency management system to initiate the emergency communication session. In some embodiments, the triggering device is a phone and the callback number is a phone number of the triggering device. In some embodiments, the triggering device is an Internet of Things (IoT) device. In some embodiments, the triggering device is a smart speaker. In some embodiments, the triggering device is connected as part of a mesh network. In some embodiments, the triggering device is part of a local network of smart devices. In some embodiments, the local network is a home, office, or business network. In some embodiments, the emergency communication session is established on a communication device that is paired or synched with the triggering device via Wi-fi, Bluetooth or other connection. In some embodiments, the emergency alert from the triggering device is sent to the emergency management system through a mesh network or an intermediate communication device. In some embodiments, the intermediate communication device is a cell phone or Internet router. In some embodiments, the triggering device gathers emergency information in response to detecting the audio emergency trigger and provides the emergency information to the emergency management system. In some embodiments, the emergency information comprises location information, sensor data, audio, video, user information, emergency contact information, type of emergency, or any combination thereof. In some embodiments, the triggering device gathers the emergency information from one or more devices in a local network. In some embodiments, the location database is an E911 ALI database. In some embodiments, the location database is an NG911 clearinghouse database. In some embodiments, the emergency communication session is a two-way audio session established using SIP protocol. In some embodiments, wherein the triggering device utilizes a voice assistance service to transmit the emergency alert to the emergency management system as an API request. In some embodiments, the server application further comprises a software module re-establishing the communication session upon receiving a request to re-establish communications with the callback number from the emergency service provider. In some embodiments, the triggering device receives sensor data from a network of sensor devices indicative of an emergency situation and attempts to report the emergency situation to a user. In some embodiments, the triggering device attempts to report the emergency situation to the user by broadcasting an audio message. In some embodiments, participants in the emergency communication session are the emergency service provider and an associated device of the triggering device. In some embodiments, the associated device is a communication device associated with the triggering device or a user of the triggering device and is selected from a prioritized list of associated devices to participate in the emergency communication session.

In another aspect, disclosed herein is a method for notifying one or more recipients of an emergency by an emergency management system comprises: a) receiving an electronic communication from an emergency service provider (ESP), wherein the electronic communication is an indication of an emergency alert received by the ESP and comprises a user identifier; b) gathering a set of emergency data associated with the emergency alert, wherein the set of emergency data comprises the user identifier; c) determining, using the set of emergency data, an appropriate notification procedure to be executed; and d) executing the notification procedure to initiate communication with the one or more recipients. In some embodiments, the one or more recipients are specified by the notification procedure. In some embodiments, the one or more recipients comprises a prioritized list of emergency contacts that are contacted sequentially. In some embodiments, the electronic communication is received through an application programming interface (API). In some embodiments, the electronic communication comprises some or all of the set of emergency data. In some embodiments, the method further comprises: a) wherein the set of emergency data comprises a user identifier; and b) wherein determining the appropriate notification procedure using the set of emergency data comprises identifying a notification procedure associated with the user identifier from a notification procedure database. In some embodiments, the user identifier is a phone number or an email address. In some embodiments, the method further comprises: a) receiving definition of the notification procedure, wherein the notification procedure defines one or more contacts and an order of contacting the one or more contacts; b) associating the notification procedure with the user identifier; and c) storing the notification procedure in a notification procedure database. In some embodiments, the definition of the notification procedure is received through a graphical user interface of an emergency response application provided by the EMS. In some embodiments, executing the notification procedure to initiate communication with the one or more recipients comprises transmitting at least one electronic message indicative of an emergency associated with the user identifier to the one or more contacts. In some embodiments, executing the notification procedure to initiate communication with the one or more recipients comprises initiating a voice call with the one or more contacts. In some embodiments, the voice call is facilitated over voice over internet protocol (VoIP). In some embodiments, the one or more contacts comprises an emergency contact associated with the user identifier. In some embodiments, the one or more contacts comprises an organizational contact associated with the user identifier. In some embodiments, the method further comprises obtaining a location associated with the user identifier and sharing the location with the one or more contacts according to the notification procedure. In some embodiments, the location associated with the user identifier is obtained from an electronic device associated with the user identifier. In some embodiments, the location associated with the user identifier is a device-based hybrid location generated by the electronic device associated with the user identifier. In some embodiments, the set of emergency data comprises the location associated with the user identifier. In some embodiments, the set of emergency data comprises a location; and determining the appropriate notification procedure using the set of emergency data comprises: i) accessing a set of geofences associated with a plurality of third-party accounts; ii) determining that the location is within a geofence associated with a first third-party account; and iii) identifying a notification procedure associated with the first third-party account. In some embodiments, the set of emergency data further comprises an emergency type; and executing the notification procedure comprises: i) identifying a set of emergency types selected for the first third-party account; ii) determining that the emergency type associated with the emergency alert is included in the set of emergency types selected for the first third-party account; and iii) executing the notification procedure in response to determining that the emergency type is included in the set of emergency types selected for the first third-party account. In some embodiments, the third-party account is a second ESP. In some embodiments, the set of emergency data comprises a user identifier and wherein determining the appropriate notification procedure to be executed comprises: a) identifying a third-party account associated with the user identifier; and b) identifying a notification procedure associated with the third-party account. In some embodiments, executing the notification procedure comprises transmitting a second set of data comprising some or all of the set of emergency data to the one or more recipients. In some embodiments, the ESP is a public safety answering point (PSAP) and wherein the emergency alert is an emergency call received by the PSAP. In some embodiments, the ESP is an alarm monitoring center. In some embodiments, the recipient is a neighboring PSAP. Disclosed herein is an emergency management system (EMS) comprising at least one processor and non-transitory computer readable storage medium including instructions executable by the at least one processor to perform the method for notifying one or more recipients of an emergency.

In another aspect, disclosed herein is a method for notifying one or more contacts of an emergency by an emergency management system comprises: a) receiving definition of a personalized notification procedure defining one or more contacts and an order of contacting the one or more contacts; b) associating the personalized notification procedure with a user identifier; c) storing the personalized notification procedure in a notification procedure database; d) receiving an emergency communication comprising the user identifier from an emergency service provider (ESP); e) identifying the personalized notification procedure associated with the user identifier from the notification procedure database; and f) executing the personalized notification procedure to initiate communication with the one or more contacts according to the personalized notification procedure. Disclosed herein is an emergency management system (EMS) comprising at least one processor and non-transitory computer readable storage medium including instructions executable by the at least one processor to perform the method for notifying one or more recipients of an emergency.

In another aspect, disclosed herein is a method for notifying one or more recipients of an emergency by an emergency management system comprises: a) receiving an electronic communication from an emergency service provider (ESP), wherein the electronic communication is associated with an emergency alert received by the ESP and comprises a set of emergency data comprising a location; b) accessing a set of geofences associated with third-party accounts; c) determining that the location is within a geofence associated with a first third-party account; d) identifying a notification procedure associated with the first third-party account; and e) executing the notification procedure to initiate communication with the one or more recipients. Disclosed herein is an emergency management system (EMS) comprising at least one processor and non-transitory computer readable storage medium including instructions executable by the at least one processor to perform the method for notifying one or more recipients of an emergency.

In another aspect, disclosed herein is a method for notifying one or more recipients of an emergency by an emergency management system comprises: a) receiving an electronic communication from an emergency service provider (ESP), wherein the electronic communication is associated with an emergency alert received by the ESP and comprises a set of emergency data comprising a location and an emergency type; b) accessing a set of geofences associated with third-party accounts; c) determining that the location is within a geofence associated with a first third-party account; d) identifying a notification procedure associated with the first third-party account; e) identifying a set of emergency types selected for the first third-party account; f) determining that the emergency type is included in the set of emergency types selected for the first third-party account; and g) in response to determining that the emergency type is included in the set of emergency types selected for the first third-party account, executing the notification procedure to initiate communication with the one or more recipients. Disclosed herein is an emergency management system (EMS) comprising at least one processor and non-transitory computer readable storage medium including instructions executable by the at least one processor to perform the method for notifying one or more recipients of an emergency.

In another aspect, disclosed herein is a method for notifying one or more recipients of an emergency by an emergency management system comprises: a) receiving an electronic communication from an emergency service provider (ESP), wherein the electronic communication is associated with an emergency alert received by the ESP and comprises a set of emergency data comprising a user identifier; b) identifying a third-party account associated with the user identifier from a database; c) identifying a notification procedure associated with the third-party account from a notification procedure database comprising a plurality of notification procedures associated with a plurality of third-party accounts; and d) executing the notification procedure associated with the third-party account to initiate communication with the one or more recipients according to the notification procedure. Disclosed herein is an emergency management system (EMS) comprising at least one processor and non-transitory computer readable storage medium including instructions executable by the at least one processor to perform the method for notifying one or more recipients of an emergency.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 9A and FIG. 9B depict an embodiment of a dashboard for testing emergency flows;

FIG. 10 depicts an embodiment of a system for managing upstream emergency data flow;

FIG. 13A and FIG. 13B depict embodiments of a system for managing upstream emergency data flow, emergency flows, and emergency notifications;

DETAILED DESCRIPTION

Figure 1A:
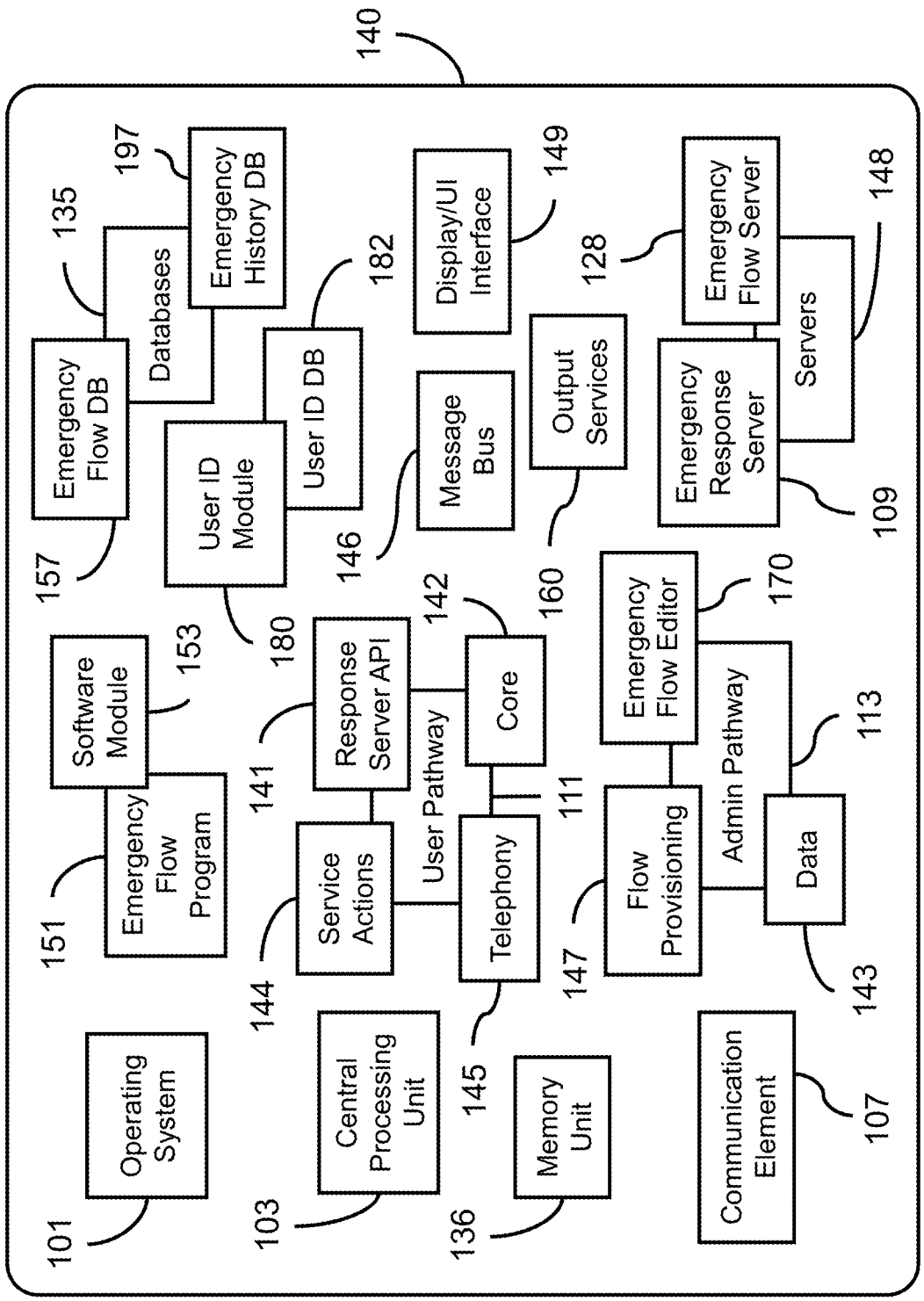
FIG. 1A, FIG. 1B, FIG. 1C, and FIG. 1D depict embodiments of the (i) emergency flow management system (EFMS), (ii) communication device (e.g., a triggering device), (iii) emergency management system (also referred to as "EMS"), (iv) emergency flow program, (v) emergency service provider (ESP) system, and (vi) ESP software.

In some embodiments, disclosed herein is a method for notifying one or more contacts of an emergency by an emergency management system, the method comprising: (a) receiving a query comprising a user identifier from an emergency service provider (ESP), wherein the user identifier is associated with a user in an emergency; (b) determining a personalized notification procedure associated with the user identifier; (c) identifying the one or more contacts to be notified regarding the emergency according to the personalized notification procedure; and (d) initiating communication with the one or more contacts according to the personalized notification procedure.

In some embodiments, disclosed herein is a method for identifying and executing emergency flows by an emergency management system, the method comprising: (a) receiving a query comprising a user identifier from an emergency service provider (ESP); (b) identifying at least one emergency flow script associated with the user identifier, said emergency flow script defining a pathway of execution of two or more emergency flow building blocks, wherein each of said two or more emergency flow building blocks comprises instructions to perform an emergency response function; and (c) executing the emergency flow script associated with the user identifier.

In some embodiments, disclosed herein is a method for identifying and executing emergency flows by an emergency management system, the method comprising: (a) receiving a query comprising a user identifier from an emergency service provider (ESP); (b) identifying an organizational identifier associated with the user identifier; (c) identifying an emergency flow script associated with the organizational identifier, the emergency flow script defining a pathway of execution of emergency functions; and (d) executing the emergency flow script associated with the organizational identifier. In some embodiments, identifying the organizational identifier in step (b) comprises searching for an associated organization in one or more databases using the user identifier.

In some embodiments, disclosed herein is a method for providing notification of an emergency by an emergency management system, the method comprising: (a) receiving a query comprising a user identifier from an emergency service provider (ESP); (b) identifying an organizational identifier associated with the user identifier; (c) identifying a notification procedure associated with the organizational identifier; and (d) executing the notification procedure associated with the organizational identifier.

In some embodiments, disclosed herein is a method for providing notification of an emergency by an emergency management system, the method comprising: (a) receiving a query comprising a user identifier from an emergency service provider (ESP); (b) querying a location database using the user identifier to retrieve a location associated with the user identifier; (c) determining that the location associated with the user identifier is located within an organizational geofence associated with an organizational identifier; (d) identifying an emergency flow script associated with the organizational identifier, the emergency flow script defining a pathway of execution of emergency functions comprising steps for notifying one or more emergency contacts; and (e) executing the emergency flow script associated with the organizational identifier.

In some embodiments, disclosed herein is an emergency management system comprising: (a) a user identification database storing a plurality of user identifiers associated with notification procedures; (b) a server comprising at least one processor and a memory; and (c) non-transitory computer readable storage medium encoded with a server application including instructions executable by the at least one processor, the server application comprising: (i) a query module configured to receive a query comprising a user identifier from an emergency service provider (ESP); (ii) a user identification module configured to locate a notification procedure associated with the user identifier in the user identification database; and (iii) an emergency notification module configured to execute the notification procedure associated with the user identifier, wherein the notification procedure defines a pathway of execution of emergency functions comprising steps for notifying one or more emergency contacts.

In some embodiments, disclosed herein is an emergency management system for identifying and executing emergency flows, the system comprising: (a) an emergency flow database configured to: (i) store a plurality of emergency flow scripts; and (ii) store a plurality of user identifiers, wherein each user identifier is associated with one or more emergency flow scripts; and (b) an emergency response server configured to: (i) receive a query comprising a user identifier from an emergency service provider (ESP); (ii) identify an emergency flow script associated with the user identifier from the emergency flow database; and (iii) execute the emergency flow script associated with the user identifier, wherein the emergency flow script defines a pathway of execution of emergency functions comprising steps for notifying one or more emergency contacts regarding an emergency.

In some embodiments, disclosed herein is a system for emergency communications comprising: (a) an emergency triggering device configured to transmit an emergency alert when an emergency is detected; and (b) at least one server providing an emergency management system server application configured to: (i) receive the emergency alert from the triggering device, the emergency alert comprising a list of at least one associated device of the triggering device; and (ii) connect to an associated device from the list; (iii) prompt the associated device for confirmation of the emergency by a user of the associated device; and (iv) establish a conference bridge with the user and an appropriate dispatch center for responding to the emergency.

In some embodiments, disclosed herein is a method for notifying one or more contacts of an emergency by an emergency management system, the method comprising: (a) receiving a query comprising a user identifier from an emergency service provider (ESP), wherein the user identifier is associated with a user in an emergency; (b) sending location data for the user identifier to the ESP through a secure pathway; (c) identifying a personalized notification procedure associated with the user identifier; (d) executing the notification procedure associated with the user identifier, said notification procedure comprising identifying the one or more contacts to be notified regarding the emergency and communicating with the one or more contacts.

In some embodiments, disclosed herein is a method for notifying one or more contacts of an emergency by an emergency management system, the method comprising: (a) receiving a query comprising a user identifier from an emergency service provider (ESP), wherein the user identifier is associated with a user in an emergency; (b) identifying a personalized notification procedure associated with the user identifier wherein the personalized notification procedure takes the location data as an input for selecting an emergency flow script from a plurality of emergency flow scripts; (c) executing the selected emergency flow script associated with the user identifier.

In some embodiments, disclosed herein is a system for emergency communications comprising: (a) a triggering device detecting an audio emergency trigger and sending an emergency alert to the emergency management system; and (b) at least one server providing a server application at the emergency management system, said server application comprising: (i) a software module receiving the emergency alert from the triggering device; (ii) a software module determining a callback number for the triggering device, wherein the callback number is selected and assigned to the triggering device when the triggering device does not have a phone number; (iii) a software module determining a location of the triggering device, pairing the location with the callback number, and updating a location database accessible by emergency service providers with the paired location and callback number; (iv) a software module identifying an appropriate emergency service provider for responding to the emergency alert based on the location of the triggering device and facilitating an emergency communication session with the appropriate emergency service provider, wherein the callback number enables the emergency communication session with the triggering device to be re-established in case of disconnection.

Emergency Communications

Modern communication devices, for example, smart phones, tablet computers, wearable communication devices, smart sensor devices and/or systems are often equipped with a variety of features for determining location information of the communication device using, for example, GPS, or triangulation with cellular phone towers. Modern communication devices also often include functionality to store data regarding a user of the communication device, for example, health information about the user.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g., data set) from the communication device into a format suitable for the EDC (e.g., analog or digital, audio, SMS, data, etc.) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g., information that the user of member device who is experiencing a medical emergency suffers from diabetes). Accordingly, in some embodiments, the information is sent autonomously, at request of a user of the communication device, or at request of the recipient (e.g., EMS, EDC, first responder, etc.).

Emergency Management System

FIG. 1A shows a schematic diagram of one embodiment of an emergency flow management system 140 as described herein. In some embodiments, the emergency flow management system 140 is a standalone system that can interact with devices, the emergency management system, and/or dispatch centers. In other embodiments, the emergency flow management system is distributed in various devices and systems.

In some embodiments, the emergency flow management system (EFMS) 140 comprises one or more of an operating system 101, a central processing unit 103, a memory unit 136, a communication element 107, a display or user interface 149 (for an EFMS administrator to maintain and update the system) and an emergency flow program 151 (e.g., server application) including at least one software module 153.

In some embodiments, the emergency flow management system 140 comprises one or more databases 135. In some embodiments, the emergency flow management system 140 comprises an emergency flow database 157 from which emergency flows may be called when there is an emergency trigger. In some embodiments, the emergency flow management system 140 comprises an emergency history database, which enters and maintains a log of emergency incidents, emergencies triggered, and/or emergency flows that have been implemented. In some embodiments, emergency flow management system 140 includes a message bus 146, one or more servers 148 implementing instructions form the emergency flow program 151 (e.g., emergency flow server 128 for generating emergency flows and emergency response server 109 for executing emergency flows) and output services 160.

Figure 1B:
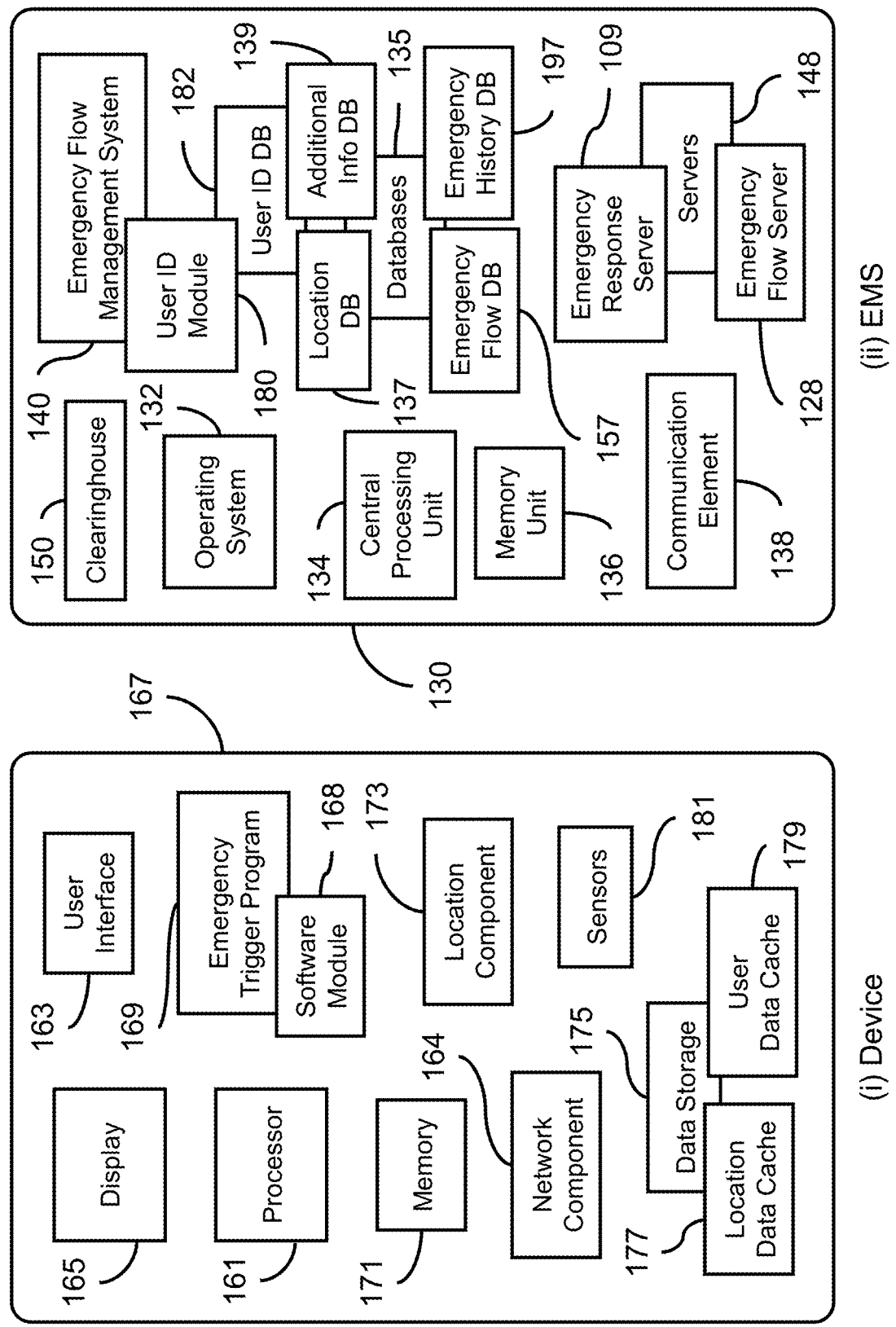

FIG. 1B shows a schematic diagram of one embodiment of a device described herein. In some embodiments, the device 167 is an electronic device such as a triggering device which may be a communication device (e.g., wearable, mobile or cellular phone, computer, laptop, vehicular console, smart car, personal digital assistant, IoT devices, smart home, smart TV, etc.). In some embodiments, the triggering device is a wearable device. In some embodiments, the triggering device is a wireless mobile device or a smartphone. In some embodiments, the triggering device is a combination of devices (e.g., a wearable device communicatively connected to a mobile phone). In some embodiments, the triggering device is a walkie-talkie or a two-way radio. In some embodiments, a user 102 (not shown) is selected from one or more persons who are the primary users of the device 167. When the user 102 is in an emergency situation, the device 167 can be triggered.

In some embodiments, the device 167 comprises at least one processor 161, a memory 171 (e.g., an EPROM memory, a RAM, a solid-state memory), a display 165, a user interface 163, a network component 164 (e.g., an antenna and associated components, Wi-Fi adapters, Bluetooth® adapters, etc.), sensors 181, and an emergency trigger program 169 (e.g., mobile application, server application, computer program, application). In some embodiments, the device is equipped with a location component 173, for example, a global positioning system (GPS), location services, etc. In some embodiments, the device comprises data storage 175. In further embodiments, the device comprises a location data cache 177 and a user data cache 179.

In some embodiments, the device 167 has several components including a display 165 and user interface 173, which allow the user 102 (not shown) to interact with the device 167. In some embodiments, the display 165 is a part of the user interface 163 (e.g., a touchscreen is both a display and provides an interface to accept user interactions). In some embodiments, the user interface 163 includes physical buttons such as the on/off and volume buttons. In some embodiments, the display 165 and/or the user interface 163 comprises a touch screen (e.g., a capacitive touch screen), which is capable of displaying information and receiving user input. In some embodiments, the device 167 comprises hardware components not including a display 165 and a user interface 163, wherein the device functions autonomously without requiring active user guidance or interaction.

In some embodiments, a device 167 includes various accessories that allow additional functionality. In some embodiments, the accessories (not shown) include one or more of the following: microphone (e.g., for user voice interaction), a camera (e.g., for input of gestures commands or pictures from the user), speakers, one or more sensors 181, such as a fingerprint reader or scanner/health or environmental sensors, USB/micro-USB port, headphone jack, a card reader, SIM card slot, and any combination thereof.

In some embodiments, a device 167 autonomously detects emergencies based on data from various sources such as the sensors 181 (sensor data) or sound detection picked up from the microphone or another accessory (e.g., smoke detector). For example, in some embodiments, a device autonomously detects an emergency based on sensor data when sensor readings or values exceed a threshold (e.g., a predefined threshold set by the device software by default, by a user, or by an EMS). In some embodiments, the device 167 obtains relevant data from associated device to trigger the emergency.

In some embodiments, the emergency management system 130 houses components of the emergency flow management system (EFMS). In some embodiments, the emergency management system 130 comprises an application for assembling and/or configuring emergency flow scripts. In some embodiments, the emergency management system 130 comprises an application for managing an emergency response to an emergency alert including execution of an emergency flow script. In some embodiments, the emergency management system 130 comprises one or more of an operating system 132, at least one central processing unit or processor 134, a memory unit 136, a communication element 138, and a server application 151 (e.g., an emergency flow program). In some embodiments, the emergency management system 130 comprises one or more databases 135 (e.g., location database 137, an additional information database 139, emergency flow database 157, user identification database 182, and/or emergency history database 197). In some embodiments, the emergency management system 130 may include one or more servers 148. In some embodiments, an emergency response server 109 executes an emergency flow when an emergency or emergency-like situation is triggered via a user pathway 111. In some embodiments, an emergency flow server 128 allows an administrator to generate and modify emergency flows via an admin pathway 113. In some embodiments, the emergency management system 130 comprises at least one of a location database 137 and an additional information database 139. In some embodiments, the emergency flow program 151 comprises at least one software module 153 for carrying out one or more instructions.

In some embodiments, as depicted by FIG. 1B, the emergency management system 130 includes a user identification module 180 or a user identification database 182. In some embodiments, the user identification module 180 associates user identifiers (e.g., phone numbers or email addresses) with notification procedures or emergency flows and stores with user identifiers in the user identification database 182. In some embodiments, the user identification database 182 is a relational database. In some embodiments, a user identifier is stored in the user identification database 182 and associated with one or more attributes, such as a notification procedure identifier, an emergency flow identifier, an organizational identifier, or another user identifier. For example, in some embodiments, a user identifier for John Doe is his phone number, (123) 456-7890. In this example, John works for Wells Fargo and has a wife and two children. The user identifier for John (phone number (123) 456-7890) may be stored in the user identification database 182 and associated with an organizational identifier for Wells Fargo, as well as user identifiers (e.g., phone numbers) for John's wife and two children. In some embodiments, the user identification module 180 is included in the emergency flow management system 140. In some embodiments, the user identification module 180 is part of an emergency notification system, as described below with respect to FIG. 14. In some embodiments, the user identification module receives submission of a user identifier and definition or selection of a notification procedure to be associated with the user identifier through a registration application. In some embodiments, the registration application is a mobile or web application and provides a graphical user interface for the submission of user identifiers and definition or selection of notification procedures. In some embodiments, the user identification database 182 is a component (e.g., a portion or sub-database) of the emergency flow database 157.

In some embodiments, the emergency management system (EMS) 130 includes a clearinghouse 150 (also referred to as an "Emergency Clearinghouse") for storing and retrieving emergency data. In some embodiments, the clearinghouse 150 includes sub-clearinghouses, such as a location clearinghouse and an additional data clearinghouse. In some embodiments, the location clearinghouse includes a location ingestion module and a location retrieval module (not shown). In some embodiments, the additional data clearinghouse includes an additional data ingestion module and an additional data retrieval module (not shown). In other embodiments, additional data and location data (e.g., emergency data) are stored in one or more databases in a distributed manner. In some embodiments, the emergency data is stored in an external or third-party server that is accessible to the EMS 130. Generally, the clearinghouse 150 functions as an interface that receives and stores emergency data from electronic or communication devices that is then retrieved, transmitted, and/or distributed to recipients (e.g., emergency personnel) before, during, or after emergencies. The clearinghouse can receive emergency data from electronic or communication devices such as mobile phones, wearable devices, laptop or desktop computers, personal assistants, intelligent vehicle systems, home security systems, IoT devices, camera feeds, and other sources. In some embodiments, the emergency data optionally consists of locations or additional data such as medical history, personal information, or contact information. In some embodiments, during an emergency, an emergency service provider (ESP; e.g., a public safety answering point (PSAP)) queries the clearinghouse 150 for emergency data pertaining to an emergency. The clearinghouse 150 then identifies the emergency and any emergency data pertaining to the emergency stored within the clearinghouse 150 and transmits the pertinent emergency data to the requesting ESP. Accordingly, in some embodiments, the clearinghouse 150 acts as a data pipeline for ESPs otherwise without access to emergency data that is critical to most effectively and efficiently responding to an emergency. Location data stored within the clearinghouse 150 can allow emergency responders to arrive at the scene of an emergency faster, and additional data stored within the clearinghouse 150 can allow emergency responders to be better prepared for the emergencies they face.

Figure 1C:
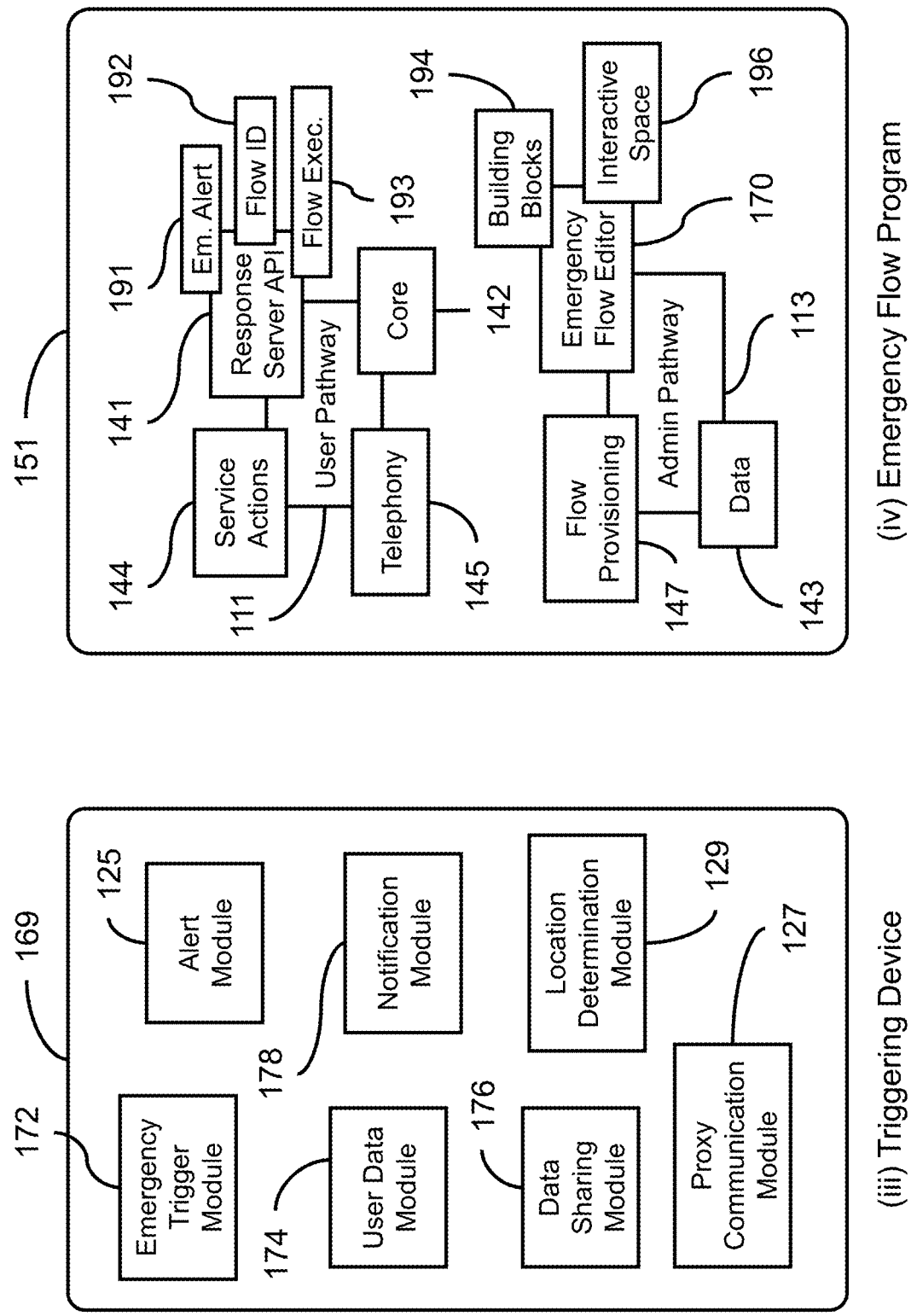

FIG. 1C shows a schematic diagram of one embodiment of an emergency trigger program 169 installed on a device, such as a triggering device 167. In some embodiments, the emergency trigger program 169 comprises one or more device software modules selected from an emergency trigger module 172 (for saving conditions for triggering an emergency alert), an alert module 125 (for sending the emergency alert), a user data module 174 (for entering and storing user contacts and other preferences and user data), a location determination module 129 (for determining device-based location through GPS, location services, or other methods), a data sharing module 176 (for sharing data from the device with EMS, EFMS, EDC or responders, etc.), a proxy communication module 127 (for making a proxy call on behalf of another), a notification module 178 (for displaying communications from the EFMS to the user), or any combination thereof.

FIG. 1C also shows a schematic diagram of one embodiment of an emergency flow program 151 installed on a server (e.g., a server in an EMS). In some embodiments, the emergency flow program 151 comprises one or more server software modules selected from an administrator's (admin) pathway 113 comprising an emergency flow editor module 170, a flow provisioning module 147, a data module 143, a telephony module 145, or any combination thereof. In some embodiments, the emergency flow editor module 170 comprises a building blocks module 194, an interactive space module 196, or any combination thereof.

In some embodiments, the emergency flow program 151 comprises one or more server software modules selected from a user pathway 111 comprising a response server API module 141, a core module 142, a service actions module 144, a telephony module 145, or any combination thereof. In some embodiments, the response server API module 141 comprises an emergency alert module 191, a flow identification module 192, a flow execution module 193, or any combination thereof.

Figure 1D:
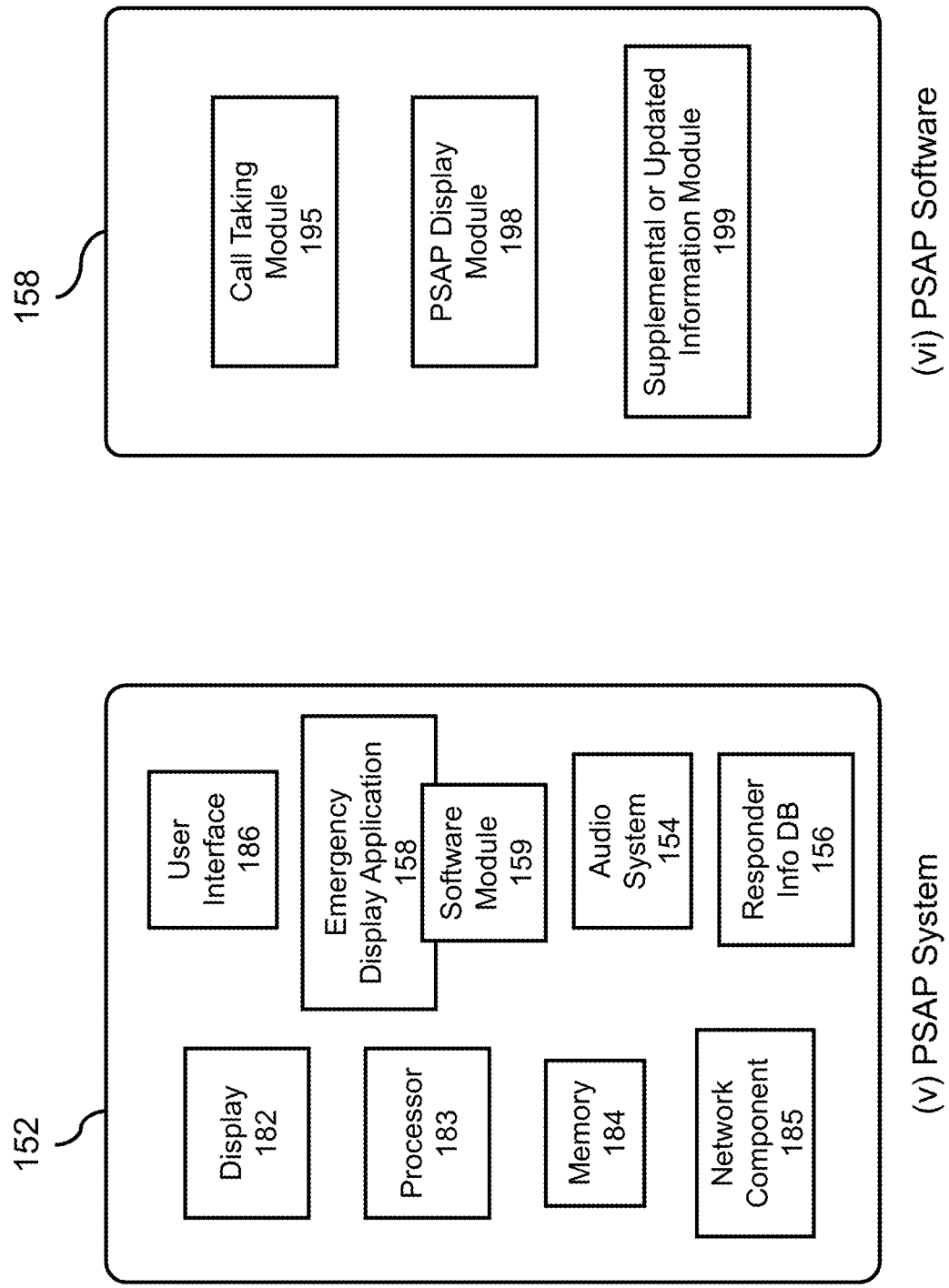

FIG. 1D shows a schematic diagram of one embodiment of a Public Safety Answering Point (PSAP) system 152 as described herein. In some embodiments, the PSAP system 152 comprises one or more of a display 182, a user interface 186, at least one central processing unit or processor 183, a memory unit 184, a network component 185, an audio system 154 (e.g., microphone, speaker and/or a call-taking headset) and a computer program such as a PSAP Emergency Display Application 158. In some embodiments, the PSAP application 158 comprises one or more software modules 159. In some embodiments, the PSAP system 152 comprises a database of responders 156, such as medical assets, police assets, fire response assets, rescue assets, safety assets, etc.

FIG. 1D also shows a schematic diagram of one embodiment of a PSAP application 158 installed on a PSAP system 152 (e.g., a server in the PSAP system). In some embodiments, the PSAP application 158 comprises one or more software modules. In some embodiments, a software module is a call taking module 195, a PSAP display module 198, a supplemental or updated information module 199 or a combination thereof. In some embodiments, the PSAP application 158 displays the information as depicted in the example shown in FIG. 9B. In some embodiments, the PSAP application 158 displays the information on a map.

Figure 12:
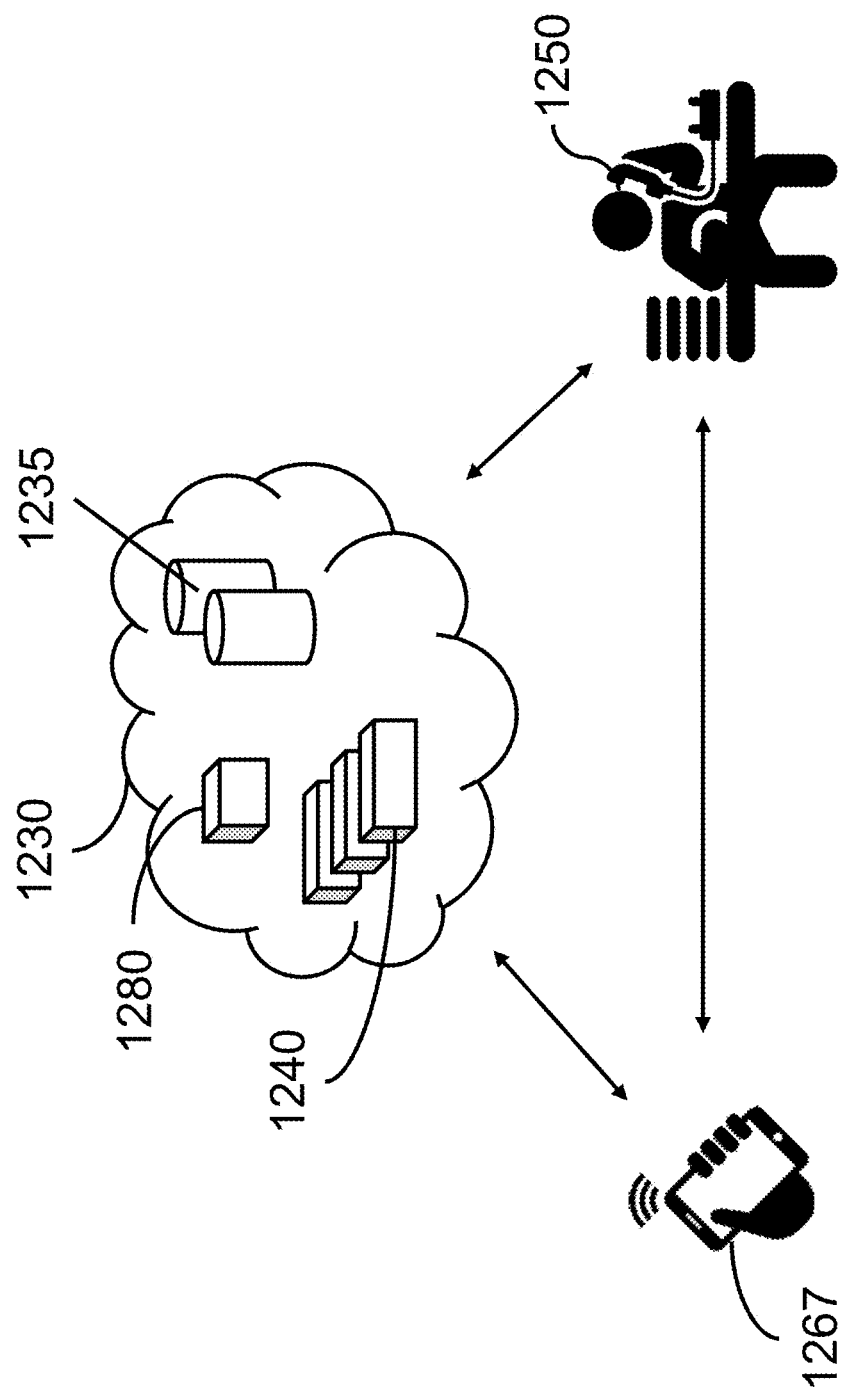
FIG. 12 depicts an embodiment of a system for managing emergency flows and emergency notifications.

In some embodiments, location and supplemental information may be displayed for emergency service providers (e.g., police, fire, medical, etc.) and/or responders on their devices. It is contemplated that responder devices may be installed a responder device program (not shown) similar to PSAP display module 198 as depicted in FIG. 12. In some embodiments, the responder device program displays the emergency location on a map.

Figure 2:
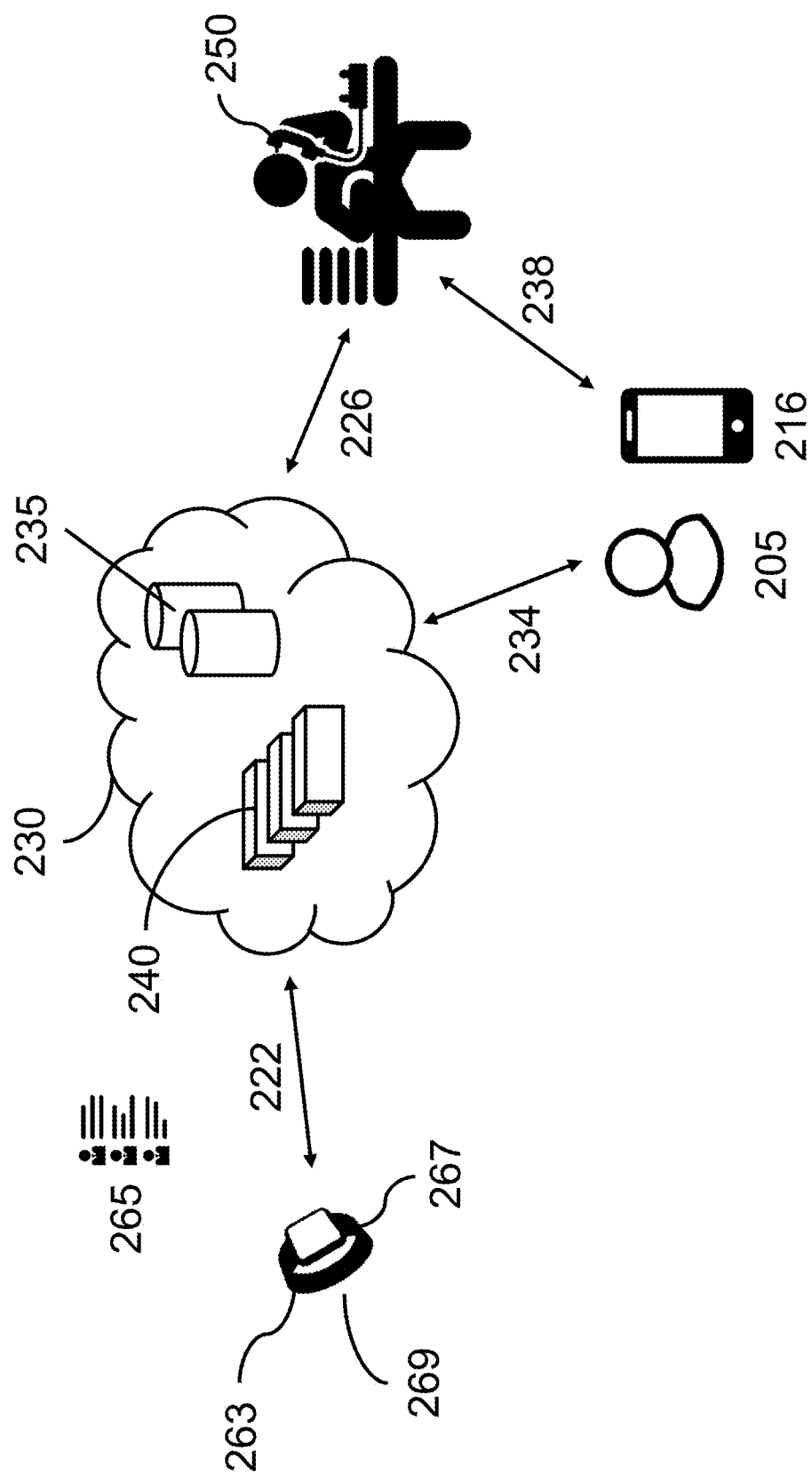
FIG. 2 depicts an embodiment of a system for managing emergency flows.

FIG. 2 also depicts an embodiment of a system for connecting with other devices after an emergency alert has been triggered. As shown, a triggering device 267 sends the emergency alert, which is a request for assistance to respond to an emergency, to the EFMS 240, which is housed in the EMS 230.

In some embodiments, the triggering device 267 includes a network component (e.g., a Wi-Fi antenna) which sends the emergency alert. In some embodiments, the emergency alert is sent via the internet, cellular network, or landline network. For example, the emergency alert may be sent via an API call (such as through the alert module depicted in FIG. 1B) over the internet to the EMS 230, or to a third-party system (e.g., a home security device could contact the security company's system), which is able to contact the EMS via an API call. In some embodiments, the alert is an SMS notification to the EMS or to the third-party system, which will contact the EMS. In some embodiments, when the data signal is strong, data API calls are used because of good data transfer rates for sending the alert quickly. In some embodiments, when the data signal is not good (e.g., low signal-to-noise ratio, high latency), SMS and/or other methods are used as a fallback option for sending the emergency alert.

In some embodiments, the emergency alert is transmitted via a land mobile radio system (LMRS) using custom signals to a third-party system, which optionally connects to the EMS. As an example, the triggering device is a two-way radio in a vehicle, which connects to another two-way radio in its vicinity to send the emergency alert. In certain embodiments, whenever a device or user is able to connect to the EMS (e.g., via an API call), the alert is optionally sent to the EMS.

In some cases, the connectivity (e.g., Wi-Fi signals) is weak or the pathways are not secure, and the emergency alert is transmitted using another communication device (e.g., a mobile phone) or a routing device (e.g., Wi-Fi router). In some embodiments, the triggering device 267 is not Internet-enabled and sends the alert through designated pathways or to designated devices (e.g., via a mobile phone connected by Bluetooth to device 267). In some embodiments, an IoT device sends the alert to a controlling or master device (e.g., a home console that connects to smoke alarms). In another example of this embodiment, the triggering device 267 is a physical "panic" button (e.g., a button under the desk of a bank teller) that is discreetly pressed in the event of a possible emergency situation and sends an emergency alert to a controlling or master device (e.g., a bank's central communication system). In some embodiments, the controlling or master device forwards the alert to an emergency service such as an EMS or EDC such as according to an emergency flow script. In some embodiments, an IoT device includes sensors that detect environmental conditions, and another device (e.g., a digital assistant, wearable, phone, etc.) evaluates if the sensed value indicates an emergency situation or likely emergency situation and sends an emergency alert. In some embodiments, the IoT devices or digital assistants on the ground detect a voice command or sense data, and the processing is done at a remote location, such as on the cloud.

In some embodiments, an emergency is detected when sensor values exceed a certain threshold or fall outside an acceptable range. In some embodiments, an emergency is detected when sensor values exceed a certain threshold (that is optionally user configurable or preset) such as for a temperature sensor, a smoke detector, a carbon dioxide detector, or a carbon monoxide detector.

In some embodiments, the triggering device 267 includes a computer program 269 for triggering the emergency flow and sending the alert. The computer program 269 preinstalled on the device or has been loaded and installed by the user (e.g., user 202, not shown). In some embodiments, the user 202 went through a setup or registration process for the device 267, where he or she has provided user data such as emergency contacts (e.g., phone numbers, email addresses, messaging IDs), user information, location (e.g., a physical address of the location of the device 267), etc. In some embodiments, user data, location data, emergency data, etc., is saved in data cache or storage in the device 267. In other embodiments, the data is saved in one or more databases 235 in the EMS, in third-party servers or in cloud-based systems. In some embodiments, the data is protected by password protection, authentication protocols for transmission, encryption, use of secured pathways, and other methods for limiting the risk of security breaches. In some embodiments, the computer program 269 includes an emergency trigger script that has been integrated into the computer program 269 and provides instructions for generating and transmitting the emergency alert, as described below. The emergency trigger script may be integrated into the computer program 269 by default or integrated into the computer program 269 as an add-on. In some embodiments, the emergency trigger script is provided by the EMS 230, such as through a web interface. In some embodiments, the emergency trigger script is an API client, wherein the API client is a set of code configured to generate a request (e.g., an API call) against an API (application programming interface).

In some embodiments, the emergency is triggered by user input such as the user interacting with the user interface 263 of the triggering device 267. In some embodiments, the user presses one or more hard or soft buttons on the user interface 263. However, other types of user interactions such as touch, tap, pattern of touches, gesture, and voice-activation are also contemplated. For example, a user in a taxicab who suspects that the cab driver does not know where he or she is going, or is intoxicated, or is attempting to abduct the user, the user may select a hard or soft button (e.g., a panic button) or a pattern of presses on the user's cell phone to discreetly trigger an emergency alert.

In some embodiments, the triggering device 267 autonomously detects emergency situations or likely emergency situations. In some embodiments, the triggering device 267 sends an alert based on autonomously detected emergencies using one or more sensors (not shown) such as, for example, a smoke alarm, thermometer, or carbon monoxide sensor in a building. In some embodiments, the sensors sense one or more environmental or health parameters. In some embodiments, the environmental parameter is selected from the group consisting of: light, motion, temperature, pressure, humidity, vibration, magnetic field, sound, smoke, carbon monoxide, radiation, hazardous chemicals, acid, base, reactive compounds, volatile organic compounds, and smog. In some embodiments, health parameters include heart rate, pulse, electric signals from the heart, blood oxygen levels, blood pressure, blood sugar level, and other health parameters. In some embodiments, the triggering device 267 is an Internet of Things (IoT) device such as a home thermostat, vehicle console, a pacemaker implant, etc. As used herein, IoT refers to the ever-growing network of physical devices, buildings, vehicles, and other objects that feature an IP address for internet network connectivity for exchanging data. In many cases, IoT devices are embedded with electronics, software, sensors, network connectivity, or a combination thereof. In some embodiments, IoT devices feature an IP address for internet connectivity. In addition to an IP address, an IoT device is optionally associated with a MAC address or an SSID. It is understood that, IoT devices are connected with one or more other devices through Bluetooth®, Wi-Fi, or other wired and/or wireless technologies which allow for transfer of data.

In some embodiments, the IoT device is in a network of sensors. As an example, IoT networks, wireless sensor networks (WSN) or wireless sensor and actuator networks (WSAN) monitor environmental parameters such as temperature, pressure, sound, etc., using a network of sensors or devices. When one sensor or device detects a sensed value outside of the identified range indicating a likely emergency, it will pass the data to other devices in the network. In some embodiments, the sensor network is a Wi-Fi, WiMAX, or LTE MESH network. In some embodiments, the sensor or IoT devices form nodes in the sensor network. In some embodiments, the sensor network includes a central node for controlling the network. In some embodiments, the sensor network has a distributed architecture to reduce the impact of a failed node.

In some embodiments, an IoT device comprises at least one of the following components including a sensing component (e.g., thermocouple), a networking component (a radio transceiver with an antenna or connection for an external antenna), a microcontroller, an electronic circuit connected to the sensing component, and an energy source. In some embodiments, the sensor network is controlled by a center console (e.g., a smart home console).

In some embodiments, the triggering device 267 is a communication device such as a mobile phone, a computer, a wearable device (e.g., a smart watch), a digital assistant, etc. In some embodiments, when the triggering device 267 is a mobile phone, the emergency alert is sent via a cellular connection, if it is available. In some embodiments, after the alert is sent to the EFMS 240 via communication link 222, the EFMS 230 initiates an emergency flow script. As a part of the emergency flow, an emergency call along two-way communication link 226 may be established (e.g., via path 702, 704A, 708 shown in FIG. 7). In some cases, communication link 222 is a data link, which optionally supports a data call such as VoIP. In some embodiments, link 222 is used for sending data such as user data, location data, emergency data, text, images, and video from the triggering device 267. In some embodiments, communication link 222 is established via landline, cellular network or the Internet. In some embodiments, the communication link 222 is through VoIP with both voice and data transmitted in the same path (e.g., in the SIP signaling, as headers or in multi-part messages). In some embodiments, the communication link 222 is an analog voice call over landline or cellular network and a data link for transferring data via Wi-Fi, cellular data, etc. Generally, data links are preferred for transmission of both voice and data whenever they are available, and the signal strength is good. In certain cases, the communication link is sent through NG911 systems, where the data is optionally sent through SIP signaling. In some embodiments, updated data (e.g., current location data) may be transmitted via link 222 and provided to the EDC 250 via link 226.

In some embodiments, the EMS 230 includes one or more databases 235 housed in one or more servers in the same or in a remote location. In some embodiments, location database 237 (not shown) houses location data regarding the location of the emergency. In some embodiments, user database 239 (not shown) houses user data and/or emergency data (such as an emergency contact list 265). In other embodiments, the location, user, and/or emergency data (such as an emergency contact list 265) are saved on a data cache 215 (not shown) in the triggering device 267 or in data storage in other devices such as mobile phone 206, computer 246, or mobile phone 216, etc. In other embodiments, the data is saved online in one or more remote servers or cloud-based systems. The location data and additional data (user data and emergency data) may be provisioned in the databases 235, 239 (not shown), or a third-party server, etc. and sent to the EDC 250 after a query has been received. In some embodiments with a standalone EFMS 240 (as depicted in FIG. 1A), databases 135 may be housed within the EFMS 240.

In some embodiments, the emergency contact list 265 is entered by the user 202 at the time of registration or installation of the computer program 269 or at another time. In some embodiments, the emergency contact list 265 is a list of phone numbers, email addresses, IP addresses, MAC addresses, or any combination thereof. In some embodiments, computing devices which are not associated with a phone number (such as computer 246, not shown) are identified by an IP address, MAC address, URLs or SSIDs.

Figure 7:
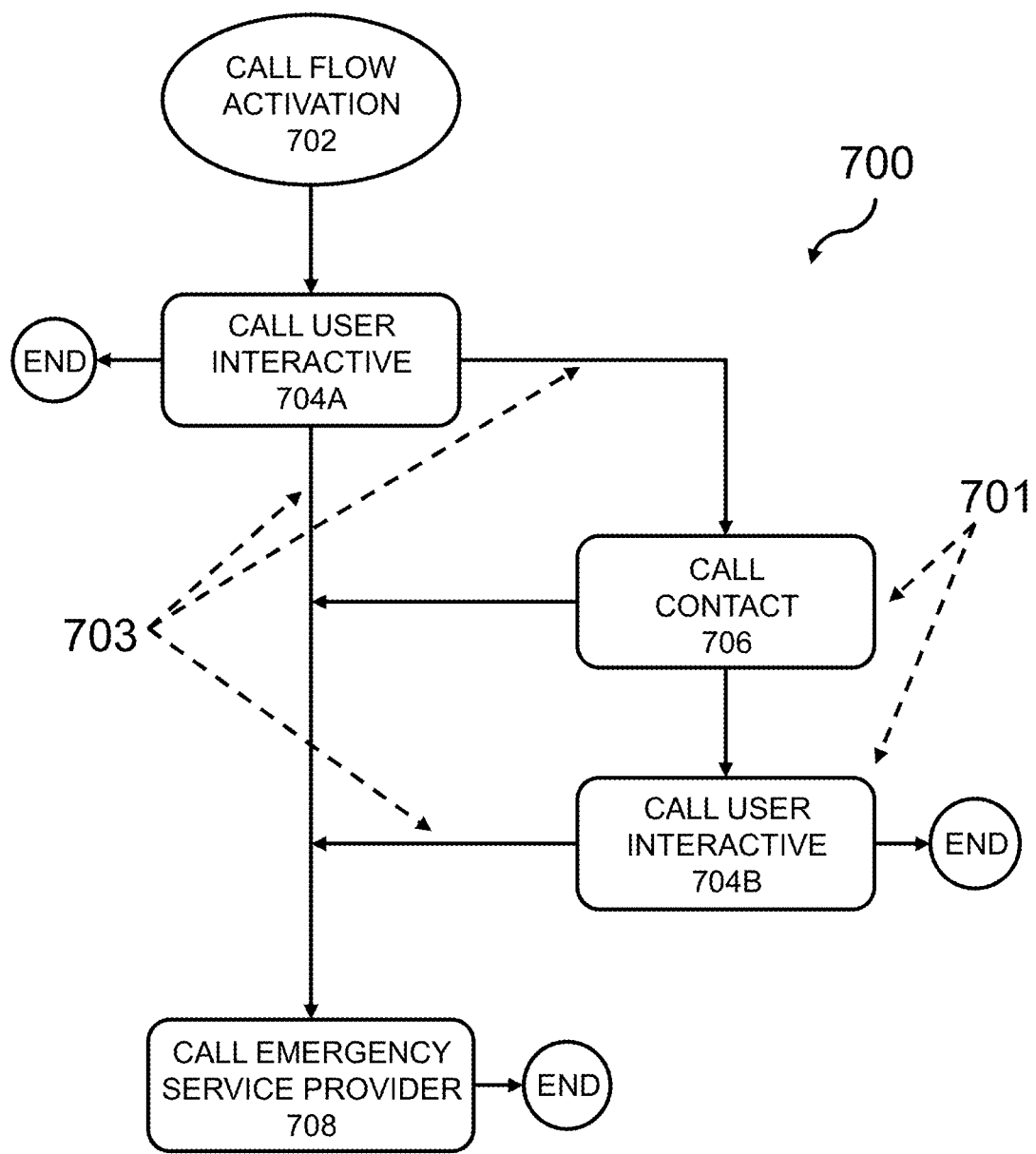
FIG. 7 illustrates an embodiment of an emergency flow.
Figure 8:
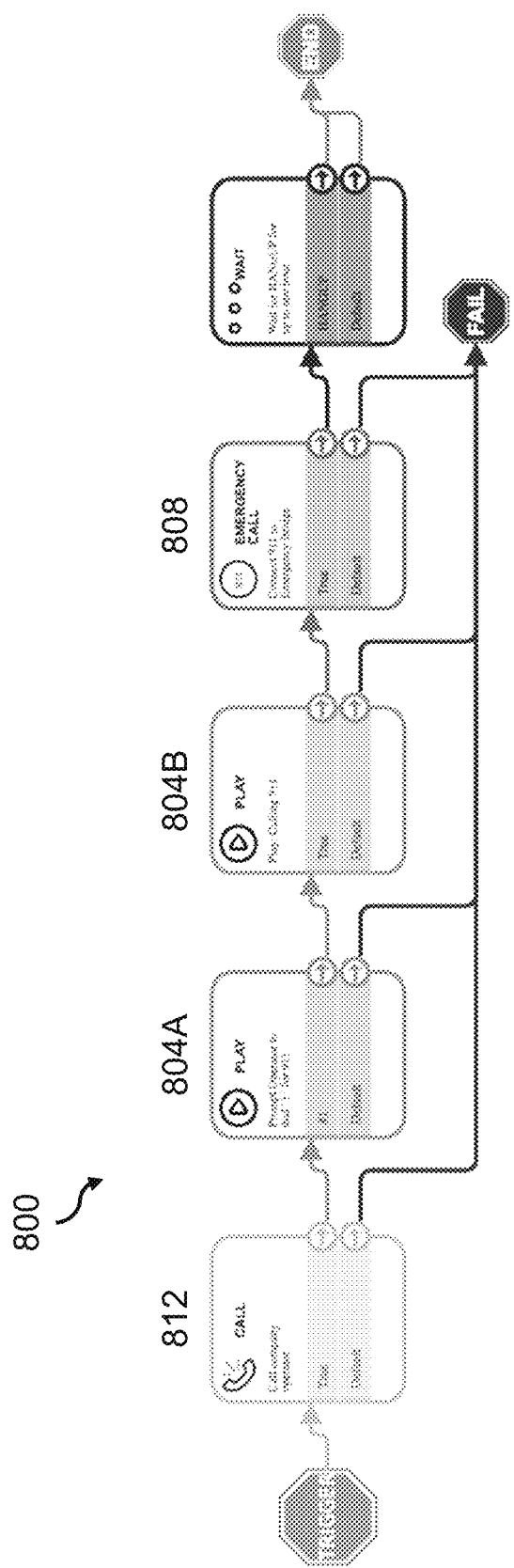
FIG. 8 illustrates an embodiment of an emergency flow.

In some embodiments, the EFMS 240 attempts to connect to a user using one or more communication links (e.g., 234) when the user has not answered the call (NA response). In some emergency flows, the EFMS 240 sends the alert indirectly to an EDC 250 (e.g., a PSAP). In some emergency flows, the EFMS 240 sends the alert to a third-party (not associated with user 202 (e.g., a corporate representative of an organization, etc.). In some emergency flows, the EFMS 240 attempts to connect to user 202 via devices associated with user 202's account such as communication device 206 (not shown) or computer 246 (not shown). In some emergency flows, the EFMS 240 optionally connects to user 205 (and other users designated as emergency contacts or frequently called contacts, etc.) via communication device 216. In some embodiments, a direct connection 238 between device 216 and dispatcher 250 is established or the user 205 is connected via the EFMS 240 via links 222 and 226. However, the EFMS 240 may send the alert to any number of recipients, separately or simultaneously, in any order (e.g., according to any emergency flow). Examples of flows are depicted in FIGS. 7 & 8.

In another configuration of an emergency flow, a mobile device (e.g., a wearable 267) is communicatively connected to a communication device (e.g., a mobile phone 206, not shown) via Bluetooth®, Wi-Fi, or other wireless communication methods. In some embodiments, the communication device 206 provides location and/or communication capabilities (e.g., whether the device is SMS, email, and/or data enabled). In some embodiments, the mobile device is Internet-enabled & Location-enabled, allowing the user to send the emergency alert triggering an emergency flow in the EFMS 240. Subsequently, the wearable device 267 optionally participates in an emergency session with EDC 250 via the communication device 206 through an indirect connection.

In some emergency flows, the communication device 206 comprises an application 208 (not shown), which may include some modules from emergency trigger program 269 on wearable 267. In some embodiments, the emergency trigger program 269 on wearable 267 is distributed between the two devices (wearable 267 and communication device 206). This provides an advantage in allowing the wearable device that is light-weight with limited functions to be used in combination with the information and capabilities of the communication device 206 for responding to an emergency. Various hardware and software capabilities of the wearable devices are contemplated.

In some scenarios, a user 202 configures emergency contacts (name, phone number), validates phone numbers, and enables the emergency flow from the communication device 206 while only sensor readings are obtained from the wearable 267 to trigger the emergency. In other embodiments, the application 208 receives an emergency alert from a device over Bluetooth. In some embodiments, the application 208 sends an emergency alert with a list of two contacts and emergency location (as reported by the phone) to the EFMS 240. The EFMS 240 may then execute an emergency flow comprising: first call contact and prompt contact to confirm emergency by pressing 1; if the call is not answered or confirmed, repeat with second contact; if someone answered and confirmed emergency, connect call to appropriate PSAP based on the provided location; and wherein each contact hears a descriptive TTS message upon answering the call.

Figure 3:
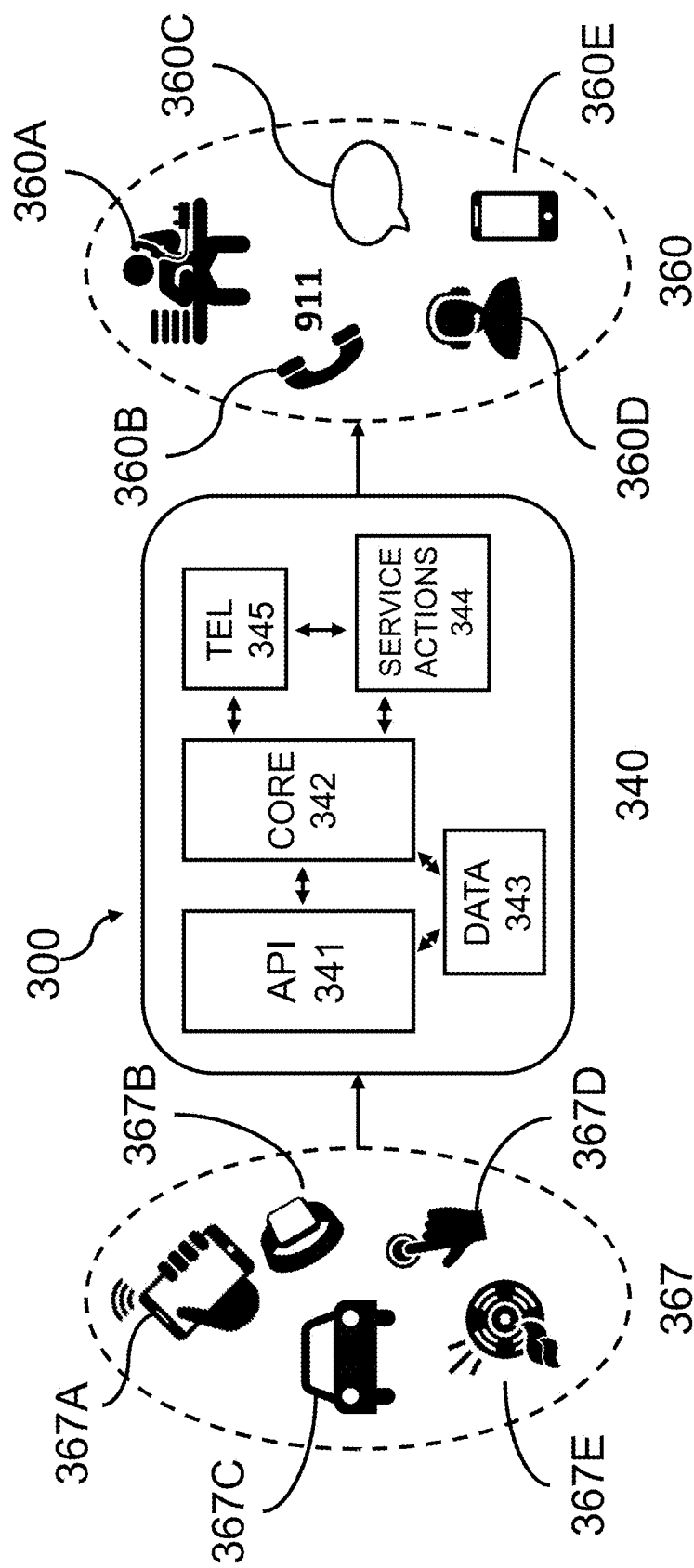
FIG. 3 depicts an embodiment of a system for managing emergency flows.

FIG. 3 depicts an embodiment of a system 300 including triggering devices 367, an Emergency Flow Management System (EFMS) 340, and output services 360. As previously mentioned, one advantage provided by the systems, servers, devices, and methods described herein is the ability to facilitate emergency response communications across devices, services, and systems managed by different parties. As will be discussed in further detail, in some embodiments, the EFMS 340 is capable of being reconfigured and customized by any individual or organization (e.g., a smartphone application developer or a wearable device manufacturer) such that the EFMS 340 can be seamlessly integrated into the devices, services, and/or systems provided by the individual or organization (hereinafter, "administrator") according to the individual or organization's specific needs. Accordingly, as shown in this embodiment, the system 300 is implemented with a variety of triggering devices 367 and a variety of output services 360.

In some embodiments, a triggering device 367 is activated and delivers an emergency alert to the EFMS 340. In some embodiments, the triggering device 367 is an electronic device associated with a user, such as a smartphone 367A (e.g., an iPhone), a wearable device 367B (e.g., an Apple Watch or FitBit tracker), or a smart home IoT device 367E (e.g., an Amazon Echo or a Nest smoke and carbon monoxide alarm). In some embodiments, the triggering device is a vehicle 367C such as a car or truck. In one example of this embodiment, the vehicle 367C includes an intelligent vehicle system capable of detecting when a component of the vehicle 367C has failed or when the vehicle 367C has been in an accident or otherwise compromised. In another example of this embodiment, the vehicle 367C includes or is otherwise communicatively coupled to a vehicle safety service that can connect the passengers of a vehicle that has been compromised with a first responder or a customer service agent (e.g., OnStar or AAA). In this example, when the vehicle 367C becomes compromised, the intelligent vehicle system can deliver an emergency alert to the vehicle safety service, which may in turn attempt to contact passengers of the vehicle 367C or send a corresponding emergency alert to another recipient (e.g., to the EFMS 340). In some embodiments, the triggering device comprises a software or hardware panic button 367D. As an example, the triggering device 367 is a physical button installed under the steering wheel of a taxi cab, so that a taxi driver who feels threatened by a passenger (e.g., a passenger with a weapon or a passenger who is being verbally abusive) may discreetly call for help. Similarly, in another example, the triggering device 367 is a digital button found in a graphical user interface of a ride sharing smartphone application (e.g., the Uber app) that a passenger may select to discreetly call for help if the passenger feels threatened by a driver of a ride sharing vehicle.

In some embodiments, the triggering device 367 is triggered via user input or automatic detection. For example, in embodiments in which the triggering device is a wearable device 367B (e.g., an Apple Watch), the wearable device 367B comprises at least one sensor such as a gyroscope, an accelerometer, and/or a heart rate monitor. In this example, if the heart rate monitor detects that the heartrate of the user is abnormal (e.g., higher or lower than average for the user, or arrhythmic), and the gyroscope and/or accelerometer detect a sudden, downward motion of the wearable device 367B (e.g., acceleration exceeds a threshold), the wearable device 367B determines that the user has potentially fallen due to a cardiac emergency and may need assistance. In response to such a determination, the wearable device 367B automatically delivers an emergency alert to the EFMS 340 without input from the user. Alternatively, in some embodiments, if a user of a wearable device 367B feels that they are experiencing or soon to experience a medical emergency, the user optionally selects a button on the wearable device 367B to manually deliver an emergency alert to the EFMS 340. Similarly, in some embodiments, a user of a smartphone 367A or wearable device 367B who is under assault or feels they will soon be under assault is able to select a button on the smartphone 367A or wearable device 367B to manually deliver an emergency alert to the EFMS 340. In some embodiments, the emergency alert is delivered to the EFMS 340 by an electronic device communicatively coupled to the triggering device. For example, in some embodiments, a wearable device coupled to a cell phone via Bluetooth generates an emergency alert that is then delivered to the EFMS by the cell phone via Wi-Fi or cellular data.

In another example, in an embodiment in which the triggering device 367 is a smart home device 367E, the smart home device optionally includes at least one sensor such as a smoke detector or carbon monoxide detector. In this example, when the smart home device 367E detects a concentration of carbon monoxide that exceeds a threshold concentration, the smart home device 367E determines that the user and or house of the user is in a state of emergency, and automatically deliver an emergency alert to the EFMS 340. In another example, when a user is experiencing an emergency, the user optionally manually prompts the smart home device 367E to deliver an emergency alert to the EFMS 340 by pressing a button on the smart home device 367E or by interacting with the smart home device 367E non-physically, such as by verbally communicating with the smart home device 367E (e.g., by saying aloud, "[name of smart home device 367E], call 9-1-1"). In another example of this embodiment, the smart home device 367B includes a video camera or optical sensor. When the video camera (and accompanying software and/or processor) or optical sensor determines the presence of an unauthorized person inside or otherwise proximal to the house of the user, in some embodiments, the smart home device 367E automatically delivers an emergency alert to the EFMS 340. Alternatively, the triggering device 367 is a non-optical device or application and is activated manually or automatically in any fashion.

In some embodiments, the EFMS 340 is configured to receive an emergency alert from a triggering device 367 and execute an emergency flow, as will be discussed in further detail below. In some embodiments, as depicted in FIG. 3, the EFMS 340 includes an API module 341, a core module 342, a data module 343, a service actions module 344, and a telephony module 345. In some embodiments, these modules interact to execute premade or customized emergency flows. In some embodiments, the emergency flows are executed according to various configurations of emergency flow building blocks, wherein the emergency flow building blocks each represent an emergency flow script that performs at least one function. In some embodiments, the various configurations of emergency flow building blocks are labeled and identified with unique emergency flow identification numbers (hereinafter, "emergency flow ID"). In some embodiments, an emergency alert delivered to the EFMS 340 from a triggering device 367 is accompanied by an emergency flow ID, which is recognized by the API module 341 to point to an associated emergency flow for execution by the EFMS 340.

In some embodiments, the EFMS 340 is configured to receive an emergency alert delivered from a triggering device 367 at the API module 341. In some embodiments, the emergency alert delivered from the triggering device 367 includes an emergency flow ID or a user identifier, such as a phone number or email address. In some embodiments, the emergency alert delivered from the triggering device 367 includes additional data. For example, in some embodiments, the emergency alert delivered from the triggering device 367 includes location data, such as a longitude and latitude coordinate pair, or a street address. The location data may include information obtained from one or more sources such as, for example, a location component (such as a GPS, not shown), Wi-Fi access points information using a Wi-Fi antenna (not shown), Bluetooth beacon data using a Bluetooth antenna (not shown), cellular trilateration using a cellular transmitter capable of supporting various technologies such as CDMA, LTE, or WiMAX, and barometric pressure using a pressure sensor to estimate altitude. In some embodiments, the emergency alert delivered from the triggering device 367 includes user data associated with a user of the triggering device 367. For example, the emergency alert delivered from the triggering device 367 is optionally accompanied by medical history data associated with a user that the user has stored on a smartphone 367A. In another example, the emergency alert delivered from the triggering device 367 is accompanied by heart rate data obtained by a wearable device 367B before or during the time that the emergency alert was delivered. In another example, the emergency alert delivered by the triggering device 367 is accompanied by driving data determined by an intelligent vehicle system integrated into a vehicle 367C, such as the speed at which the vehicle was moving before or during the time that the emergency alert was delivered.

Once the EFMS 340 receives an emergency alert (e.g., an API call generated by an emergency trigger script integrated into a computer program on a triggering device), the EFMS 340 then executes an emergency flow associated with the emergency alert (e.g., an emergency flow associated with the emergency trigger script or any data included in the emergency alert). In some embodiments, the EFMS 340 employs the API module 341 to process the emergency alert and any accompanying data (e.g., emergency flow ID, location data, or user data) and activate the core module 342 to execute one or more emergency flows. In some embodiments, before activating the core module 342, the API module must access an emergency flow database (e.g., data module 343) to identify one or more emergency flows for the EFMS 340 to execute. In some embodiments, an emergency flow script (as described above) that generates an emergency alert is directly associated with one or more emergency flows. In some embodiments, the API module 341 determines which emergency flow for the EFMS 340 to execute based on a user identifier included in the emergency alert. In some embodiments, the API module 341 determines which emergency flow for the EFMS 340 to execute based on an emergency flow ID included with the emergency alert delivered from the triggering device 367. In some embodiments, the API module 341 determines which emergency flow for the EFMS 340 to execute based on an emergency flow ID (also referred to as an emergency call flow identifier or flow identifier) and additional data included with the emergency alert. For example, in some embodiments, an emergency flow ID corresponds to multiple emergency flows (e.g., emergency flow A, emergency flow B, emergency flow C, etc.) which are optionally executed preferentially based on the assessed situation of a user. In one example of this embodiment, an emergency alert is delivered to the EFMS 340 from a wearable device 367B. In this example, the emergency alert includes emergency flow ID #123 and additional data gathered by a heart rate monitor, a gyroscope, and an accelerometer. In this example, emergency flow ID #123 corresponds to two emergency flows, emergency flow A, which includes contacting a nurse and calling 9-1-1, and emergency flow B, which includes contacting a nurse but does not include calling 9-1-1. When the additional data included in the emergency alert indicates that a user of the wearable device has merely fallen, the API module 341 optionally executes emergency flow B. However, if the additional data included in the emergency alert indicates that the user has fallen due to a cardiac emergency, the API module 341 optionally executes emergency flow A instead. In some embodiments, emergency flow A and emergency flow B are considered and/or referred to as complete definitions of an emergency flow (e.g., emergency flow ID #123 represents a template of an emergency flow that requires one or more additional inputs to complete the definition of the emergency flow; emergency flow A and emergency flow B represent complete definitions of the emergency flow corresponding to emergency flow ID #123).

In some embodiments, a particular emergency flow ID only corresponds to one particular emergency flow. In some embodiments, the triggering device 367 selects between multiple emergency flow IDs based on data collected by the triggering device 367 or provided by a user. In some other embodiments, in which an emergency alert does not include an emergency flow ID, the API module 341 selects an emergency flow to execute based on alternative factors, such as the type or brand of triggering device 367, a location of the triggering device, a weather forecast at the location of the triggering device 367, or other parameters. In some embodiments, the flow identifier (e.g., an emergency flow ID) is a flow identification number included in the emergency alert. In some embodiments, the flow identifier is included in the header, footer, message, metadata, or a combination thereof in the emergency alert. In some embodiments, the flow identifier is not a flow identification number and takes another form (e.g., device type, device name, application name, application publisher, etc.). In some embodiments, an emergency alert includes an emergency flow ID and/or an identifier of the organization (hereinafter "organization ID" or "organization identifier") that created the associated emergency flow. For example, in some embodiments, the emergency alert is an HTTP POST that includes an emergency flow ID in the payload of the HTTP POST and an organization ID associated with the organization that created the associated emergency flow in the header of the HTTP POST, as shown below. In some embodiments, after receiving an emergency alert, the API module 341 first identifies an organization using an organization ID included in the emergency alert and then references the emergency flow database (e.g., data module 343) to determine one or more emergency flows created by the organization. In some embodiments, the API module 341 then uses an emergency flow ID included in the emergency alert to select a corresponding emergency flow from the one or more emergency flows created by the organization to execute. In some embodiments, the emergency flow ID is a name of the corresponding emergency flow selected by the organization that created the emergency flow. In some embodiments, the API module 341 selects an emergency flow in response to an emergency alert from a triggering device 367 through any appropriate means regardless of the form of the flow identifier. In some embodiments, the emergency alert does not include a flow identifier. In some embodiments, the API module 341 selects a default emergency flow in response to an emergency alert that includes no additional data (e.g., no flow identifier, device location, sensor data, etc.).

An embodiment of a template of an emergency alert is shown below in the form of an HTTP POST:

```
url = "https://api-sandbox.rapidsos.com/v1/rem/trigger"
payload = [
    "callflow": "company_contacts",
    "variables": [
        "location": [
            "latitude": "",
            "longitude": "",
            "uncertainty": ""
        ],
        "user": [
            "full_name": "",
            "phone_number": ""
        ],
        "contacts": [
            [
                "full_name": "",
                "phone_number": ""        ]
        ],
    ]
```

In the foregoing template of an emergency alert, "company_contacts" is both the emergency flow ID and the name of the associated emergency flow as selected or inputted by the administrator that created the emergency flow. In this example, "location"; "user"; "contacts"; and "company" are variables required by the "company_contacts" emergency call flow. "Latitude"; "longitude"; and "uncertainty" are components of the "location" variable; "full_name"; and "phone_number" are components of the "user" variable; and "full_name" and "phone_number" are components of the "contacts" variable. In some embodiments, a value is provided in the emergency alert for each of the variables or components of a variable. In some embodiments, as described above, all variables, and components therein, defined or required by an emergency call flow are necessary for the emergency call flow to be executed by the API module 341.

In some embodiments, emergency flows are stored within a data module 343 located within or otherwise communicatively coupled to the EFMS 340. In some embodiments, the API module 341 consults the data module to determine an emergency flow to execute in response to the emergency alert. For example, in some embodiments, the emergency alert includes an emergency flow ID that corresponds to one or more emergency flows stored within the data module 343. The API module 341 then optionally references the data module 343 for an emergency flow corresponding to the emergency flow ID. In some embodiments, after receiving an emergency alert including an emergency flow ID and any accompanying additional data, the API module 341 references the data module 343 to find an emergency flow corresponding to the emergency flow ID. In some embodiments, the API module 341 then processes the emergency flow, determines any necessary inputs for the emergency flow, and verifies that the additional information included in the emergency alert includes the necessary inputs for the emergency flow. For example, a particular emergency flow may additionally require a measurement of a user's heart rate as a necessary input for the emergency flow. In this example, if the emergency alert does not include a user's heart rate (e.g., the emergency alert includes an emergency flow ID corresponding to the particular emergency flow and a location, but is missing a user's heart rate), the EFMS 340 may not be able to execute the particular emergency flow. In response, the EFMS 340 optionally declines the emergency alert or delivers a notification to the triggering device 367 informing the user that the emergency alert was incomplete. In this embodiment, when the API module 341 determines that the emergency alert does include the necessary inputs for the emergency flow, the API module 341 compiles the necessary inputs received from the emergency alert with the emergency flow to create a complete definition of the emergency flow (as discussed above) and delivers the complete definition of the emergency flow to the core module 342.

In some embodiments, the data module 343 additionally includes an emergency flow history database that records individual instances of particular emergency flow sessions. For example, in some embodiments, after the API module 341 receives an emergency alert including an emergency flow ID and activates the core module 342, the core module 342 records an entry in the emergency flow history database for the particular emergency flow session of the particular emergency flow being executed. In some embodiments, the entry is given a unique session ID or an identifier from the emergency flow history database. In some embodiments, the core module 342 records an entry in the emergency flow history database for every emergency flow session. In some embodiments, the core module 342 records an entry in the emergency flow history database for each emergency alert received by the API module 341. In some embodiments, the core module 342 records an entry in the emergency flow history database for each emergency alert received by the API module 341 that includes an emergency flow ID. In some embodiments, the core module 342 records an entry in the emergency flow history database for a particular emergency flow session of a particular emergency flow after the particular emergency flow has been fully executed. In some embodiments, the core module 342 updates an entry in the emergency flow history database for a particular emergency flow session of a particular emergency flow after each step (e.g., after each individual emergency flow building block) of the execution of the particular emergency flow, or after some steps of the execution of the particular emergency flow.

In some embodiments, after an emergency flow is executed by the EFMS 340, the core module 342 updates an entry in the emergency flow history database for a particular emergency flow session of a particular emergency flow to include additional data about the particular emergency flow session. For example, in some embodiments, the core module 342 records in the emergency flow history database data including, but not limited to: which emergency contacts were contacted, and/or which emergency contacts responded, if an EDC was contacted, if contacting an EDC was successful or unsuccessful, if a party opted to contact an EDC, or which party opted to contact an EDC. In some embodiments, after the execution of a particular emergency flow, the core module 342 updates an entry in the emergency flow history database for the particular emergency flow session of the particular emergency flow to reflect that the particular emergency flow session was successful or unsuccessful. In some embodiments, the criteria for success of a particular emergency flow are predetermined by the administrator that created the particular emergency flow. In some embodiments, the criteria for success of a particular emergency flow are predetermined by the EFMS 340.

The EFMS 340 is capable of executing many different permutations of emergency flows as disclosed herein. In some embodiments, emergency flows are defined by various emergency flow building blocks, each emergency flow building block defined by a script, written in a programming language, which contains instructions for executing various functions relating to an emergency flow. In some embodiments, the various functions are executed by the telephony module 345 and the service actions module 344, as depicted in FIG. 3.

In some embodiments, the EFMS 340 employs the service actions module 344 to execute various emergency flow building blocks that require transmitting data and communications to and from various users and output services 360 using various mediums and communication modes. For example, in some embodiments, an emergency flow includes an emergency flow building block with instructions for delivering a text message through short message service (SMS) or multimedia messaging service (MMS) or text message 360C to an account associated with a user, which is optionally executed by the service actions module 344. In another example, in some embodiments, an emergency call block requires the EFMS 340 to deliver a message to an account associated with a user through an internet enabled communication service 360E (e.g., WhatsApp, Slack, or Facebook Messenger) via an API call or HTTP post, which is optionally executed by the service actions module 344. In some embodiments, associated contacts are also contacted by a voice call (PSTN or data or VoIP call). In some embodiments, associated contacts are called, and a TTS message is played. In yet another example, in some embodiments, an emergency flow includes an emergency flow building block with instructions for delivering an audio adaptation of a text message (e.g., text-to-speech message) to an account associated with a user, which is optionally executed by the service action module 344. In yet another example, an emergency flow may include an emergency flow building block with instructions for querying a triggering device 367 or an electronic device associated with a user for a location associated with a user, which is optionally executed by the service actions module 344.

In some embodiments, the service actions module 344 includes a location service (e.g., a location API) that can be employed by the API module 341 to send or retrieve locations to and from a location database. In some embodiments, the location database is external to the EFMS. For example, in some embodiments, an emergency alert includes a location (e.g., a location generated by the triggering device or an electronic device associated with the triggering device). After receiving the emergency alert, the API module 341 can employ the location service to transmit the location included in the emergency alert to an external location database. In some embodiments, the service actions module 344 includes a voice command service that the API module 341 can employ during emergency flows to receive oral input from users. For example, in some embodiments, an emergency flow building block, such as an interactive call block, as described below, may accept voice inputs using the voice command service.

In some embodiments, the telephony module 345 is constructed using hardware components such as voice over internet protocol (VoIP) gateways and open source communication software. In some embodiments, the EFMS 340 employs the telephony module 345 to execute various emergency flow building blocks requiring communication links. For example, in some embodiments, an emergency flow includes a building block with instructions for delivering an interactive phone call to a user (e.g., an automated phone call that accepts inputs from the recipient of the call). In some embodiments, while executing the emergency flow, the core module 342 employs the telephony module 345 to execute the interactive call. In another example, in some embodiments, an emergency flow includes a building block with instructions for delivering a call to an output service 360 (e.g., an emergency dispatch center 360A, specifically a 911 call center or PSAP 360B, or a customer service representative 360D), which is optionally executed by the telephony module 345.

Figure 4:
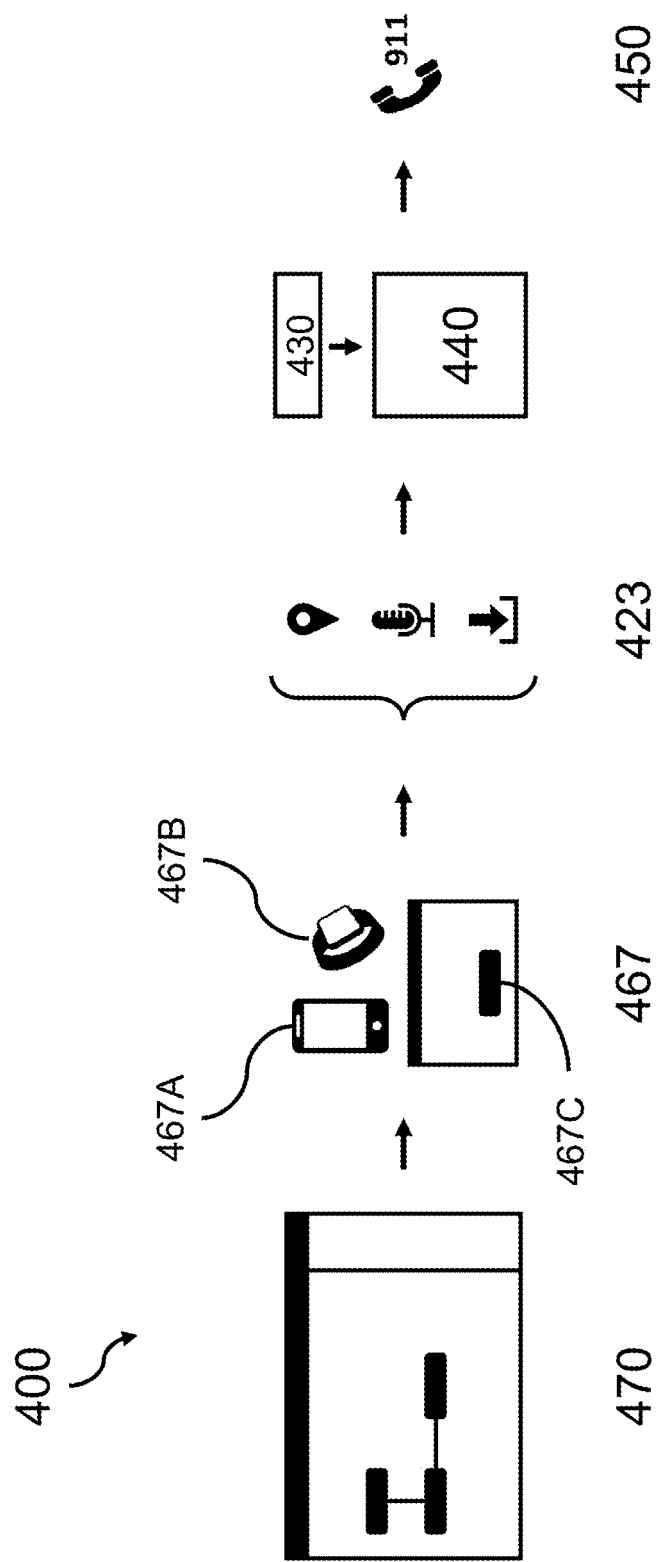
FIG. 4 depicts an embodiment of a system for developing and deploying emergency flows.

FIG. 4 depicts an embodiment of a system 400 including a graphical user interface (GUI) 470 for managing emergency flows, triggering devices 467, a pipeline 423 for delivering an emergency alert, the EFMS 440, the EMS 430, and an output service 450. Examples of triggering devices include mobile or smart phones 467A, wearables 467B, and portable computing devices 467C such as laptops or tablets. In some embodiments, the GUI 470 is a web interface (such as a website or a mobile application) from which a user can download an emergency trigger script that can be integrated into a triggering device 467. In some embodiments, the web interface is provided by the EMS 430. In other embodiments, the web interface is provided by a third-party. The web interface may provide access to one or more default or customized emergency flows. For example, the web interface may provide a default emergency flow A designed for smartwatches and a default emergency flow B designed for smart speaker devices. In such an embodiment, a user with a smartwatch could then access the web interface (e.g., on a computer or directly from the smartwatch) and select to download an emergency trigger script associated with default emergency flow A. The emergency trigger script can be downloaded in numerous forms, including, but not limited to, a block of code, an executable program, a plug-in, or a mobile application. Likewise, the emergency trigger script can be integrated into various devices and applications in different ways. For example, Amazon provides a "Skills Store" for the Amazon Alexa, a smart speaker device, where users can download new "skills" (app like programs that allow the Alexa to perform additional functions). In this example, an emergency trigger script associated with default emergency flow B may be downloaded in the form of a skill from the Alexa Skills Store.

In some embodiments, a method for managing emergency flows by an emergency management system comprises: a) providing an emergency trigger script configured to be integrated into a software application installed on an electronic device; b) receiving an emergency alert from a triggering device into which the emergency trigger script has been integrated, wherein the emergency alert is generated by the emergency trigger script in response to the triggering device detecting an indication of an emergency and comprises a user identifier and a location associated with the user identifier; c) identifying an emergency flow script associated with the emergency trigger script; and d) executing the emergency flow script associated with the emergency trigger script to provide the location associated with the user identifier to one or more recipients. In some embodiments, the emergency trigger script is provided through a web interface. In some embodiments, the emergency alert is an application programming interface (API) call. In some embodiments, the emergency flow script associated with the emergency trigger script is identified using the user identifier. In some embodiments, the emergency alert further comprises an emergency flow identifier and wherein the emergency flow script associated with the emergency trigger script is identified using the emergency flow identifier. In some embodiments, the triggering device generates the emergency alert using the emergency trigger script. In some embodiments, the emergency flow script is identified within an emergency flow database comprising two or more emergency flow scripts. In some embodiments, the emergency alert further comprises emergency data associated with the user identifier and wherein executing the emergency flow script further comprises transmitting the emergency data associated with the user identifier to the one or more recipients. In some embodiments, the method further comprises gathering emergency data associated with the user identifier from one or more databases, wherein executing the emergency flow script further comprises transmitting the emergency data associated with the user identifier to the one or more recipients. In some embodiments, executing the emergency flow script associated with the emergency trigger script comprises transmitting a text-based message to the one or more recipients. In some embodiments, the emergency flow script defines a pathway of execution of two or more emergency flow building blocks, wherein each of the two or more emergency flow building blocks comprises instructions for performing an emergency function. In some embodiments, the indication of the emergency is a selection of a soft or physical button on the triggering device by a user. In some embodiments, the indication of the emergency is a voice command detected by the triggering device. In some embodiments, the indication of the emergency is sensor data generated by a sensor communicatively coupled to the triggering device. In some embodiments, the one or more recipients comprises a call center or a public safety answering point (PSAP). In some embodiments, the emergency alert comprises a list of emergency contacts for a user associated with the triggering device. In some embodiments, the triggering device is one of a communication device, a wearable device, or an internet of things (IoT) device. In some embodiments, the method further comprises: a) retrieving emergency data associated with the emergency alert from one or more databases; and b) transmitting the emergency data to the one or more recipients.

In some embodiments, a method for managing emergency flows by an emergency management system comprises: a) receiving an emergency communication comprising a user identifier from an emergency service provider (ESP), wherein the emergency communication is indicative of an emergency; b) identifying an emergency flow script associated with the user identifier, said emergency flow script defining a pathway of execution of two or more emergency flow building blocks, wherein each of the two or more emergency flow building blocks comprises instructions for performing an emergency response function; and c) executing the emergency flow script associated with the user identifier according to the pathway of execution of the two or more emergency flow building blocks. In some embodiments, at least two emergency flow scripts are associated with the user identifier, including a main emergency flow and an auxiliary emergency flow. In some embodiments, at least two emergency flow scripts are associated with the user identifier, including a home emergency flow and a work emergency flow. In some embodiments, the ESP is a public safety answering point (PSAP). In some embodiments, the emergency communication is an application programming interface (API) call. In some embodiments, the user identifier is a phone number. In some embodiments, the method further comprises: a) providing a graphical user interface comprising a plurality of emergency flow building blocks, wherein each emergency flow building block comprises instructions for performing an emergency response function; and b) providing an interactive digital environment within which two or more emergency flow building blocks are visually assembled into the emergency flow script, wherein the emergency flow script defines a pathway of execution of the two or more emergency flow building blocks. In some embodiments, the emergency flow script is stored within an emergency flow database comprising a plurality of emergency flow scripts.

In some embodiments of the system 400, the GUI 470 is an emergency flow editor that an administrator accesses to configure an emergency flow. The emergency flow editor 470 then optionally stores the emergency flow in an emergency flow database (e.g., the data module 343 depicted in FIG. 3) and assigns the emergency flow an emergency flow ID. In some embodiments, the administrator then installs a program, application, or script (e.g., an emergency trigger script) into a triggering device 467 configured to deliver data pertaining to the emergency via pipeline 423. Non-limiting examples of the data delivered through the pipeline 423 sent by the triggering device 467 include location data, audio and/or video (streaming or a file), sensor data, emergency indication(s) (e.g., user pressed panic button for a specific type of emergency), and any user commands (e.g., command to notify certain contacts in the contact list). In some embodiments, the data is transmitted within the emergency alert including the emergency flow ID. In some embodiments, the data is transmitted before or after the emergency alert is sent via the pipeline 423 to the EFMS 440, which functions in conjunction with the EMS 430 to execute the emergency flow. In some embodiments, the emergency alert 425 (not shown) includes additional data, such as a location associated with a user, health data associated with a user, or a list of accounts associated with a user. In some embodiments, the execution of the emergency flow includes initiating communications with an output service 450, such as an EDC or PSAP.

In some embodiments, the data pertaining to the emergency is transmitted to the EDC 450 via a pipeline 424 (not marked). The data is transmitted as a part of an emergency alert or afterwards. In some embodiments, the data is provisioned in the EFMS 440, EMS 430 or a third-party server and sent to the EDC 450 in response to a query from the EDC 450.

The data transmitted through pipelines 423, 424 is optionally encrypted and sent through secure pathways to authorized recipients. Pipelines 423, 424 are contemplated to deliver location, voice, and additional data (e.g., user data, images, video feed) from device 467 to the EDC 450 in a secure and compatible format.

In one implementation of this embodiment, the administrator is a company that produces a smartwatch. The company optionally uses the emergency flow editor 470 to create an emergency flow that activates when a wearer of the smartwatch (e.g., the triggering device 467) presses a button on the smartwatch that indicates (e.g., delivers an emergency alert 425 to the EFMS 440) that the wearer is in a state of distress (e.g., the wearer of the smartwatch has fallen and is incapable of picking themselves up). When activated, the emergency flow is configured by the company to instruct the EFMS 440 to deliver an interactive call to the smartwatch (if the smartwatch is capable of receiving calls) or to a phone associated with the wearer in which the interactive call asks the wearer if they are in need of emergency assistance. The interactive call then optionally waits for a predetermined duration of time (e.g., 20 seconds) for an input from the wearer of the smartwatch (e.g., the interactive call may present the wearer with two options: press 1 for yes or * for no). If the wearer selects 1, or the predetermined duration of time expires before the wearer submits an input, the EFMS 440 then initiates a call with an EDC and connects the wearer with the EDC 450 once the EDC has accepted the call. If the wearer selects *, the EFMS 440 terminates the emergency response flow.

In another implementation of this embodiment, the administrator is a company that provides a vehicle safety service (e.g., OnStar or AAA). In this example, the company uses the emergency flow editor 470 to create an emergency flow that is automatically activated when an intelligent vehicular system (integrated with the vehicle safety service) within a vehicle detects that the vehicle has been compromised (e.g., when the vehicle has been in an accident). In this example, when the intelligent vehicular system detects that the vehicle has been compromised, the vehicle (e.g., the triggering device 467) delivers an emergency alert 425 to the EFMS 440, which executes the emergency flow. In this example, when executed, the emergency flow is configured by the company to instruct the EFMS 440 to call a customer service provider 450 (e.g., a AAA representative), call the vehicle, and bridge the calls between the vehicle and the customer service provider 450. The emergency flow also optionally provides the customer service provider 450 with an option to initiate a call with an EDC 450 (e.g., call a PSAP).

Figure 5:
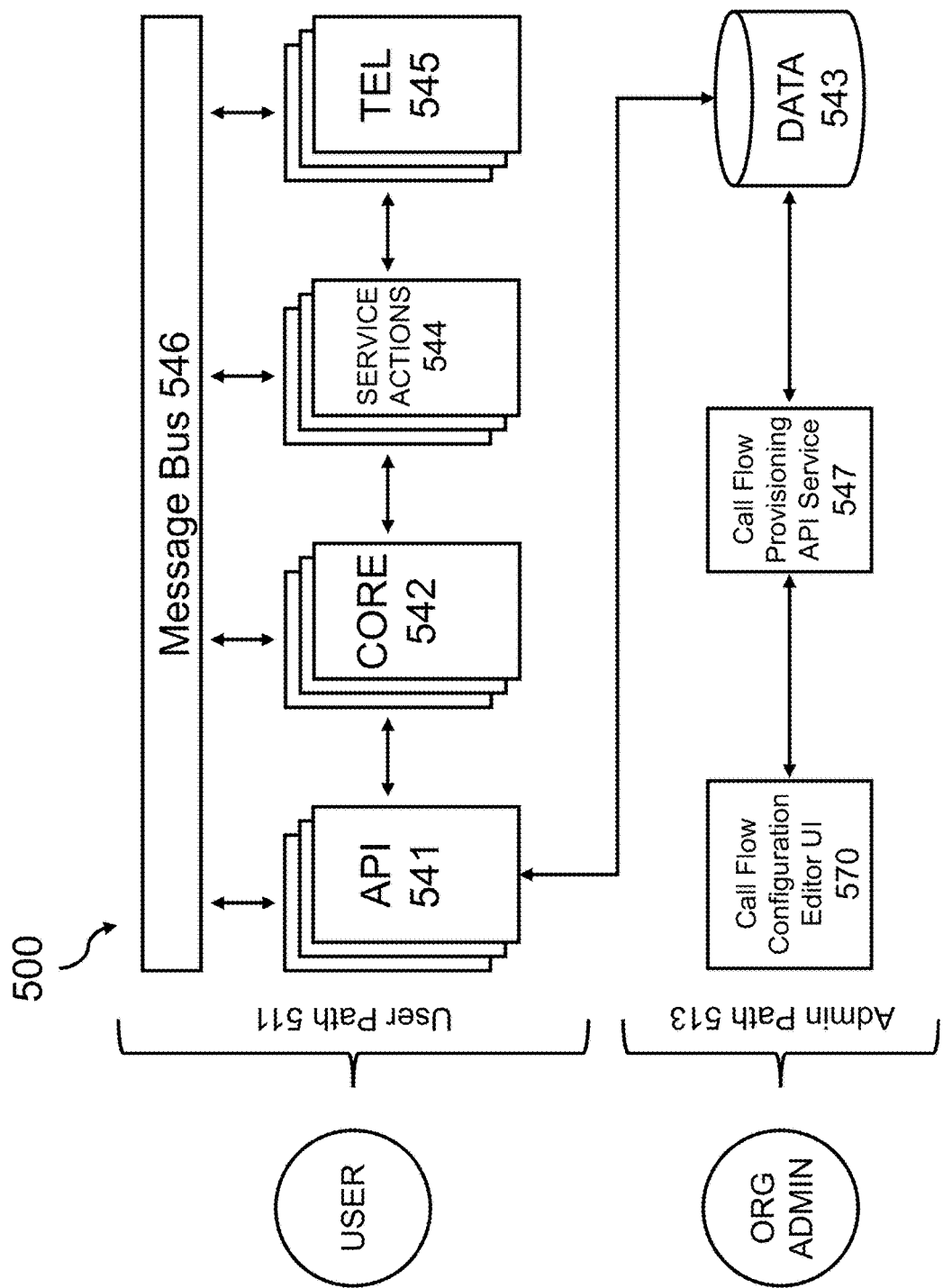
FIG. 5 depicts an embodiment of a system for developing and deploying emergency flows.

FIG. 5 depicts an embodiment of a system 500 for the creation and implementation of an emergency flow. As depicted in FIG. 5, in some embodiments, the system 500 contains two pathways: an administrator pathway 513 (admin path) and a user pathway 511 (user path). The admin path 513 is initiated by an administrator. In the admin path, the administrator accesses an emergency flow editor 570 to configure an emergency flow to fit the needs of the administrator's product or service, such as the smartwatch or vehicle described in the examples provided above with respect to FIG. 4. In some embodiments, in the admin path, an emergency flow provisioning API service 547 compiles the emergency flow, assigns an emergency flow ID to the emergency flow, and stores the emergency flow within a data module 543. The user path 511 is initiated by a user 500, or a device associated with a user, of the product or service provided by the administrator, such as the vehicle or the wearer of the smartwatch described in the examples provided above with respect to FIG. 4. In some embodiments, in the user path, the API module 541 receives an emergency alert including an emergency flow ID from a triggering device. In some embodiments, the API module 541 then references the emergency flow ID with the data module 543 to find the emergency flow corresponding to the emergency flow ID and delivers the emergency flow to the core module 542 for execution. In some embodiments, the core module 542 employs the service actions module 544 and the telephony module 545 to execute various blocks of the emergency flow. In some embodiments, the API module 541, the core module 542, the service actions module 544, and the telephony module 545 are separately and simultaneously in communication with the message bus 546, which facilitates and coordinates synchronous and asynchronous communications (e.g., a communication bridge, text messages, etc.) between the modules and various users and accounts (e.g., a user, emergency contacts, emergency responders, etc.).

The Emergency Console

Figure 6:
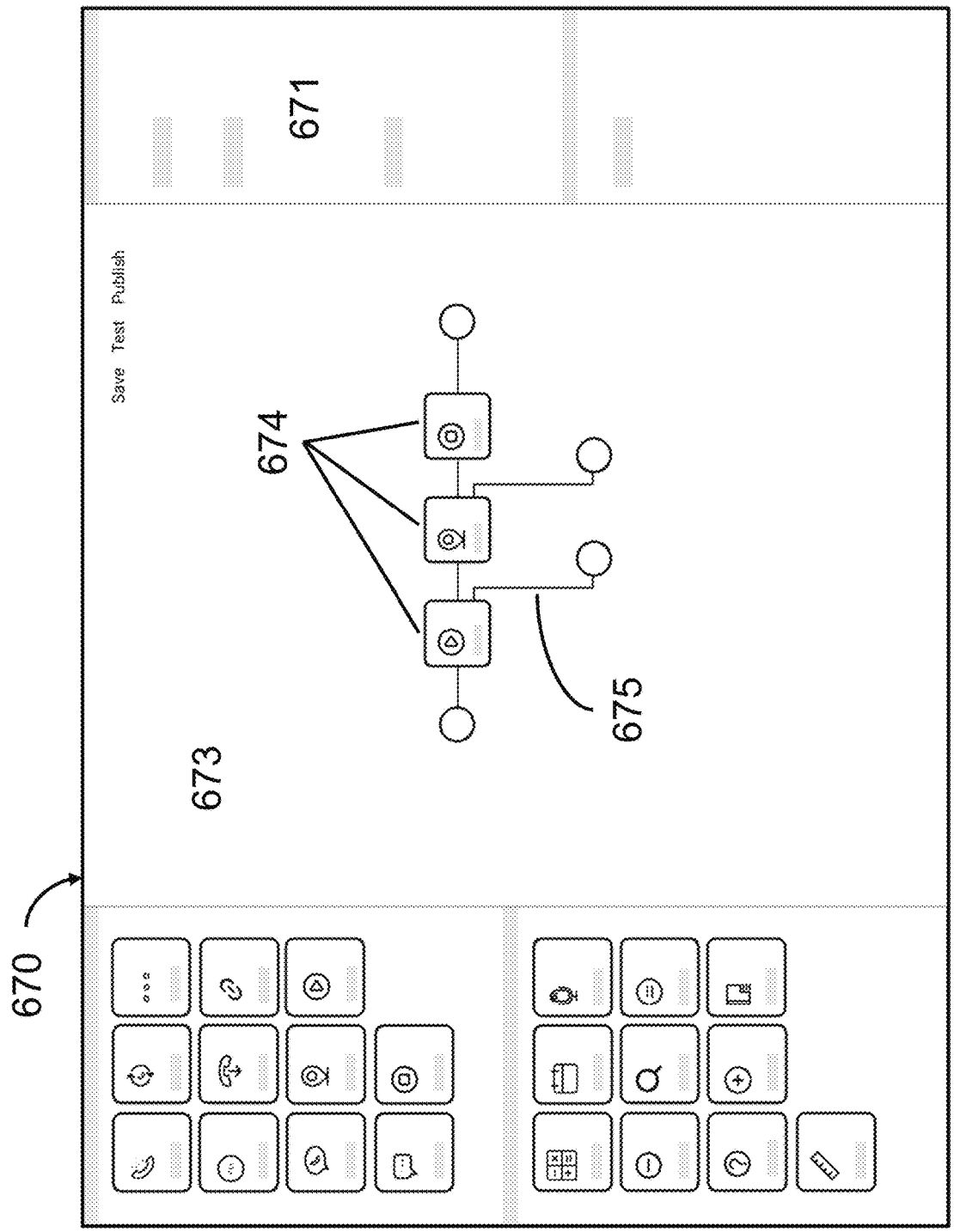
FIG. 6 shows an user interface of an application for developing and deploying emergency flows.

FIG. 6 depicts a view of an emergency flow configuration editor 670 (also referred to as the Emergency Console or an emergency flow editor). In some embodiments, the emergency flow editor 670 is used to configure customized emergency flows. In some embodiments, the emergency flow editor 670 includes a programming language input field 671 in which users manually program an emergency flow by inputting written programming commands to create a script 672 (not shown; also referred to as an "emergency flow script") that defines the emergency flow. In some embodiments, the emergency flow editor additionally or alternatively includes a graphical user interface 673 (also referred to as an "interactive space") which users can use to visually assemble emergency flows by dragging and dropping (or otherwise manipulating) graphical representations of emergency flow building blocks 674 into various arrangements. In some embodiments, an emergency flow building block is defined by a short script (e.g., a compilation or block of written programming commands), written in a programming language, that contains instructions for executing various functions (also referred to as emergency response functions) relating to an emergency flow. A single emergency flow building block generally contains instructions relating to one emergency flow function, as will be described in greater detail, and generally does not represent an entire emergency flow. In some embodiments, an arrangement of emergency flow building blocks in the graphical user interface 673 automatically results in the creation of a script 672 (e.g., an emergency flow script), which is optionally displayed in the programming language input field 671. In some embodiments, the emergency flow building block receives at least one input, performs at least one emergency response function based upon the at least one input, and generates at least one output. In some embodiments, at least one input for an emergency flow building block comprises an output received from another emergency flow building block. In some embodiments, adjacent emergency flow building blocks in an emergency flow script are connected such that an output of a preceding emergency flow building block forms an input for at least one succeeding emergency flow building block. In some embodiments, the emergency flow editor 670 includes either the programming language input field 671 or the graphical user interface 673, but not both. In some embodiments, the emergency flow editor includes both the programming language input field 671 and the graphical user interface 673. In some embodiments, the emergency flow editor 673 includes options or buttons to save, test, and publish an emergency flow. While users can use the emergency flow editor 670 to visually assemble customized emergency flows, the emergency flow editor 670 may additionally or alternatively allow users to access default or premade emergency flows provided by the emergency management system.

In some embodiments, the Emergency Console allows a variety of customizable emergency flows between users, emergency contacts, emergency services, and related third parties by establishing a multitude of voice and data connections to Public Safety Answering Points (PSAPs) through a variety of trigger mechanisms. In some embodiments, the trigger mechanisms enable implementation in a variety of scenarios including software panic buttons (e.g., within mobile applications), remote activation by associated emergency contacts, and others. The Emergency Console allows for the customization and generation of emergency flows while ensuring that the generated emergency flows comply with regulatory constraints (Federal, State or local laws, regulations, policies, best practices, etc.) applicable to the location and type of emergency. In some embodiments, the Emergency Console is a part of the EMS. In some embodiments, the Emergency Console is part of an EDC such as a PSAP. In some embodiments, the Emergency Console is operated on an emergency response server. In some embodiments, the EMS comprises an emergency response server. In some embodiments, the Emergency Console is a web interface that provides tools for generating and testing emergency flows. In some embodiments, the Emergency Console allows for emergency flows to be initiated via simple API triggers from any device.

As described above, in some embodiments, emergency flow building blocks 674 are visually arranged into an emergency flow within the graphical user interface 673 of the emergency flow editor 670. In some embodiments, the emergency flow building blocks are connected with one or more connectors 675. A single emergency flow building block may be connected to a plurality of other emergency flow building blocks preceding the single emergency flow building block and/or a plurality of other emergency flow building blocks succeeding the single emergency flow building block. For example, in emergency flow 700 (described below with regard to FIG. 7), call contact block 706 is connected to one proceeding emergency flow building block (call user interactive block 704A) and two succeeding emergency flow building blocks (call user interactive block 704B and call EDC block 708). In some embodiments, the emergency flow building blocks 674 and connectors 675 that make up an emergency flow define a pathway of execution for the emergency flow. In such embodiments, the emergency flow management system executes the emergency flow according to the pathway of execution defined by the emergency flow building blocks and connectors.

For example, referring back to emergency flow 700, after executing the call contact block 706, according to the pathway of execution defined by the emergency flow building blocks and connectors that constitute emergency flow 700, the emergency flow management system will either execute the call user interactive block 704B or execute the call EDC block 708, depending on the output of the call contact 706 block, as described below. For example, as described below, in some embodiments, a call contact block (also referred to as a "Find Next Available Contact Block") has three potential outputs: (i) contact answers the call, (ii) contact does not answer the call, and/or (iii) there are no available contacts (also referred to as an NAC response). Referring again to FIG. 7 (as described below), according to the pathway of execution defined by the emergency flow building blocks and connectors of emergency flow 700, if the output of the call contact block 706A is a contact answers the call, the emergency flow 700 continues with call EDC block 708. According to the pathway of execution, if the output of the call contact block 706 is the contact did not answer the call or there was an NAC response, the emergency flow 700 continues with call user interactive block 704B.

Emergency Flow Building Blocks

In some embodiments, the emergency flow editor 670 (e.g., the Emergency Console) contains a set of predefined emergency flow building blocks. Below is a non-exhaustive list of emergency flow building blocks that are optionally included in the set of predefined emergency flow building blocks and that may be incorporated into a customized emergency flow (e.g., customized emergency flow script).

In some embodiments, the customized emergency flow script is associated with a user identifier. In some embodiments, the customized emergency flow script is configured to account for additional user data or input. User data or input can include location information (e.g., user device location determined using GPS and/or WiFi access points), sensor data, user demographic information, health information, or other relevant data. In some embodiments, the flow script comprises one or more emergency flow building blocks configured to perform distinct emergency functions based on the user data or input. In some embodiments, the distinct emergency functions arise from a decision made within the flow script such as to decide on the path of execution of building blocks based on the user data or input. In some embodiments, when an identifier is received, it is matched with a flow script. In some embodiments, additional data is obtained including location of the user (e.g., location of the user communication device) and user data (e.g., user home and work addresses). In some embodiments, a distinct sequence of emergency functions is performed depending on the user location relative to home, work or other known locations. As an example, when a user has a fire emergency at home (e.g., based on specific emergency indication in the alert and user location compared to stored home location), the executed flow script may cause the emergency management system to notify his neighbors. Conversely, when a user who has a medical emergency at work (e.g., determined by the emergency indication in the alert and by comparing current user location to stored work address), the executed flow script may cause the user's employer to receive notification that the user had a medical emergency and will be transported to a nearby hospital. In the case when a user has a car breakdown on the freeway, the route of travel and/or recent movement/ travel speed (e.g., based on GPS signal or data from a mobile map application for the last 5 minutes) can result in the executed flow script notifying the user's insurance company and/or an associated towing service.

Alternatively or in combination, multiple emergency flow scripts may be chosen from for a single user based on the additional user data. Examples of various emergency flow scripts include a traffic emergency script, a medical emergency script, a fire emergency script, a police emergency script, a natural disaster emergency script, a home emergency script, a work emergency script, a travel emergency script, and other possible scripts.

(a) Create Emergency Bridge Block: In some embodiments, the create emergency bridge block instructs the EFMS to create a communication bridge in which one or more calls are dynamically added or removed. The communication bridge serves as a hub for various calls that are made during the execution of an emergency flow. In some embodiments, the create emergency bridge block takes no inputs and produces no outputs. In some embodiments, the create emergency bridge block is a core component included in every emergency flow. In some embodiments, the create emergency bridge block is an implied emergency flow building block (e.g., the script defining the create emergency bridge block is included in every emergency flow but the create emergency bridge block is not depicted in the graphical user interface 673).

(b) Call User Block: In some embodiments, the call user block instructs the EFMS to initiate a phone call to a phone number associated with the user associated with the triggering device and connect the phone call with a communication bridge. The input for the call user block is the phone number associated with the user. The outputs of the call user block are: (i) the user answered the phone call or (ii) the user did not answer the phone call.

(c) Play Pre-Recorded Message Block: In some embodiments, the play pre-recorded message block instructs the EFMS to play a pre-recorded audio file to one or more parties currently connected to a communication bridge. The input for the play pre-recorded message block is the name or file location of the pre-recorded audio file. The play pre-recorded message block has no output.

(d) Play TTS Message Block: In some embodiments, the play TTS (text-to-speech) message block instructs the EFMS to play an audio file adaptation of a text file to one or more parties currently connected to a communication bridge. The input for the play TTS message block is the text of the message to be converted to audio. The play TTS message block has no output.

(e) Send SMS Message Block: In some embodiments, the send SMS message block instructs the EFMS to deliver a SMS message to a user or a group of users. In some embodiments, the SMS message includes information pertaining to status of the emergency flow session. The inputs for the send SMS message block are the contents of the text message to be sent and the phone number(s) of the intended recipients of the text message. The send SMS message block has no output.

(f) Timeout Block: The timeout block instructs the EFMS to add a timeout instruction for a desired event. For example, in some embodiments, an administrator can add a timeout instruction to another emergency flow building block, such as the call user block, and specify an amount of time that the emergency flow should wait at the call user block before autonomously determining a negative outcome (e.g., in the case of the call user block, the user did not answer). The input for the timeout block is the amount of time (e.g., 1-30 seconds). The output of the timeout is a confirmed negative outcome.

(g) Location Block: In some embodiments, the location block instructs the EFMS to query or detect a location of a user. In some embodiments, the location block instructs the EFMS to parse a location database for a location. In some embodiments, the location block instructs the EFMS to communicate with a triggering device to determine the location of the triggering device. The input for the location block is an account associated with a user (e.g., a phone number of the user). The output of the location block is a location of the user.

(h) API/HTTP Request Block: In some embodiments, the API/HTTP request block instructs the EFMS to execute an API or HTTP post to an internet-based service to provide status, alerts, and notifications regarding the current emergency. The API or HTTP post may be provided by the user or included in the Emergency Console. In some embodiments, the inputs for the API/HTTP request block are a URL and any necessary parameters (named parameters included in HTTP post). In some embodiments, the outputs of the API/HTTP request block are (i) success or (ii) failure.

(i) Find Next Available Contact Block: In some embodiments, the find next available contact block instructs the EFMS to loop through a list of contacts (e.g., accounts associated with a user or emergency contacts), call each one-by-one in sequence, play an audio message to them and wait for confirmation to determine whether to call the next contact. In some embodiments, a contact can confirm readiness to speak to an EDC or emergency dispatch center by responding to the audio message (e.g., by pressing 1). In some embodiments, the call of the find next available contact block is an interactive call (as discussed below). In some embodiments, the input for the find next available contact block is a list of contacts, the list of contacts including phone numbers and names. In some embodiments, the outputs of the find next available contact block are (i) contact answers the call, (ii) contact does not answer the call, and/or (iii) there are no available contacts (also referred to as an NAC response).

(j) Interactive Call/IVR Block: In some embodiments, the interactive call/IVR (interactive voice response) block instructs the EFMS to call a phone number (e.g., an account associated with a user) and play an audio message to the recipient of the call and wait for a dial tone response (e.g., an interactive call) to determine whether the recipient of the call confirms readiness to speak to an EDC or emergency dispatch center. In some embodiments, the interactive call presents the recipient with a plurality of options to choose from (e.g., press 1 to dial 9-1-1, press 2 to call an emergency contact, press * to hang up). In some embodiments, the inputs for the interactive call/IVR block are a name and associated phone number of the intended recipient of the call and an audio message to play to the recipient. In some embodiments, the inputs for the interactive call include a plurality of options for the recipient to choose from. In some embodiments, the outputs of the interactive call/IVR block are (i) a dial tone response from the recipient (ii) the call was answered or (iii) the call was unanswered.

(k) Connect to Customer Call/Operations Center Block: In some embodiments, the connect to customer/operations center block instructs the EFMS to initiate a call with an operations center associated with the administrator. The input for the connect to customer call/operations center is a phone number of the customer call/operations center. In some embodiments, the outputs of the connect to customer call/operations center are (i) successful connection to customer call/operations center or (ii) unsuccessful connection to customer call/operations center. In some embodiments, the call of the connect to customer call/operations center block is an interactive call (as described above).

(l) Connect to 9-1-1 Block: In some embodiments, the connect to 9-1-1 block instructs the EFMS to call 9-1-1 (or another emergency response/dispatch center number), add the call to a communication bridge, and provide the EDC with a location and name of a user. The inputs for the connect to 9-1-1 block are the location of the user and the name and phone number of the user. The outputs of the connect to 9-1-1 block are (i) successful connection to 9-1-1 or (ii) unsuccessful connection to 9-1-1.

(m) Add $3^{rd}$ Party Block: In some embodiments, the add third party block instructs the EFMS to initiate a call with an additional party (e.g., an emergency contact, customer service, a suicide hotline, etc.) and add the call with the additional party to a communication bridge. The inputs for the add $3^{rd}$ party block are a name and number of a third party. The outputs of the add third party block are (i) successful connection to third party or (ii) unsuccessful connection to third party.

(n) Failsafe Block: In some embodiments, the failsafe block instructs the EFMS to detect a failure within an emergency flow and deliver a message to a user notifying the user that the emergency flow has failed. In some embodiments, the failsafe block further instructs the API to prompt the user to call 9-1-1. In some embodiments, the failsafe block is an implied emergency flow building block (e.g., the script defining the failsafe block is included in every emergency flow but the "create emergency bridge" block is not depicted in the graphical user interface 673). In some embodiments, the failsafe block is an implied additional or associated component of every emergency flow building block configured within an emergency flow. In general, the failsafe block functions to ensure that an emergency flow is at least as reliable as a traditional emergency call (e.g., calling 9-1-1 in the United States). In some embodiments, the input for the failsafe block is a failed outcome of a previous or associated emergency flow building block (e.g., the previous or associated emergency flow building block failed to execute its intended function). The failsafe block has no output.

In some embodiments, in addition to the emergency flow building blocks, the Emergency Console contains one or more utility building blocks. For example, in some embodiments, utility building blocks may perform computational or logistical functions, as opposed to emergency functions. For example, the utility building blocks may include a calculator building block configured to perform a mathematical equation on two inputs, a datetime building block configured to return the current day and time, an evaluate building configured to evaluate an expression (e.g., an algebraic expression), a compare building block configured to execute an if/then statement. In some embodiments, the utility building blocks may include increase and decrease building blocks configured to increase or decrease the value of a numerical variable, respectively.

The Emergency Console optionally contains any number of emergency flow building blocks defining any number of emergency response functions. In some embodiments, additional emergency response functions include, but are not limited to, at least one of the following: delivering a location of a user to an emergency dispatch center or database accessible by the emergency dispatch center, identifying an emergency dispatch center suitable for responding to an emergency alert based on location data associated with or received from an electronic device associated with a user, calling an emergency contact of a user for whom an emergency alert has been received, calling an associated device of the user, and obtaining sensor data from a network of sensors associated with the user or user's electronic device. In some embodiments, the Emergency Console allows administrators to edit the short script of an emergency flow building block to reprogram the building block to be more applicable to the needs of the administrator. For example, in some embodiments, the Emergency Console may contain a predefined call user block that takes a single phone number as an input. In this example, the Emergency Console optionally allows an administrator to edit the short script of the predefined call user block such that the edited call user block now takes a list of phone numbers as its input and dials each number in the list of phone numbers one-by-one in sequence until one of the numbers is successfully reached. In some embodiments, the Emergency Console allows administrators to configure any parameter of an emergency flow building block, including, but not limited to: the input, output, and emergency response function. In some embodiments, the Emergency Console allows administrators to design their own original emergency flow building blocks, such as by writing their own short script in the programming language input field 671. In some embodiments, the Emergency Console includes a shared (e.g., accessible to all administrators) library of administrator generated emergency flow building blocks.

Example Emergency Flows

In some embodiments, emergency flows are designed based on desired solutions. As an example, a simple flow is configured to initiate a direct connection between the caller and 9-1-1. In some embodiments, complex logical flows include multiple callers or call centers with tunable timing, with text-to-speech and interactive voice response (IVR) components, with SMS messaging, with rich data interchange, etc. The EFMS service is designed to be modular so that the various building blocks, such as the ones described above, can be assembled to construct an emergency flow that meets any particular emergency connectivity solution design. In some embodiments, an emergency flow may be considered as a logic tree (e.g., a series of if/then statements that progressively lead to various actions or decisions based on the outcome of the previous action or decision). The following emergency flows examples depict emergency flows constructed by an administrator within the Emergency Console.

FIG. 7 depicts a configuration of an emergency flow 700. The emergency flow 700 may be designed for a user-triggered panic button (e.g., a soft button on a mobile application, for example). FIG. 7 depicts the emergency flow 700, as it may appear in the graphical user interface 673 in some embodiments of the Emergency Console, as a configuration of emergency flow building blocks 701 and various accompanying connectors 703. In some embodiments, connectors 703 are used to define the path or sequence of execution of the emergency flow building blocks 701. In some embodiments, emergency flow 700 begins with emergency flow activation block 702. The emergency flow activation block 702 can be triggered in various ways, such as by the EFMS 340 receiving an emergency alert including an emergency flow ID corresponding to emergency flow 700 from a triggering device 367 associated with a user at the API module 341; the API module 341 referencing the emergency flow ID with the data module 343, identifying emergency flow 700 as the emergency flow corresponding to the emergency flow ID, and delivering the emergency flow 700 to the core module 342 for execution; and the core module 342 executing the emergency flow 700. In some embodiments, the emergency flow activation 702 is an emergency flow building block. In some embodiments, the emergency flow activation 702 is an implied emergency flow building block. In some embodiments, the emergency flow activation 702 is functionally equivalent to a "create emergency bridge" block, as described above.

In some embodiments, the emergency flow 700 continues with call user interactive block 704A, an interactive call/IVR block that instructs the EFMS to deliver an interactive call (as described above) to a phone number associated with a user. The interactive call optionally plays an audio message to the user and prompts the user to select one of a plurality of options. In some embodiments, the plurality of options includes connect to an EDC (e.g., "press 1 for 9-1-1) or disconnect (e.g., press * to end this call). In some embodiments, the plurality of options additionally or alternatively includes an option to deliver a message to an emergency contact associated with the user (e.g., press 2 to alert an emergency contact). In some embodiments, the option to deliver a message to an emergency contact prompts the EFMS to deliver a text message (e.g., an SMS or MMS message) to an emergency contact. In some embodiments, the interactive call/IVR block additionally includes at least one default input parameter such as a timeout criterion (e.g., user does not provide a selection before the expiration of 30 seconds), an NA response (e.g., the phone call is not answered), or a hang up response (e.g., the user answers the call but hangs up).

After the call user interactive block 704A, in some embodiments, as depicted in FIG. 7, the emergency flow 700 proceeds in one or more directions, dependent upon the output of the call user interactive block 704A (e.g., the emergency flow building blocks shown in emergency flow 700 optionally form parallel emergency flow pathways for both calling the emergency responder 708 and messaging a contact 706). In some embodiments, when the output of the call user interactive block 704A is a user command or selection to connect to an EDC, the emergency flow 700 continues with call EDC block 708. In some embodiments, when the output of the call user interactive block 704A is a user command or selection to deliver a message to an emergency contact, or the interactive call timed out (e.g., the timeout criteria was satisfied), or there was an NA response, the emergency flow 700 continues with call contact block 706. In some embodiments, when the output of the call user interactive block 704A is the user selected to disconnect, the emergency flow 700 terminates.

In some embodiments, the emergency flow 700 continues with call contact block 706, a find next available contact block (as described above) that instructs the EFMS to loop through a list of contacts associated with the user and call each one-by-one in sequence until one of the contacts answers. In some embodiments, the calls prompted by the call contact block 706 are interactive calls that play an audio message that prompts the recipients of the calls to select one of a plurality of options. In some embodiments, the plurality of options includes an option to connect to an EDC or to disconnect. In some embodiments, the call contact block 706 additionally includes a default input such as an NAC response (e.g., there are no available contacts, or all of the listed contacts have been called and none answered) or a hang up response.

After the call contact block 706, in some embodiments, as depicted in FIG. 7, the emergency flow 700 proceeds in one or more directions, dependent upon the output of the call contact block 706. In some embodiments, when the output of the call contact block 706 is a contact selected to connect to an EDC, the emergency flow 700 continues with call EDC block 708. In some embodiments, when the output of the call contact block 706 is the contact selected to disconnect or there was an NAC response, the emergency flow 700 continues with call user interactive block 704b. In some embodiments, when the output of the call contact block 706 is the contact selected to disconnect, a hang up response, or there was an NAC response, the emergency flow 700 terminates.

In some embodiments, the emergency flow 700 continues with call user interactive block 704B, an interactive call/IVR block. In some embodiments, call user interactive block 704B functions the same as call user interactive block 704A, described above. In some embodiments, the interactive call executed by call user interactive block 704B takes different inputs and produces different outputs than those of call user interactive block 704A. After the call user interactive block 704B, the emergency flow 700 proceed in one or more directions, depending upon the output of the call user interactive block 704B. In some embodiments, when the output of the call user interactive block 704B is a user command or selection to disconnect, or a hang up response, or an NA response, or the interactive call timed out, the emergency flow 700 terminates. In some embodiments, when the output of the call user interactive block 704B is the interactive call timed out or an NA response, the emergency flow 700 repeats the call contact block 706. In some embodiments, when the output of the call user interactive block 704B is a user command or selection to connect an EDC, the emergency flow 700 continues with call EDC block 708.

In some embodiments, the emergency flow 700 continues with call EDC block 708, a connect to 9-1-1 block (as described above) that instructs the EFMS to call an emergency response or emergency dispatch center. In some embodiments, once the EDC has answered the call and been added to the communication bridge, the emergency flow 700 ends. In some embodiments, after answering the call, an EDC selects an option to query the location of the user.

A section of an example of an emergency flow script corresponding to emergency flow 700 is shown below. In the example shown below, an interactive call block ([0172]-[0190]) is shown first, followed first by a "connect to 9-1-1" block ([0191]-[0198]) and then by a "find next available contact" block ([0199]-[0217]). The following example should not be considered a complete emergency flow.

Example Emergency Flow Script
states:
—name: call_user
action: INTERACTIVE_CALL
inputs:
phone_number: '${user.phone_number}'
text: >—
"This is an automated call from ${company}. If this is a real emergency,
dial one to talk to a nine one operator and receive help. If this
is a false alarm, please dial star to cancel your request for help. You
have activated the emergency feature in ${company}. Please dial one to
talk to a nine one one operator and receive help. If this is a false
alarm, please dial star to cancel your request for help. If you do not
press one for help or star to cancel, we will call your emergency
contacts and prompt them to speak to nine one one in your place. This
call will now disconnect."
on_output:
'#1@.*': user_call_911_play
'#\*@.*': user_cancelled_911
HANGUP@.*: user_hangup_sms
'false': find_available_contact
name: user_call_911_play
action: PLAY
inputs:
text: 'Now calling nine one one . . . '
phone_number: '${user.phone_number}'
on_output:
'true': user_call_911_sms
goto: fail_safe
name: find_available_contact
action: CALL_LOOP
inputs:
callee_list: contacts
text: >—
"This is an emergency call from ${company}. ${user.full_name} has
designated you as an emergency contact in the app. The user has
activated the emergency procedure, dial one to speak to a nine one one
operator closest to ${user.full_name}'s location and send help to his
exact location, or hang up to disconnect this call. If you do not dial
one to connect to a nine one one operator, we will call ${user.full_name}'s other emergency contacts if he has provided any.
This call will now disconnect."
time: 120
store: found_contact
on_output:
'#1@.*': contact_call_911_play
'false': user_call_final_911_call
goto: fail_safe In the example shown above, after the emergency flow is activated, the emergency flow begins by executing an interactive call block (e.g., call user interactive block 704A). A call is placed to {user.phone_number} (e.g., a phone number included in or associated with the emergency alert that activated the emergency call flow) and the message shown in paragraphs [0177]-[0185] is dictated to the recipient of the call as a text-to-speech (TTS) message. As shown above, if the recipient selects "1", the emergency flow continues by executing a connect to 9-1-1 block (e.g., call emergency responder block 708). If the recipient selects "*", the emergency flow ends. If the recipient does not submit a response, the emergency flow continues by executing a find next available contact block (e.g., call contact block 706).

FIG. 8 illustrates a configuration of an emergency flow 800. FIG. 8 depicts the emergency flow 800, as it may appear in the graphical user interface 673 in some embodiments of the Emergency Console, as a configuration of emergency flow building blocks and various accompanying connectors. The emergency flow 800 begins with a call operations center block 812. In this example, the call operations block 812 prompts the emergency flow management system to create an emergency bridge, call an operations center, and connect the operations center call to the emergency bridge. According to the pathway of execution defined by the emergency flow building blocks and connectors of emergency flow 800, after the call operations center block 812, the emergency flow 800 either ends with a failsafe block or continues with interactive call block 804A, depending on the output of the call operations block 812. In this example, if the output of the call operations center block 812 is a successful connection the operations center, the emergency flow 800 continues with interactive call block 804A. If the output of the call operations center block 812 is anything else (e.g., the call times out, is denied, or is otherwise unsuccessful), the emergency flow 800 ends with the failsafe block, as described above.

Continuing with interactive call block 804A, in this example, the interactive call block 804A plays an audio message to the recipient of the operations center call prompting the recipient (e.g., an operator) to press 1 to connect to 9-1-1. According to the pathway of execution for the emergency flow 800, after the interactive call block 804A, the emergency flow 800 either ends with the failsafe block or continues with interactive call block 804B, depending on the output of the interactive call block 804A. In this example, if the output of the interactive call block 804B is the audio message played successfully, the emergency flow 800 continues with a connect to 9-1-1 block 808, which prompts the emergency flow management system to call 9-1-1 and connect the 9-1-1 call to the emergency bridge. If the output of the interactive call block 804B is anything else (e.g., the call is hung up or the audio message otherwise fails to play), the emergency flow 800 ends with the failsafe block.

FIGS. 9A and 9B depict screenshots for an embodiment of an interface for managing emergency flows. FIG. 9A shows a "code view" for an emergency flow and FIG. 9B shows the "ALI display" that is shown on a PSAP display (e.g., EDC 450 in FIG. 4). In some embodiments, the Emergency Console is a web application that users (e.g., administrators) can access through an internet browser (e.g., Internet Explorer, Google Chrome). In some embodiments, the Emergency Console is a desktop application that can be accessed offline. In addition to the graphical user interface 673 (see FIG. 6) in which users can configure emergency flows, the Emergency Console may include a dashboard where users can view, test, download, and otherwise manage their emergency flows. In some embodiments, users can select emergency flows from a drop-down list, as depicted in FIG. 9. In the example depicted in FIG. 9, the selected emergency flow is called "company_contacts." In some embodiments, once an emergency flow is selected, the dashboard automatically populates with information regarding the selected emergency flow. In some embodiments, the information regarding the selected emergency flow includes user names, contact names, and associated accounts (e.g., phone numbers, email accounts). In some embodiments, after an emergency flow is selected, the Emergency Console displays data pertaining to the selected emergency flow. For example, in some embodiments, the Emergency Console displays an emergency flow history (such as from the emergency flow history database described above with respect to FIG. 3) including an entry for every individual execution of the selected emergency flow. An entry optionally includes data including, but not limited to: the day and time that the selected emergency flow was executed, what type of triggering device sent the emergency alert that triggered the execution of the selected emergency flow, an identity of the user associated with the triggering device, which contacts were contacted, if a party opted to contact an emergency responder, if an emergency responder was contacted, if contacting an emergency responder was successful or unsuccessful, which party opted to contacted an emergency responder, how long the execution of the selected emergency flow lasted, or combinations thereof. In some embodiments, the emergency flow history includes additional data pertaining to the selected emergency flow including, but not limited to: the average length of the execution of the selected emergency flow, the total number of times the selected emergency flow has been executed, the absolute number of false positives (e.g., how many times the selected emergency flow was triggered and then promptly canceled), the percentage of false positives (e.g., the absolute number of false positives divided by the total number of times the selected emergency flow has been executed), the absolute number of times and percentage that an EDC was contacted, the number of times the selected emergency flow failed, or combinations thereof.

In some embodiments, as depicted in FIGS. 9A & 9B, the dashboard includes a code example tab, an API request tab, and an ALI display tab. FIG. 9A depicts a view of a dashboard within the Emergency Console when the code example tab is selected. In some embodiments, the code example tab displays the script that defines the selected emergency flow. FIG. 9B depicts a view of a dashboard within the Emergency Console when the ALI display tab is selected. In some embodiments, a user can download an emergency trigger script from the dashboard, such as under the API request tab. In some embodiments, the ALI display tab depicts a simulation of information displayed at an emergency dispatch center (e.g., PSAP) generated by the selected emergency flow.

Authentication

In some embodiments, the EFMS authenticates requests using a short-lived OAuth 2.0 access token granted using application client credentials. The token is valid for authenticating requests to the EFMS for a temporary duration of time (e.g., one hour), after which a new token for future requests will need to be fetched. Details for retrieving and using one of these tokens are described below.

(i) Getting an Authentication Token
POST https://api-sandbox.rapidsos.com/oauth/token
Request
Headers
Content-Type: x-www-form-urlencoded
Parameters
client_id: Client ID of an application authorized to use the service
client_secret: Client secret of an application authorized to use the service
grant_type: client_credentials
Response
Fields (access_token: Short-lived OAuth 2.0 access token)

(ii) Using an Authentication Token
To authenticate requests using an access token, requests typically must include an Authorization header set to the value Bearer <ACCESS-TOKEN> where <ACCESS-TOKEN> is substituted for the retrieved access token.

(iii) Triggering/Initiating Emergency Flow
The logical entity triggering the emergency flow (e.g., a mobile application, service backend, or any connected device) will trigger the emergency flow with a single API call as described below.
POST https://api-sandbox.rapidsos.com/v1/rem/trigger
Request
Headers (Authorization: Bearer <ACCESS-TOKEN>; Content-Type: application/json); Parameters (emergency flow: The name of the emergency flow to execute; variables:

JSON Object defining any variables that you have defined and use in your emergency flow).

Response: Fields (code: Status code of the emergency flow initiation; id: Unique identifier of the instance (e.g., the particular emergency flow session) of the emergency flow execution; message: Human-readable descriptor of the emergency flow status).

Markup Language for Emergency Flows—REML (Proprietary Markup Language)

As discussed above, in some embodiments, emergency flows are defined by scripts written in a programming language. In some embodiments, the programming language used to write the scripts is the YAML (YAML Ain't Markup Language) language or a derivative thereof. In some embodiments, the programming language used to write the scripts is the RapidSOS Emergency Markup Language (REML). The REML language may be used to define a REML state machine. In some embodiments, the REML state machine may be specified by a "states" tag. Each REML state includes the following main items including name of state, description of state, action to be executed, action inputs (also referred to as arguments), variable name to store the results of the action, transitions based on the result of the action (e.g., which state to move to). An embodiment of the schema describes the syntax of a state:

name: <string>
description: <string>
action: <string>
inputs:
name1: value1
name2: value2
store: <string>
on_output:
result1: <string>
result2: <string> . . .
goto: <string>
log: <string>

Table 1 describes optional REML tags below.

TABLE 1

REML Tag

| Tag | Description |
|---|---|
| Name | Name of a state |
| Description | Nonfunctional, descriptive comment of what a state accomplishes |
| Action | Name of the action to run i this state |
| Inputs | Map of variables to provide the action as input parameters |
| Store | Name of a variable to store the result of the action |
| on_output | Map of name/values to specify the state transition |
| Goto | Specify transition (if there's no match with "on_output") |
| Log | Mostly Troubleshooting add a customer log for this state |

In addition to the current states, certain embodiments have two built-in states that can be used to stop execution of state-machine: (i)_STATE_END_: specify successful execution of state-machine; (ii)_STATE_ERROR_: specify unsuccessful execution of state-machine.

The built-in states are optionally used in various scenarios: one of the built-in states can be specified in the script; in case of an error—the system will force transition to _STATE_ERROR_; when your state-machine ends—the state-machine will automatically move to _STATE_END_.

In some embodiments, a "transition" is used for determining the "next state". In order to demonstrate a simple transition, consider the next example of a state:

name: example-state
action: PLUS
inputs: {a: 1, b: 2}
on_output:
3: _STATE_END_
goto: _STATE_ERROR_

In this example, the PLUS action is run with inputs a=1" and b=2. If the result is 3 (as expected), the transition moves to the _STATE_END_ state, otherwise the transition moves to the _STATE_ERROR_ state. This example shows that the "on_output" acts as an "if statement" for the action's result.

In some embodiments, transition from one state to another is determined by the following factors: the result of an action: REML will try to match the result of the action with one of the "on_output" entries. In case of a match—the next state; External events (e.g., while executing an action, the REML system can send events to your state-machine. During a phone-call between two users, each user can hang up the call regardless of the state. To handle such hang-up events and decide what is the next state based on the user who hung up the call, transitions are used. The same "on_output" tag may be used to handle events—just like the action=results); the "goto" tag—if there is no "on_output" match, the user can specify the "default next state" using the "goto" tag; if the user hasn't specified goto—the system will move to the next state in the list.

REML Actions

In some embodiments, there is a single action that can be executed (e.g., telephony operations, control actions, data actions) for each machine state. Non-limiting examples of telephony operations includes CALL, EMERGENCY CALL, HANGUP, PLAY, STOP_PLAYBACK. In some embodiments, EMERGENCY_CALL is an enhanced version of the "CALL" action. As an example, in some embodiments, for EMERGENCY_CALL, the Admin or designated representative must provide the location (latitude/longitude), which is optionally passed to the 911 via ALI database and SIP headers; the Admin or designated representative must provide the "caller name", which may be passed to the ALI database; specifying a destination "phone_number" is optional as the emergency-number is known ("test number" for non-production system, 911 for production). If a phone-number is provided, the system will optionally use it as an emergency number.

Non-limiting examples of inputs include: caller_name: name of caller that will be presented to 911; caller_number: phone-number of caller (will be presented to 911); longitude, latitude: location of emergency (will be presented to 911); emergency_number: optional string, the emergency number to call. In some embodiments, the default emergency-number is an answering machine.

Example: name: call_911
action: EMERGENCY_CALL
inputs: {latitude: 10.10., longitude: −20.20, caller_name="Kai",
caller_number="1234567789"}
on_output:
"true": play-message
"false": die Another REML action is FAILSAFE. A FAILSAFE action for handling different types of failures can be formulated. In some embodiments, a failure is either triggered by the system (e.g., 9-1-1 not answering) or by the emergency flow (e.g., explicitly triggered by the emergency flow author).

In some embodiments, the FAILSAFE action instructs the system to post an HTTP request to a backend system provided by the emergency flow author and then immediately terminates the session, and therefore the on_output section is not applicable and not needed.

In order to initiate a fail-safe procedure, some embodiments of the emergency flow include failsafe metadata. Two embodiments the FAILSAFE action—the minimal one and the advanced one—are described below. A minimal failsafe requires a URL and a failsafe-reason as shown below. In this minimal case, the action will trigger a POST request to the URL provided by the author and the emergency flow will be terminated. As a request-body, the system will provide the 'reason' in JSON dictionary.

In some embodiments, composite actions are formulated. Composite actions decompose into a series of smaller actions before they are executed by the EFMS. In some embodiments, individual emergency flow building blocks are defined by a single REML action. In some embodiments, individual emergency flow building blocks are defined by composite actions. INTERACTIVE_CALL and CALL_LOOP are composite actions.

In some embodiments, the INTERACTIVE_CALL action decomposes into CALL, PLAY, AND WAIT actions. In cases where a user should be called, and an audio message played to them while a DTMF tone is waited on to further the emergency flow to the next state, a composite action can be used.

In some embodiments, inputs may include: phone_number: string, the phone-number to call; playback: media-resource to play; text: Text (string) to speech; time: Time to wait in seconds after the playback has stopped.

An exemplar INTERACTIVE_CALL action is shown below.
action: INTERACTIVE_CALL
inputs: {phone_number: "${phone_number}", text: "${text}"} on_output:
"false": fail_state
"HANGUP@${phone_number}": fail_state
"#1@${phone_number}": next_state In some embodiments, the CALL_LOOP action decomposes into a list of actions that perform a loop through a list of dictionaries that each contain a phone number of a user to call. When the users are called, an audio is played to them, and they can hit a dtmf to break out of the loop. The final callee dict that is called during the loop is optionally saved in the variable given in the store parameter after the CALL_LOOP runs.

In some embodiments, REML includes some specific events to handle cases where two users are contacted simultaneously. For example, HANGUP@<phone>: a hang-up event from user; #<num>@<phone>: DTMF event from user.

In some embodiments, three players are connected in an emergency call. First, the user is called. When the user picks up the call, a message is played (e.g., "press 1 to connect . . . "). Once the user press '1', a corporate call center or representative may be called and during their call—if anyone hits '9', an emergency call is made and connected to the appropriate PSAP (based on location), so that there can be three or more participants in the conference emergency call or session.

Upstream Emergency Data Management

As described above, the emergency management system (EMS) disclosed herein is capable of gathering data related to an emergency (emergency data; e.g., locations and user data) and transmitting the emergency data to an emergency service provider (ESP; e.g., a public safety answering point (PSAP)) to aid the ESP in responding to the emergency. For example, in some embodiments, when a person calls 911 from their mobile phone, the EMS may receive an emergency alert from the mobile phone including a location of the mobile phone. The EMS can then transmit the location to the PSAP that receives the 911 call, either autonomously or by request, which the PSAP can use to more quickly and effectively respond to the caller's emergency. This process of transmitting data to an ESP can be referred to as a downstream flow of data. Typically, as described above, PSAPs and other ESPs have limited access to emergency data. For example, when a 911 call is routed to an average PSAP, the PSAP receives at most the caller's name, the caller's phone number, and a triangulated location that is only accurate to a few hundred meters, which can be practically worthless in a densely populated area. Any supplemental emergency data, such as a precise location or the caller's medical history, is therefore extremely valuable for an ESP.

However, data generated by ESPs remains a largely untapped resource. Disclosed herein are systems, servers, devices, methods, and media for receiving and utilizing emergency data from ESPs (hereinafter, "upstream data flow"). FIG. 10A depicts a diagram of an upstream data flow management process. In some embodiments, during or after an emergency, an EMS 1030 receives an emergency communication associated with the emergency from an ESP 1050. The EMS 1030 can then process the emergency communication and any emergency data included therein and determine one or more recipients 1060 to notify of the emergency or share the emergency data with or determine one or more actions to take based on the emergency communication and emergency data, as will be described in further detail below. As depicted in FIG. 10A, the one or more recipients can include, but are not limited to, emergency contacts 1060A, organizational contacts 1060B, institutions 1060C, personal and professional service providers (PSPs) 1060D, and other ESPs 1060E. In some embodiments, the EMS 1030 can use data received from an ESP 1050 to execute emergency flows (as described above), notification procedures (as described below), and enhanced ESP functionalities (as described below).

In some embodiments, an ESP 1050 transmits an emergency communication to the EMS 1030 in the form of a request for emergency data regarding an emergency, as described above. In addition to queries for emergency data, an ESP 1050 can send an emergency communication to the EMS 1030 in various other forms. For example, in some embodiments, when an ESP 1050 (e.g., a PSAP) receives an emergency call, the ESP 1050 can transmit an emergency communication to the EMS 1030 in the form of a notification, informing the EMS 1030 of the emergency call. The emergency notification may include an identifier (e.g., the phone number of the emergency caller) and any other data relevant to the call or the caller's emergency that the ESP 1030 may have access to or gathered, such as the day and time of the emergency call, the nature of the emergency, or the caller's location. In some embodiments, the emergency communication is an API call received through an API (application programming interface) provided by the EMS 1030. In some embodiments, the emergency communication is generated and transmitted to the EMS 1030 through an emergency response application executed on a computing device at the ESP 1050. In some embodiments, the emergency response application is provided by the EMS 1030, as described below. While many of the methods and processes described herein are initiated by emergency data included in emergency communications received from ESPs, it is to be understood that, in some embodiments, the methods and processes may be initiated by emergency data included in emergency communications received from any appropriate entity, such as an electronic device capable of producing and transmitting emergency data or a backend computing system capable of gathering and transmitting emergency data.

Emergency Notification System

Figure 11:
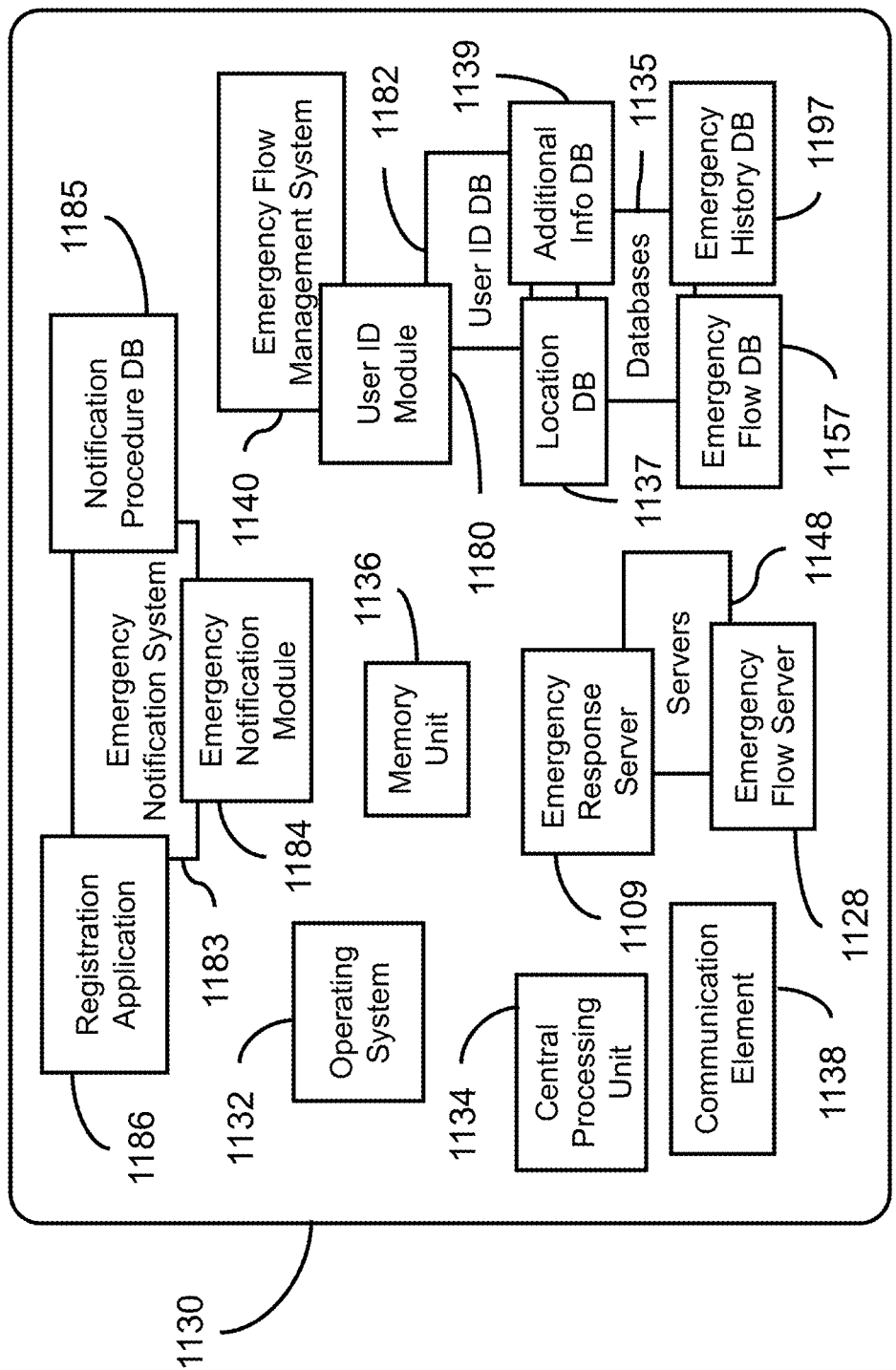
FIG. 11 depicts an embodiment of emergency management system.

FIG. 11 depicts an embodiment of the emergency management system 1130. As described above, in some embodiments, the emergency management system 1130 comprises one or more of an operating system 1132, at least one central processing unit or processor 1134, a memory unit 1136, a communication element 1138, and a server application (e.g., an emergency flow program installed on the emergency flow server 1128). In some embodiments, the emergency management system 1130 comprises one or more databases 1135 (e.g., location database 1137, an additional information database 1139, emergency flow database 1157, user identification database 1182, notification procedure database 1185, and/or emergency history database 1197). In some embodiments, the emergency management system 1130 may include one or more servers 1148. In some embodiments, an emergency response server 1109 executes an emergency flow when an emergency or emergency-like situation is triggered. In some embodiments, the emergency management system 1130 comprises at least one of a location database 1137 and an additional information database 1139.

In some embodiments, the emergency flow program comprises at least one software module (not shown) for carrying out one or more instructions. In some embodiments, the emergency management system 1130 houses components of the emergency flow management system (EFMS), as described above. In some embodiments, the emergency management system 1130 comprises an application for assembling and/or configuring emergency flow scripts. In some embodiments, the emergency management system 1130 comprises an application for managing an emergency response to an emergency alert including execution of an emergency flow script. In some embodiments, the emergency management system additionally or alternatively includes the components of an emergency notification system (ENS) 1183. In some embodiments, the emergency notification system includes an emergency notification module 1184 and a notification procedure database 1185. In some embodiments, the notification procedure database 1185 is configured to store one or more notification procedures. A notification procedure includes instructions to contact one or more contacts in the event of an emergency. In some embodiments, a notification procedure includes a prioritized list of emergency contacts. In some embodiments, the notification procedure includes contact information for an organizational contact. In some embodiments, notification procedures are associated with one or more user identifiers in the notification procedure database 1185. In some embodiments, a notification procedure includes an emergency flow identifier. In some embodiments, when the EMS receives an emergency communication including a user identifier from an emergency service provider, the emergency notification module 1184 is configured to identify a notification procedure associated with the user identifier from within the notification procedure database and execute the notification procedure. In some embodiments, the emergency notification module 1184 is configured to employ the emergency flow management system 1140 in order to execute the notification procedure (e.g., if the notification procedure includes an emergency flow identifier).

FIG. 12 depicts a system for receiving emergency communications from ESPs. In some embodiments, the system includes an emergency management system 1230, an emergency service provider 1250, and a communication device 1267. In some embodiments, as depicted in FIG. 12, the emergency management system 1230 includes one or more databases 1235, an emergency flow management system 1240 (as described above), and a user identification module 1280. As described above, in some embodiments, the user identification module 1280 associates user identifiers (e.g., phone numbers or email addresses) with notification procedures or emergency flows and stores the user identifiers in a user identification database. In some embodiments, as will be described in greater detail below, an emergency service provider 1250 sends an emergency communication in the form of a query for emergency information regarding an emergency to the emergency management system 1230 after receiving an emergency call from a communication device 1267. In some embodiments, the query includes a user identifier, which the emergency management system 1230 uses to identify a notification procedure or an emergency flow associated with the user identifier. In some embodiments, if the emergency management system identifies a notification procedure or emergency flow associated with the user identifier, the emergency management system can then execute the notification procedure or emergency flow associated with the user identifier. The EMS 1230 may additionally receive emergency data from the communication device 1267 or transmit an emergency communication to the communication device 1267, such as a notification that the notification procedure or emergency flow has been executed.

In some embodiments, notification procedures may define pathways of execution, similar to emergency flows described above. In some embodiments, the pathway of execution of a notification procedure is at least partly dependent upon input from a recipient of the notification procedure. For example, in some embodiments, a notification procedure includes a list of emergency contacts and dictates an order of contacting the emergency contacts, and only proceeds to the next contact on the list if the previous contact did not provide confirmation of receipt of the notification. In some embodiments, more highly customizable emergency flows can be used for responding to emergency or likely emergency situations. For example, default or customized emergency flow scripts provided by the EMS through an emergency flow management system (as described above) allow various functionality (e.g., a social media platform would like to get assistance for a possible suicidal user). For such situations, building and executing emergency flows can provide superior capabilities (e.g., three-way conference bridge for emergency calling). Table 2 depicts input data including account information (e.g. user information), associated contacts (or other optional inputs needed to implement the specific flow) and flow parameters (flow identifier or flow ID).

TABLE 2

Account Data with Flow Information

| User Parameters | | | Associated Contacts | | | | | Flow Parameters | |
|---|---|---|---|---|---|---|---|---|---|
| User Phone Number/ Acct ID | User Name | Sec- ondary User Contact | Contact Name1 | Contact Num1 | Contact Name2 | Contact Num2 | Work Safety Line | Flow ID(s) | User Consent |
| 410-234-5555 | Jane Doe | 410-234-6666 | John Doe | 410-234-7878 | Aunt Flo | 410-234-8989 | 678-234-5555 | (1) Doe_family_emergency (main flow) (2) Fleet_Co_emergency (work flow) | Share location & additional data with John Doe; Fleet Co. notified if emergency is initiated in a fleet vehicle |

On the other hand, simple notification procedures for notifying emergency contacts are also contemplated. In some cases, there is no need for significant customization and a simple notification procedure is sufficient to respond to the emergency (e.g., notifying emergency contacts when the user has been in a vehicular crash). Table 3 depicts an embodiment of input data including account information (e.g., user information), emergency contacts (or other optional inputs needed to implement the specific flow) and flow parameters (flow identifier or flow ID).

TABLE 3

Account Data with Emergency Notification System

| User Parameters | | | Emergency Contacts | | | | Notification Procedure | | |
|---|---|---|---|---|---|---|---|---|---|
| User Phone Number/ Acct ID | User Name | Alternate Contact | Em. Contact1 | Em. Contact2 | Org. Contact1 | Org. Contact2 | Not. Meth.1 | Not. Meth.2 | Proxy Calling |
| 410-234-5555 | Jane Doe | 410-234-6666 | 410-234-7878 | 410-234-8989 | 678-234-5555 | 678-234-0000 | SMS | Email | Not Allowed |

In an alternate embodiment, a notification procedure can call one or more emergency flows to be implemented combining the advantages of both systems. For example, there may be a simple notification procedure to notify family members (e.g., see the John Doe example), but a customizable emergency flow for getting emergency assistance at a hazardous chemical site.

In one example of a notification procedure, referring back to John Doe described above with respect to FIG. 1B, John Doe, whose user identifier is a phone number (123) 456-7890, may have a notification procedure created for him that includes his family as emergency contacts. The emergency contacts may be arranged in a prioritized list beginning with his wife, followed by his oldest child, and finally ending with his youngest child. The notification procedure includes contact information (e.g., phone numbers) for each of the emergency contacts. The notification may additionally or alternatively include contact information for an organizational contact for Wells Fargo, John's employer. Thus, in this example, if an emergency service provider sends a query to the emergency management system for emergency information regarding the phone number (123) 456-7890 (for example, in response to John calling 9-1-1 from his cell phone), the emergency notification system can identify the notification procedure associated with the phone number (123) 456-7890 in the notification procedure database and execute the notification procedure by attempting to contact John's emergency contacts (his family), organizational contact (Wells Fargo), or both. In this example, the emergency notification system first notifies Wells Fargo and John's wife simultaneously before attempting to contact John's children.

In some embodiments, the emergency management system executes a notification procedure by transmitting a notification message to an account associated with one or more contacts. In some embodiments, the notification message is an SMS text message or a message in an internet-based messaging service, such as WhatsApp. In some embodiments, the message is an email. In some embodiments, the message includes one or more of the user identifier, a name associated with the user identifier, and a location (e.g., a location associated with the user identifier). In some embodiments, the notification message additionally or alternatively includes emergency information, data, or multimedia associated with the user identifier. For example, in some embodiments, after the emergency management system receives a query including a user identifier from an emergency service provider, in addition to identifying an executing a notification procedure associated with the user identifier, the emergency management system can query an emergency database using the user identifier (or any other identifier associated with the user identifier) to find any available emergency information, data, or multimedia associated with the user identifier. For example, in some embodiments, the emergency management system queries an emergency database (e.g., a location information server (LIS)) for a location (e.g., a current location) associated with the user identifier. If a location is found, the emergency notification system can then include the location in a notification message sent to a contact according to the notification procedure.

In some embodiments, the emergency notification system includes a registration application through which users can submit user identifiers and select or define notification procedures to be associated with the user identifiers. For example, the registration application may be a mobile or web application that provides a graphical user interface that users can access on personal electronic devices such as laptops and mobile phones. In some embodiments, through the registration application, users can select a standard notification procedure from a plurality of standard notification procedures provided by the registration application to be associated with one or more user identifiers. For example, in some embodiments, a standard notification procedure provided by the registration application is sending a message simultaneously to every contact listed on a list of contacts notifying the contacts that a potential emergency has occurred (hereinafter, "standard notification procedure 1"). In another example, a standard notification procedure provided by the registration application is sending a message including a location to every contact listed on a list of contacts notifying the contacts that a potential emergency has occurred and the location of the potential emergency (hereinafter, "standard notification procedure 2"). In another example, a standard notification procedure provided by the registration application includes emergency flow ID that prompts the emergency flow management system to execute an emergency flow in which emergency contacts listed on a prioritized list of emergency contacts are called one by one until one or the emergency contacts answers and selects to connect to 9-1-1 (hereinafter, "standard notification procedure 3"). In one example of such an embodiment, referring again to John Doe, John can access the registration and, through the graphical user interface, submit his user identifier (phone number (123) 456-7890) and select between standard notification procedure 1, 2, and 3 to be associated with his user identifier. In this example, John selects standard notification procedure 2 and submits his list of prioritized emergency contacts, as described above. Thus, in this example, if John calls 9-1-1 and reaches a public safety answering point (PSAP), and the PSAP queries the emergency management system for emergency information regarding John's user identifier (phone number (123) 456-7890), the emergency notification system can identify that John's phone number has been associated with standard notification procedure 2 and automatically execute standard notification procedure 2, notifying each of his emergency contacts (his wife and two children) that John has been involved in a potential emergency and providing a location of the potential emergency.

In some embodiments, through the registration application, users can define customized notification procedures. For example, in some embodiments, a user can access the registration application and submit a user identifier. The user can then define a customized notification procedure by submitting one or more contacts and then selecting when and how each of the one or more contacts is notified when the notification procedure is executed by the emergency notification system. For example, referring back to John Doe, John may submit his phone number ((123) 456-7890) as his user identifier and then submit his wife and two children as contacts. Then, in this example, John selects the first step of his customized notification procedure to be calling his wife. He selects to end the notification procedure if the call to his wife is answered. He then selects the second step of his customized notification procedure to be simultaneously delivering an SMS text message including his location to his wife and two children if and only if the call to his wife is unanswered.

In some embodiments, a user may access the registration application and submit multiple user identifiers to be associated with one or more notification procedures. In some embodiments, a user can submit two or more user identifiers to be defined as a group within the emergency notification system. For example, referring again to John Doe, John can access the registration application and submit user identifiers (e.g., phone numbers) for himself, his wife, and both of his two children as a group, which the registration application can then associate within the emergency notification system. In some embodiments, the registration application provides a standard notification procedure for groups of user identifiers submitted through the registration application. For example, in some embodiments, if John submits a group of user identifiers for his family, the registration application can automatically associate a standard notification procedure with the user identifiers. In some embodiments, the standard notification procedure for a group of user identifiers is to notify each other member of the group when the emergency management system receives a query including one of the user identifiers from the group of user identifiers from an emergency service provider. For example, if an emergency service provider sends a query including the user identifier of John's youngest child, the emergency notification system executes the notification procedure by sending a notification message to John, John's wife, and John's older child simultaneously. In some embodiments, as mentioned above, a single user identifier can be associated with multiple notification procedures. For example, in some embodiments, just as John may submit user identifiers for his nuclear family (wife and two children) as a group through the registration application, John's mother may submit user identifiers for her nuclear family, including John, naturally. In this example, John's user identifier is therefore associated with two separate groups and thus associated with two different notification procedures. Or, for example, in some embodiments, an organization may access the registration application and submit user identifiers to be associated with a notification procedure associated with the organization. For example, Wells Fargo (e.g., a Wells Fargo employee) may access the registration application and submit a plurality of user identifiers, including John's user identifier (phone number (123) 456-7890), to be associated with Wells Fargo's notification procedure. Thus, for example, John's user identifier could be associated with a third notification procedure. If the emergency management system receives a query including John's user identifier from an emergency service provider (e.g., a PSAP), the emergency notification system can simultaneously execute all three notification procedures associated with John's user identifier (as well as any other notification procedures associated with John's user identifier), thereby notifying members of John's nuclear family, John's mother's nuclear family, and Wells Fargo.

FIG. 13A and FIG. 13B depict embodiments of systems for managing emergency flows and notifications. As depicted in FIG. 13A, in some embodiments, an emergency call (e.g., 9-1-1) is dialed from a communication device 1367 and received by an emergency service provider 1350

(e.g., a PSAP). The emergency service provider 1350 can then send an emergency communication (e.g., a query for emergency data) including the phone number (e.g., the user identifier) from which the emergency call was dialed to the emergency management system 1330. The emergency management system 1330 then queries one or more databases (e.g., a user identification database) to determine if the phone number has been associated with an emergency flow. If the phone number has been associated with an emergency flow, the emergency management system 1330 then employs the emergency flow management system 1340 to execute the emergency flow associated with the phone number, as described above. As depicted in FIG. 13B, in some embodiments, an emergency call (e.g., 9-1-1) is dialed from a communication device 1367 and received by an emergency service provider 1350 (e.g., a PSAP). The emergency service provider 1350 can then send an emergency communication (e.g., a query for emergency data) including the phone number (e.g., the user identifier) from which the emergency was dialed to the emergency management system 1330. The emergency management system can then send a query to one or more database (e.g., a user identification database) to determine if the phone number has been associated with a notification procedure. If the phone number has been associated with a notification procedure, the emergency management system 1330 then employs the emergency notification system 1383 to execute the notification procedure associated with the phone number. Although the emergency response and management processes disclosed herein are often initiated by an emergency call, it is contemplated that an emergency response and management processes may be initiated by any other form of a request for emergency service, such as a text message or a digital notification.

Figure 14A:
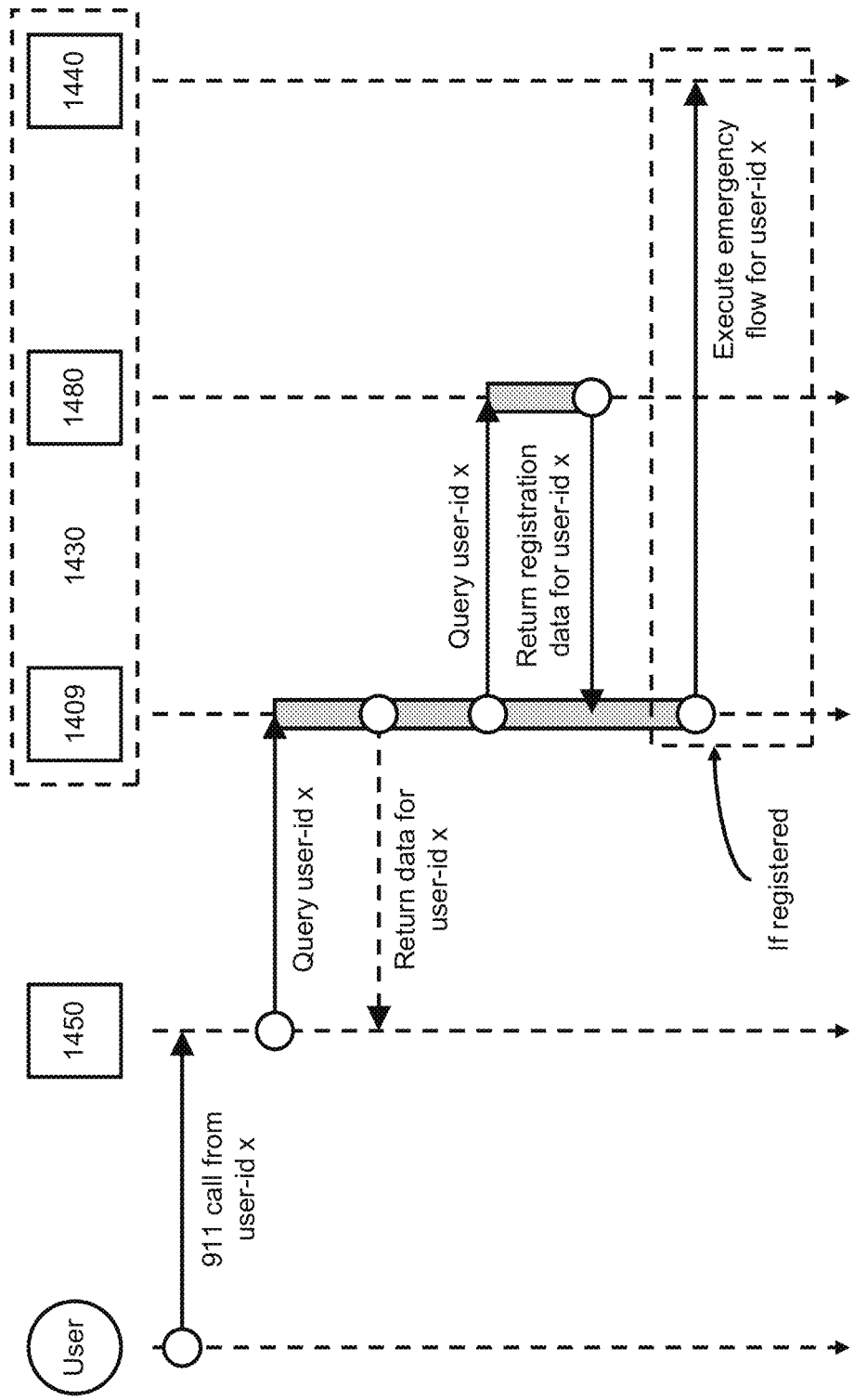
FIG. 14A and FIG. 14B illustrate embodiments of a process for managing emergency flows and notifications.
Figure 14B:
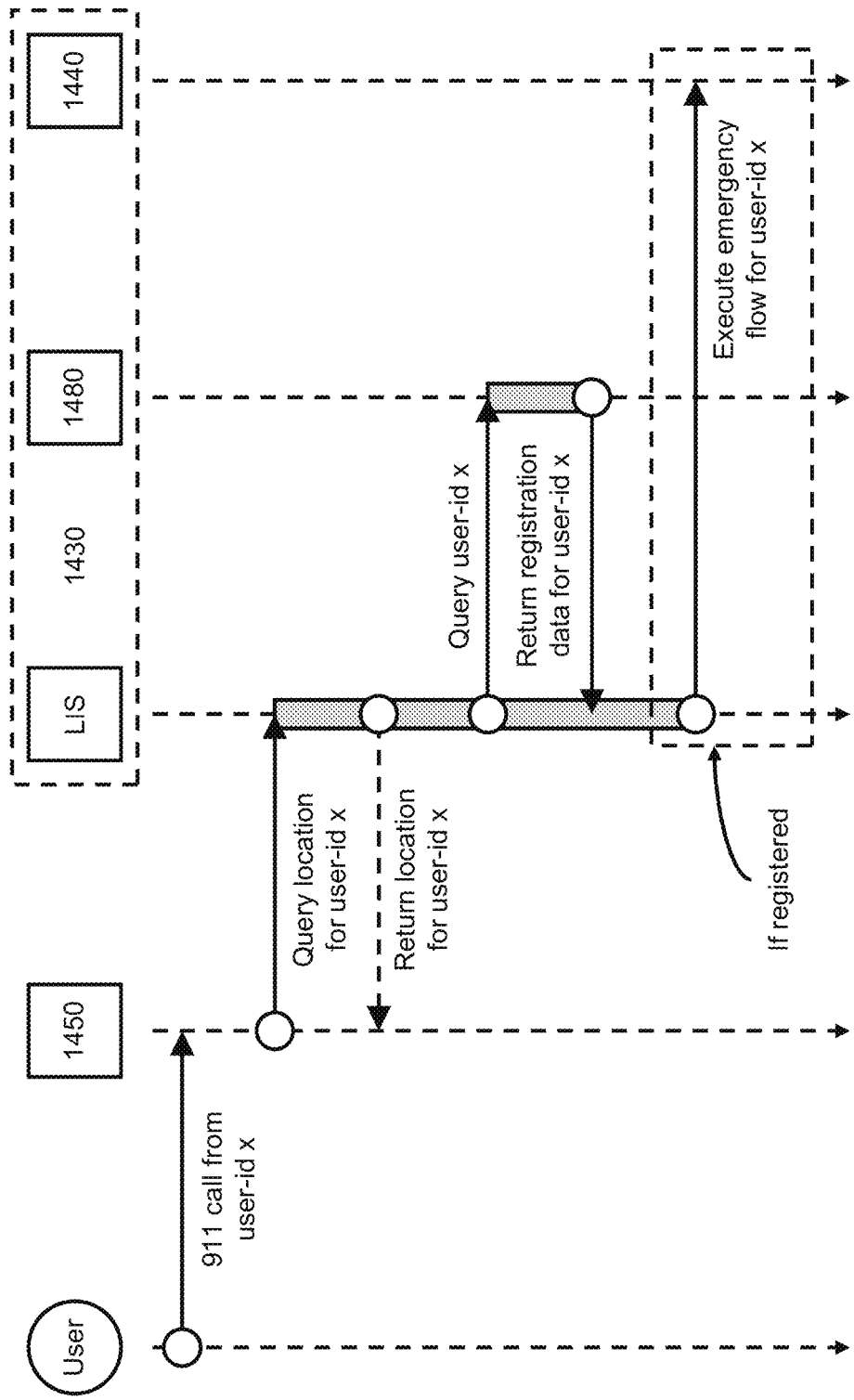

FIG. 14A and FIG. 14B illustrate embodiments of a method for managing emergency flows and notifications. As depicted in FIG. 14A, in some embodiments, an emergency management system (EMS) 1430 for responding to emergencies includes an emergency response server (ERS) 1409, a user identification module 1480, and an emergency flow management system (EFMS) 1440. In some embodiments, as depicted in FIG. 14A, when a user dials an emergency call (e.g., 9-1-1) from a communication device, the emergency call is received by an emergency service provider (e.g., PSAP 1450) with a user identifier (such as a phone number of the communication device from which the emergency call was dialed). The emergency service provider can then send an emergency communication (e.g., a query for emergency data) including the user identifier to the EMS 1430. In some embodiments, as depicted in FIG. 14A, the emergency communication is received by the ERS 1409. In some embodiments, as depicted in FIG. 14A, in response to receiving the emergency communication, the EMS 1430 searches one or more databases for emergency data or emergency information associated with the user identifier and returns the emergency data or emergency information to the emergency service provider 1450, such as through the ERS 1409. In some embodiments, after receiving the emergency communication including the user identifier from the emergency service provider at the ERS 1409, the EMS 1430 then employs the user identification module 1480 to determine if the user identifier has been associated with an emergency flow (as discussed above), such as within a user identification database. If the user identifier has been associated with an emergency flow (e.g., if registered), the user identification module 1480 can return an emergency flow identifier associated with the user identifier to the ERS 1409, which in turn transmits the emergency flow identifier to the EFMS 1440 for execution. The EFMS 1440 can then execute the emergency flow associated with the user identifier.

As depicted in FIG. 14B, in some embodiments, the EMS 1430 includes a location information server (LIS), a user identification module 1480, and an emergency flow management system (EFMS) 1440. In some embodiments, as depicted in FIG. 14B, when a user dials an emergency call (e.g., 9-1-1) from a communication device, the emergency call is received by an emergency service provider (e.g., PSAP 1450) with a user identifier (such as a phone number of the communication device from which the emergency call was dialed). The emergency service provider can then send a location query (e.g., an emergency communication) including the user identifier to the EMS 1430. In some embodiments, the location query is received by the EMS 1430 at the location information server (LIS). In some embodiments, in response to receiving the location query, the LIS searches one or more databases for a location associated with the user identifier. If a location associated with the user identifier is found, the LIS returns the location to the emergency service provider. In some embodiments, after receiving the location query including the user identifier at the LIS, the EMS 1430 then employs the user identification module 1480 to determine if the user identifier has been associated with an emergency flow (as discussed above), such as within a user identification database. If the user identifier has been associated with an emergency flow (e.g., if registered), the user identification module 1480 can return an emergency flow identifier associated with the user identifier to the LIS, which in turn transmits the emergency flow identifier to the EFMS 1440 for execution. The EFMS 1440 can then execute the emergency flow associated with the user identifier.

Figure 15:
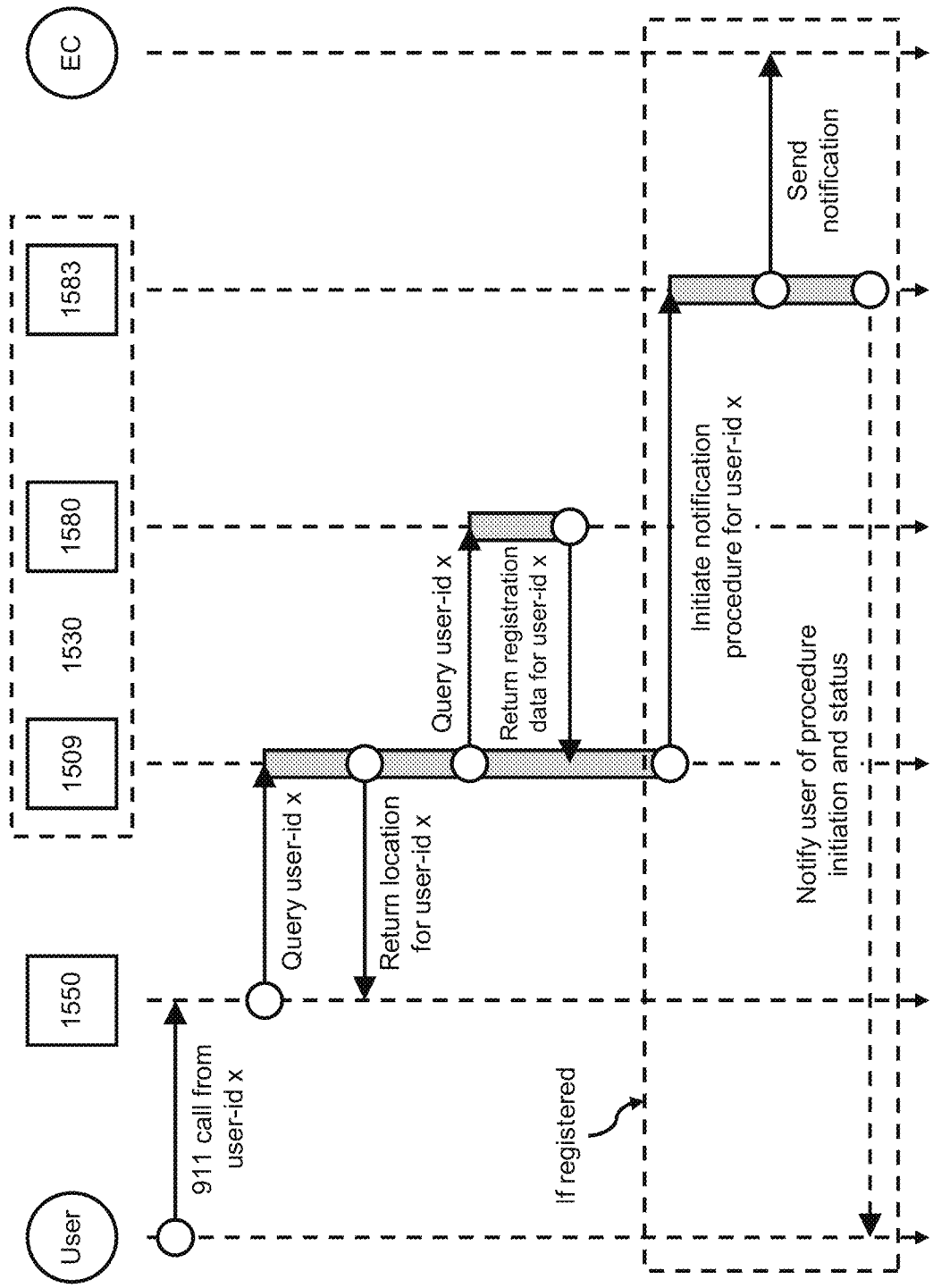
FIG. 15 illustrates an embodiment of a process for managing emergency notifications.

FIG. 15 illustrates an embodiment of a method for managing emergency notifications. In some embodiment, the emergency management system (EMS) 1530 includes an emergency response server (ERS) 1509, a user identification module 1580, and an emergency notification system (ENS) 1583. In some embodiments, as depicted in FIG. 15, when a user dials an emergency call (e.g., 9-1-1) from a communication device, the emergency call is received by an emergency service provider (e.g., PSAP 1550) with a user identifier (such as a phone number of the communication device from which the emergency call was dialed). The emergency service provider can then send an emergency communication (e.g., a query for emergency data) including the user identifier to the EMS 1530. In some embodiments, the query is received by the ERS 1509, as depicted in FIG. 15. In some embodiments, as depicted in FIG. 15, in response to receiving the query, the EMS 1530 searches one or more databases for emergency data or emergency information associated with the user identifier and returns the emergency data or emergency information to the emergency service provider, such as through the ERS 1509. In some embodiments, after receiving the query including the user identifier from the emergency service provider at the ERS 1509, the EMS 1530 then employs the user identification module 1580 to determine if the user identifier has been associated with a notification procedure (as discussed above), such as within a user identification database. If the user identifier has been associated with a notification procedure (e.g., if registered, such as through a registration application, as described above) the user identification module 1580 can return registration information regarding the notification procedure (e.g., a notification procedure identifier that identifies the particular notification procedure, such as within a notification procedure database) associated with the user identifier to the ERS 1509, which in turn transmits the registration information regarding the notification procedure to the ENS 1583 for execution. The ENS 1583 can then execute the notification procedure associated with the user identifier. As depicted in FIG. 15, in some embodiments, the ENS 1583 executes the notification procedure associated with the user identifier by sending notifications to one or more emergency contacts. In some embodiments, after executing the notification procedure associated with the user identifier, the ENS 1583 can additionally send a notification to the user notifying the user that the notification procedure has been executed or indicating a status of the execution of the notification procedure.

Figure 16:
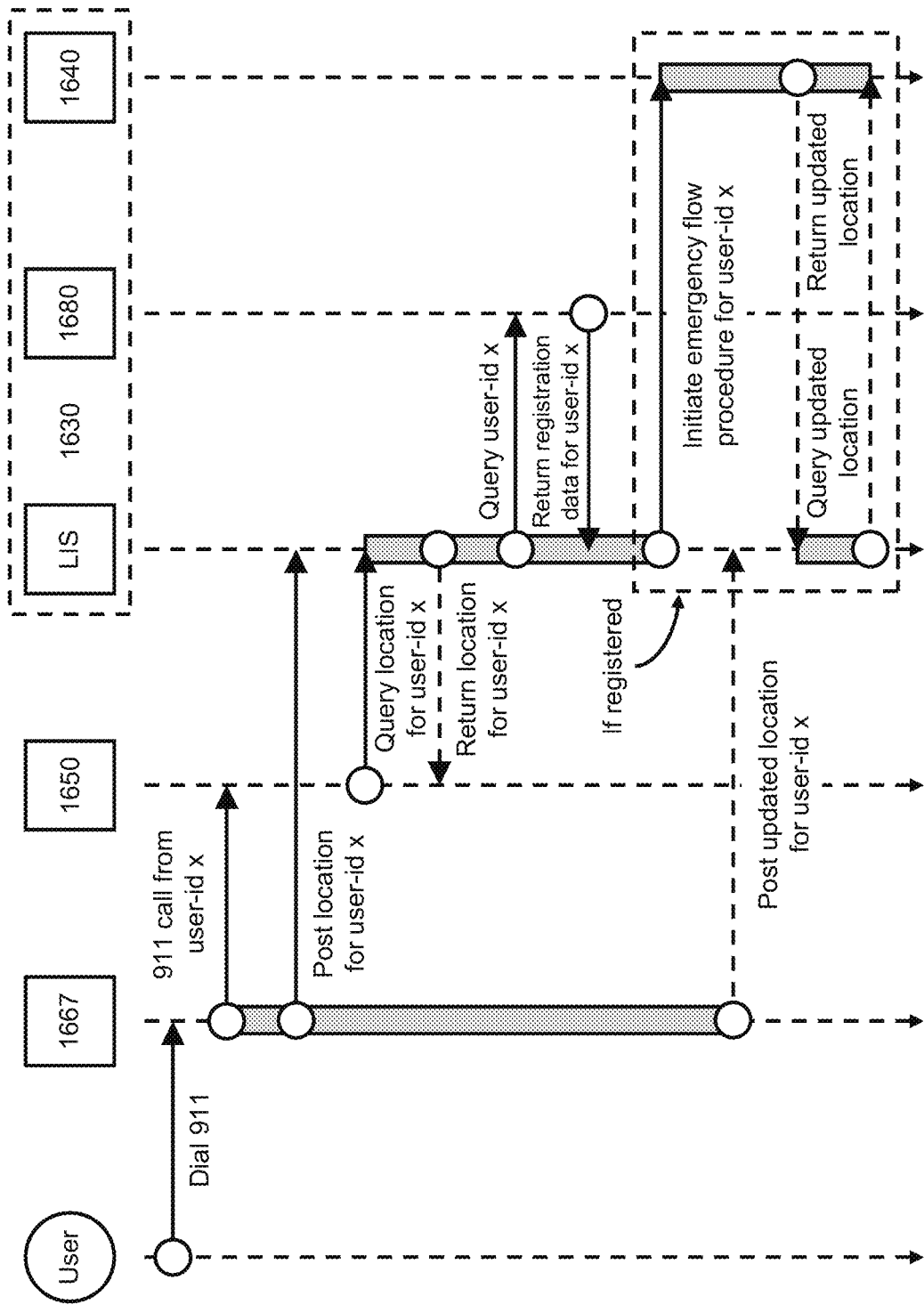
FIG. 16 illustrates an embodiment of a process for managing emergency flows.

FIG. 16 illustrates an embodiment of a method for managing emergency flows. In some embodiments, an emergency management system 1630 for responding to emergencies includes a location information server (LIS), a user identification module 1680, and an emergency flow management system (EFMS) 1640. As depicted in FIG. 16, in some embodiments, when a user dials an emergency call (e.g., 9-1-1) from a communication device, the emergency call is received by an emergency service provider (e.g., PSAP 1650) with a user identifier (such as a phone number of the communication device from which the emergency call was dialed). In some embodiments, as depicted by FIG. 16, when the emergency call is dialed, the communication device concurrently or subsequently transmits a location associated with the user identifier to the LIS. After the emergency service provider receives the emergency call, the emergency service provider 1650 can then send a location query (e.g., an emergency communication) including the user identifier to the EMS 1630. In some embodiments, the location query is received by the EMS at the location information server (LIS). In some embodiments, in response to receiving the location query, the LIS searches one or more databases for the location associated with the user identifier. If the location associated with the user identifier is found, the LIS returns the location associated with the user identifier to the emergency service provider. In some embodiments, after receiving the location query including the user identifier from the emergency service provider, the EMS 1630 additionally or alternatively employs the user identification module 1680 to determine if the user identifier has been associated with an emergency flow (as discussed above), such as within a user identification database. If the user identifier has been associated with an emergency flow (e.g., if registered), the user identification module 1680 can return an emergency flow identifier associated with the user identifier to the LIS, which in turn transmits the emergency flow identifier to the EFMS 1640 for execution. The EFMS 1640 can then execute the emergency flow associated with the user identifier. In some embodiments, the LIS additionally transmits the location associated with the user identifier to the EFMS 1640 to be used in the execution of the emergency flow. In some embodiments, during the execution of the emergency flow, the communication device transmits an updated location associated with the user identifier to the LIS. In some embodiments, during the execution of the emergency flow, the EFMS 1640 queries the LIS for an updated location associated with the user identifier. If an updated location associated with the user identifier has been transmitted to the LIS, the LIS returns the updated location to the EFMS 1640 to be incorporated into the execution of the emergency flow.

Location and Additional Data Based Notification Procedures

Figure 17:
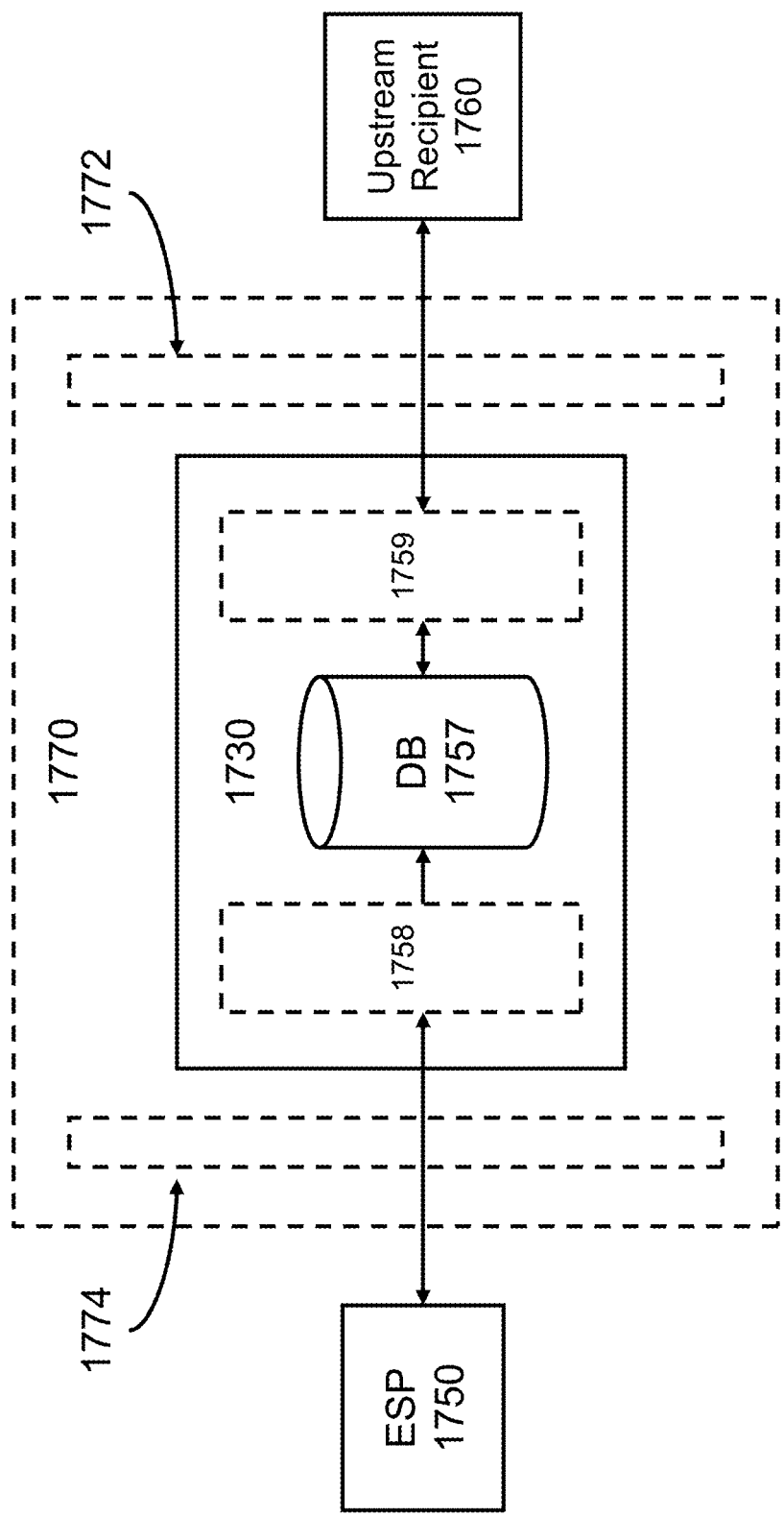
FIG. 17 depicts an embodiment of an emergency management system and geofence system.

In some embodiments, after the emergency management system (EMS) receives an emergency communication from an emergency service provider (ESP), in order to determine if an emergency flow or notification procedure should be executed or which emergency flow or notification procedure should be executed, the EMS must use emergency data received from the ESP other than a user identifier, such as a location and/or an emergency type. FIG. 17 depicts an embodiment of a geofence system 1770 applied to an emergency management system 1730. In some embodiments, the geofence system 1770 is applied to the EMS 1730 to protect potentially sensitive emergency data using geospatial analysis. In some embodiments, as will be described in further detail, the geofence system 1770 is used by the EMS 1730 to trigger the execution of emergency flows or notification procedures.

Generally, a geofence is a virtual perimeter representing a real-word geographic area. A geofence can be dynamically generated—as in a radius around a point location—or a geofence can be a predefined set of boundaries (such as school zones or neighborhood boundaries). The use of a geofence is called geofencing. For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP), a police department, a fire department, a federal disaster management agency, national highway police, etc., which has jurisdictional authority over a designated area (sometimes, overlapping areas). Geofences can be used to define an ESP's jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

Geofences can be defined in various ways. For example, in some embodiments, a geofence comprises one or more of the following: a county boundary, a state boundary, a collection of postal/zip codes, a collection of cell sectors, simple shapes, complex polygons, or other shapes or areas. In some embodiments, geofences comprise approximations where the "approximated" geofence encloses an approximation of the authoritative region. Updates to geofences may be required over time because the authoritative regions may change over time. Geofences may change over time (e.g., a new sub-division has cropped up) and require updates. In some embodiments, the systems and methods described herein allow geofences to be updated (e.g., an ESP administrator can upload updated geofence GIS shapefiles to the EMS).

In some embodiments, as described above, the EMS 1730 provides and maintains a clearinghouse for receiving, storing, and sharing emergency data. In some embodiments, the clearinghouse includes one or more ingestion modules 1758, one or more databases 1757, and one or more retrieval modules 1759. As depicted in FIG. 17, in some embodiments, a geofence system 1770 can be applied to the EMS 1730 (or the clearinghouse). In some embodiments, the geofence system 1770 includes an ingestion geofence module 1774 (also referred to as an "ingress filter"). In some embodiments, the geofence system 1770 includes a retrieval geofence module 1772 (also referred to as an "egress filter"). In some embodiments, the geofence system 1770 includes a geofence database (not shown) that stores a plurality of geofences associated with a plurality of entities.

In some embodiments, when an ESP 1750 transmits an emergency communication to the EMS 1730, the emergency communication includes a location (e.g., a location associated with an emergency), and the location is filtered or processed by the geofence system 1770 (such as by the ingress filter 1774) before or after any emergency data included in the emergency communication is stored within the emergency data database 1757. In processing the location received in the emergency communication from the ESP 1750, the geofence system 1770 retrieves a set of geofences associated with a set if accounts from the geofence database and determines if the location received in the emergency communication falls within any geofences within the set of geofences. If the location does fall within one or more of the geofences within the set of geofences, the EMS 1730 can then identify one or more accounts associated with the one or more geofences that the location fell within, identify one or more emergency flows or notification procedures associated with the one or more accounts (as described above), and execute the one or more emergency flows or notification procedures (as described above). In some embodiments, executing the one or more emergency flows or notification procedures includes transmitting emergency data to one or more upstream data recipients 1760. In some embodiments, before transmitting emergency data to an upstream data recipient 1760, the EMS 1730 employs the geofence system 1770 to confirm that that upstream data recipient 1760 is associated with a geofence that the location received in the emergency communication falls within by using the egress filter 1772.

Figure 18:
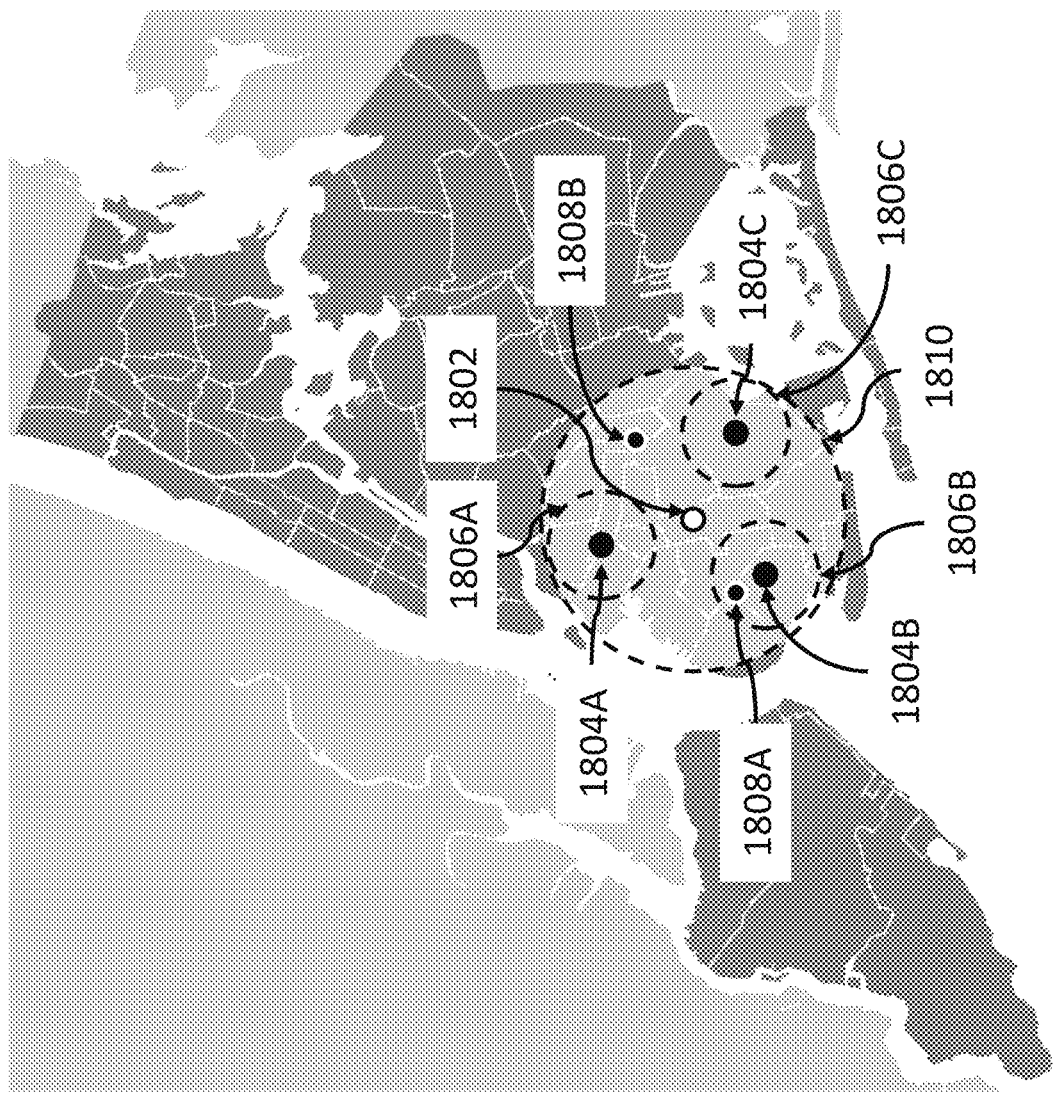
FIG. 18 illustrates embodiments of geofences.

For example, FIG. 18 illustrates examples of locations and geofences used by the EMS and geofence system. In this example, ESP location 1802 is the location of a public safety answering point (PSAP), which has an ESP geofence 1810. All of the space contained within ESP geofence 1810 is under the jurisdictional authority of the PSAP. In one example, institution location 1804A is the location of an office building, which falls within ESP geofence 1810. In this example, an administrator of the office building has registered with the EMS and provided institution geofence 1806A as associated with the office building. In another example, institution location 1804B is the location of a high school, which also falls within ESP geofence 1810. In this example, an administrator of the high school has registered with the EMS and provided institution geofence 1806B as associated with the high school. In a third example, institution location 1804C is the location of a private bank, which also falls within ESP geofence 1810. In this example, an administrator of the private bank has registered with the EMS and provided institution geofence 1806C as associated with the private bank. Each of the three institutions (the office building, the high school, and the private bank) have also signed up with the EMS for notification procedures that notify their respective administrators when an emergency occurs within their respective institution geofences. In some embodiments, if the PSAP receives an emergency call with an associated location at emergency location 1808A and transmits an emergency communication to the EMS including emergency location 1808A, the EMS can retrieve the institution geofences 1806 for each of the office building, the high school, and the private bank and determine if the emergency location 1808A falls within any of the institution geofences 1806. In this example, the EMS determines that emergency location 1808A falls within the institution geofence 1806B associated with the high school, and executes the notification procedure associated with the high school, thereby notifying the administrator of the high school that an emergency has occurred within the institution geofence 1806B associated with the high school. However, if the PSAP receives an emergency call with an associated location at emergency location 1808B and transmits an emergency communication to the EMS including emergency location 1808B, the EMS can retrieve the institution geofences 1806 and determine that emergency location 1808B does not fall within any of the institution geofences 1806. In such a case, the EMS would not execute any of the notification procedures associated with the office building, high school, or private bank.

In another example, each of the institution locations 1804 represent locations of other emergency service providers. In this example, institution location 1804A is the location of a police station, institution location 1804B is the location of a fire station, and institution location 1804C is the location of a hospital. As illustrated in FIG. 18, all three institution locations 1804 of the police station, the fire station, and the hospital fall within the authoritative jurisdiction of the PSAP (ESP geofence 1810). In this example, if the PSAP receives an emergency call associated a location at emergency location 1808A and transmits an emergency communication to the EMS including emergency location 1808A, the EMS can retrieve the institution geofences 1806 for each of the police station, fire station, and hospital and determine if emergency location 1808A falls within any of the institution geofences 1806. In this example, the EMS determines that emergency location 1808A falls within the institution geofence 1806B associated with the fire station and execute a notification procedure associated with the fire station, which could include notifying the fire station of the emergency occurring at emergency location 1808A and/or transmitting any emergency data regarding the emergency to the fire station.

In some embodiments, the EMS uses additional data to determine if an emergency flow or notification procedure should be executed in response to an emergency communication received from an ESP. For example, in some embodiments, the emergency communication received from the ESP includes an emergency type (e.g., fire, medical, police, burglary, active shooter, natural disaster, etc.) in addition to a user identifier or an emergency location. After the EMS identifies an emergency flow or notification procedure associated with the user identifier or an account having a geofence that encompasses the emergency location, the EMS can check the emergency flow or notification procedure for any additional conditions necessary or required for the emergency flow or notification procedure's execution. In some embodiments, an emergency flow or notification procedure may require that the emergency be a certain type. For example, referring back to the high school having the institution geofence 1806B, the notification procedure associated with the high school may require that the emergency for which the notification procedure is to be executed be one of a fire, natural disaster, or active shooter (excluding other types of emergencies, such as medial emergencies and burglaries). In this example, if the PSAP at ESP location 1802 receives an emergency call for a burglary with an associated location at emergency location 1808A and transmits an emergency communication to the EMS including emergency location 1808A and an indication that the emergency is a burglary emergency type, the EMS can determine that emergency location 1808A falls within the institution geofence 1806B associated with the high school but forgo executing the notification procedure associated with the high school. However, if the emergency communication includes an indication that the emergency is an active shooter emergency type, the EMS can execute the notification procedure associated with the high school. Or, for example, referring back to the fire station having the institution geofence 1806B, the notification procedure associated with the fire station may require that the emergency for which the notification procedure is to be executed is a fire.

Personal and Professional Service Providers (PSPs)

In some embodiments, after receiving an emergency communication regarding an emergency from an emergency service provider (ESP), the EMS can execute a notification procedure to transmit emergency data associated with the emergency to one or more personal or professional service providers (PSPs). In some embodiments, a PSP is a company or organization that provides services to individuals or consumers. For example, in some embodiments, a PSP is a roadside assistance provider (e.g., the American Automobile Association, or AAA), a medical insurance provider (e.g., Blue Cross Blue Shield), or a private security company. In some embodiments, a PSP can register with the EMS by selecting or creating a notification procedure or emergency flow to be associated with the PSP and providing the EMS with a list of user identifiers to be associated with the PSP and the notification procedure or emergency flow. Then, if the EMS receives an emergency communication regarding an emergency (e.g., a query for emergency data from an ESP) including a user identifier included on the list of user identifiers provided by the PSP, the EMS can execute the notification procedure or emergency flow associated with the PSP to notify the PSP of the emergency potentially involving one of their customers or take appropriate emergency actions.

Consent & User Preferences

In some embodiments, consent is required for a user identifier to be used in a notification procedure or emergency flow. For example, in some embodiments, when a user identifier is submitted to the emergency notification system to be associated with a notification procedure, the emergency notification system sends a confirmation message to the user identifier or an account associated with the user identifier. In some embodiments, a user can provide consent by replying to the confirmation message. In some embodiments, the confirmation message includes a confirmation code that a user can user to provide consent through the registration application. For example, if the user identifier is a phone number, the emergency notification system can send a confirmation message to the phone number in the form of an SMS text message. In some embodiments, the user can provide consent by replying to the SMS text message in the affirmative. In some embodiments, the SMS text message includes a confirmation code that the user must submit through the registration application in order to provide consent. In another example, if the user identifier is an email address, the emergency notification system can send a confirmation message to the email address in the form of an email. In some embodiments, the email includes a confirmation link, and the user can provide consent by selecting the confirmation link. In some embodiments, the email includes a confirmation code that the user must submit through the registration application in order to provide consent. In some embodiments, the emergency notification system will recognize a user identifier only if consent has been provided for the user identifier. Requiring consent of a user identifier can provide additional security and prevent abuse of the emergency notification system.

Enhanced ESP Functionality

Figure 19:
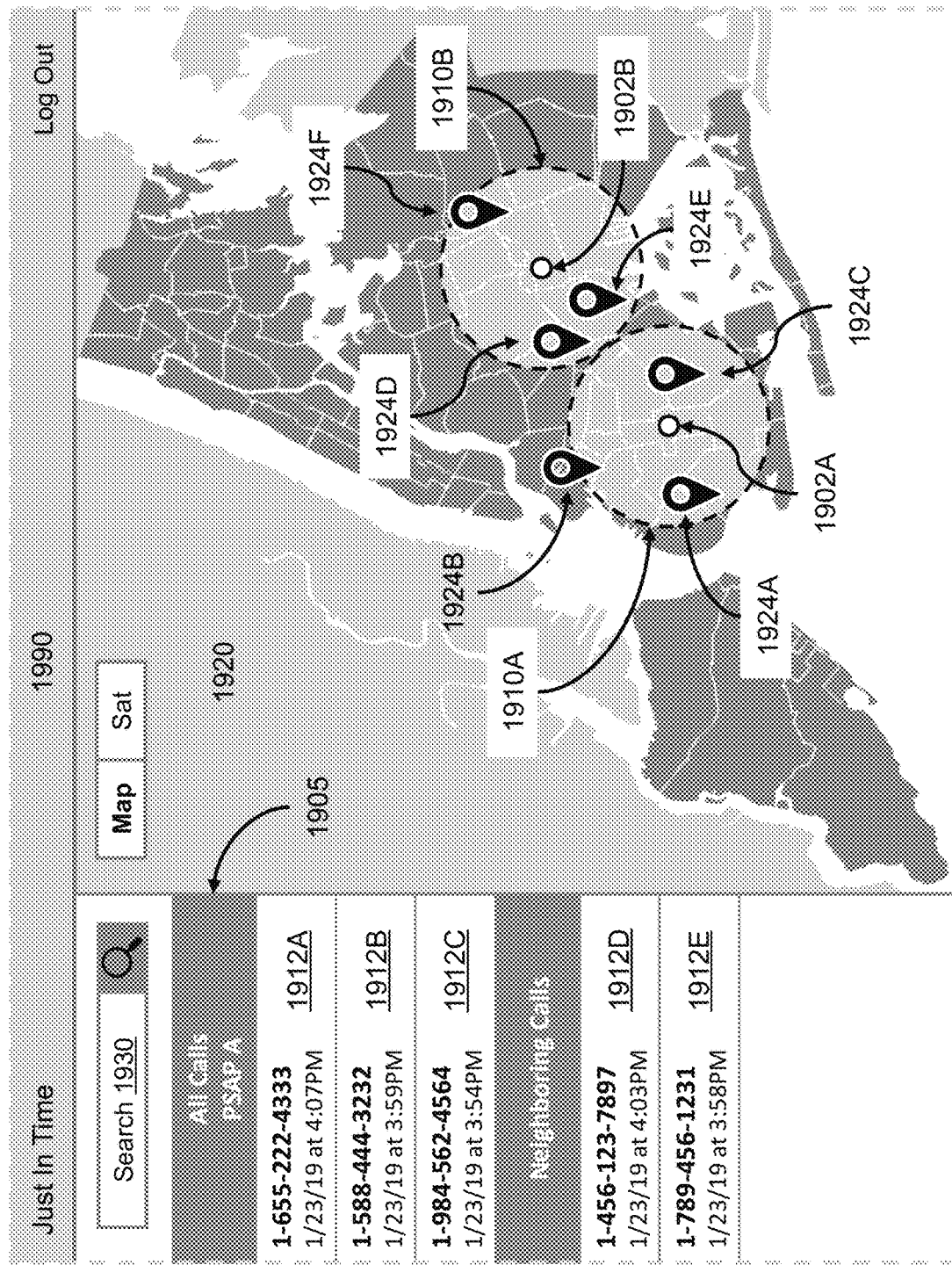
FIG. 19 illustrates an embodiment of an emergency response application.

In some embodiments, as mentioned above, the emergency management system (EMS) can use emergency data received from an emergency service provider (ESP) to provide the ESP with additional or enhanced functionality. For example, in some embodiments, the EMS can facilitate the transmission of emergency data from one ESP to another ESP. FIG. 19 illustrates an embodiment of an emergency response application. In some embodiments, the emergency response application 1990 is used to visualize or display emergency data transmitted from the EMS to an ESP. In some embodiments, the emergency response application 1990 is a web application or desktop software provided by the EMS. In some embodiments, the emergency response application is a web application or desktop software not provided by the EMS. As depicted in FIG. 19, in some embodiments, the emergency response application 1990 includes a list of emergency events 1905 corresponding to emergency calls received by an ESP and map 1920 that displays emergency locations 1924 corresponding to emergency events 1912 on the list of emergency events 1905. In this example, the emergency response application 1990 is being accessed and used by a public safety answering point (PSAP A) at ESP location 1902A, which has an ESP geofence 1910A. PSAP A has received three emergency calls, represented by emergency events 1912A, 1912B, and 1912C. PSAP A has received emergency locations for each of the three emergency calls, emergency locations 1924A, 1924B, and 1924C, respectively. In this example, PSAP A is neighbored by a second public safety answering point (PSAP B) at ESP location 1902B, which has an ESP geofence 1910B. PSAP B has also received three emergency calls and an emergency location for reach of the three emergency calls, emergency locations 1924D, 1924E, and 1924F. In this example, both PSAP A and PSAP B have integrated with the EMS such that both ESPs transmit an emergency communication including a user identifier (e.g., a phone number) and an emergency location for each emergency call that the ESPs receive. The EMS can then share relevant emergency data from one of the ESPs to the other. In this example, the EMS has determined that emergency locations 1924D and 1924E (received in separate emergency communications from PSAP B) are within a threshold distance (e.g., one mile, five miles, ten miles, etc.) of PSAP A's associated geofence, ESP geofence 1910A. In response to making this determination, the EMS can transmit emergency data regarding the two emergencies represented by emergency location 1924D and 1924E (e.g., associated user identifiers and the time at which the respective emergency calls were received) to PSAP A and display the emergency data within the emergency response application 1990. In this example, emergency data regarding the emergencies represented by emergency location 1924D and 1924E are displayed within the list of emergency events 1905 under "Neighboring Calls." The EMS may share any and all relevant emergency data between ESPs, including, but not limited to, user identifiers, emergency location, emergency day and time, emergency type, contact info, demographic data, and medical data.

Figure 20:
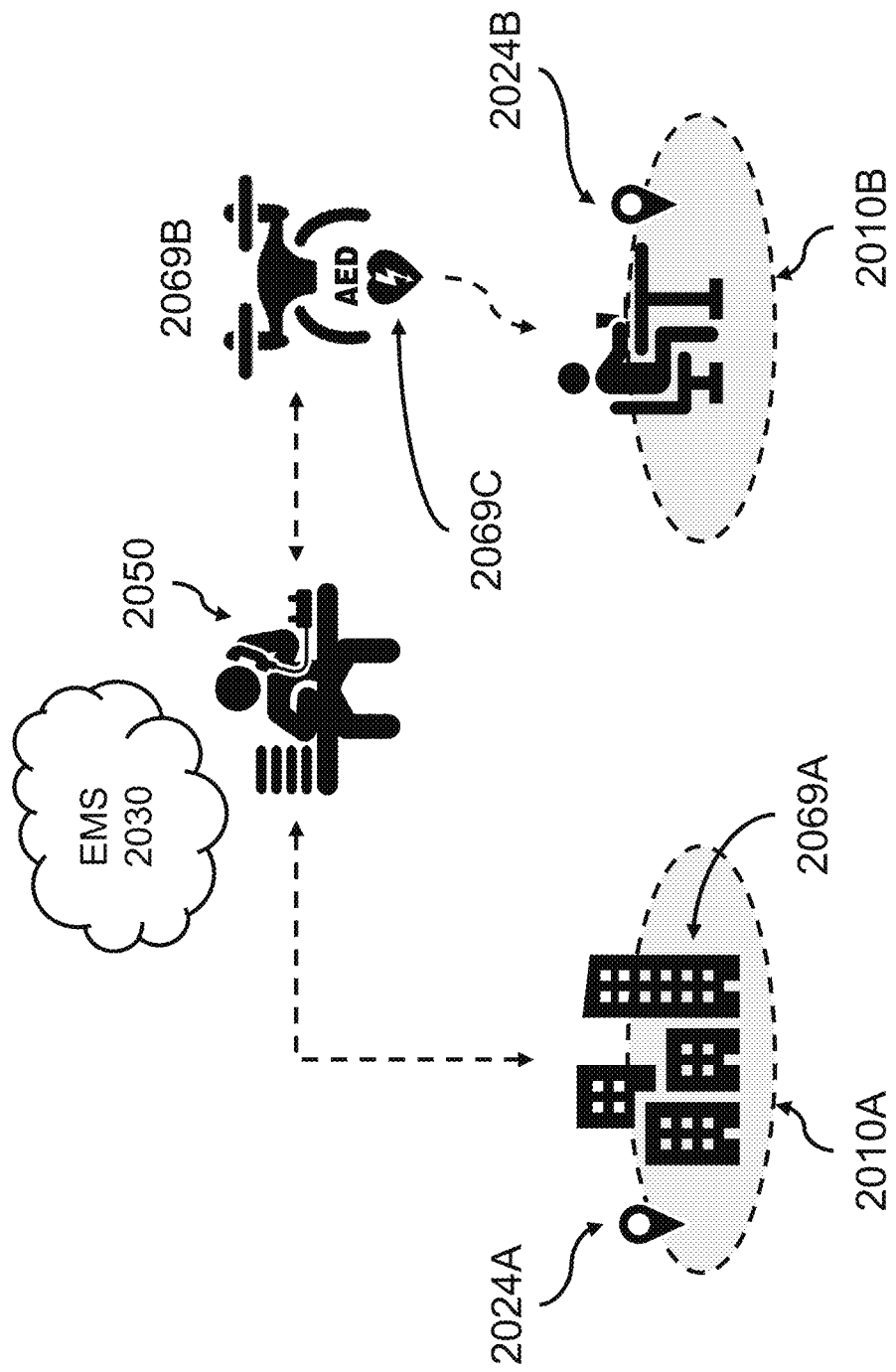
FIG. 20 depicts embodiments of a system for providing emergency service providers with functional enhancements.

FIG. 20 depicts an embodiment of a system for providing enhanced functionalities to an emergency service provider (ESP) by an emergency management system (EMS). In some embodiments, the EMS 2030 serves as an interconnect between an ESP 2050 and a commercial service provider (CSP). A CSP is a commercial entity that manages physical or non-physical assets 2069 that can be leveraged for emergency responses. In some embodiments, a method for providing enhanced functionality to an ESP by an EMS comprises: a) receiving an electronic communication from an ESP, wherein the electronic communication is associated with an emergency alert received by the ESP and comprises a first set of data comprising a location associated with the emergency alert; b) retrieving a set of geofences associated with a set of assets managed by a commercial service provider (CSP); c) determining that the location associated with the emergency alert falls within a geofence associated with an asset managed by the CSP; d) in response to determining that the location associated with the emergency alert falls within the geofence associated with the asset managed by the CSP, displaying access controls to the asset within a graphical user interface (GUI) of an emergency response application executed on a computing device at the ESP; e) receiving selection of the access controls from the ESP; and f) transmitting a request to the CSP to activate the asset according to the selection of the access controls.

In one example, a commercial service provider (CSP A) manages connected smart buildings assets, allowing users to remotely access and control various systems within a building, such as locking and unlocking doors, lighting, and video feeds from surveillance cameras. In this example, CSP A can register a building 2069A managed by CSP A with the EMS by providing the EMS with a geofence 2010A of the building 2069A. If an ESP 2050 transmits an emergency communication regarding an emergency that includes an associated emergency location 2024A, the EMS 2030 can determine that emergency location 2024A falls within the geofence 2010A of the building 2069A. In response, the EMS 2030 can provide a graphical user interface (GUI) to the ESP 2050 through an emergency response application that the ESP 2050 can use to remotely control the building 2069A. In some embodiments, the GUI includes one or more access controls for controlling the asset. For example, a call taker at ESP 2050 could use the access controls within the GUI to select to view a feed from a surveillance camera within the building, and, if the call taker sees a person with a weapon within the building, the call taker can use the access controls within the GUI to put the building 2069A in lockdown (e.g., locking hallway doors and sounding an alarm). In some embodiments, after receiving selection(s) of the access controls through the GUI, the EMS 2030 can directly activate the asset(s) according to the selection(s) of the access controls. In some embodiments, in response receiving selection(s) of the access controls through the GUI, the EMS 2030 can then transmit a request to CSP A to activate the systems within the smart building 2069A according to the selection(s) of the access controls made by the ESP 2050 through the GUI. In some embodiments, an ESP 2050 provides consent for the EMS 2030 to share data generated by the ESP 2050 with a CSP by selecting the access controls presented within the GUI. In some embodiments, an ESP 2050 selects a consent button within the GUI to provide consent for the EMS 2030 to share data generated by the ESP 2050 with a CSP before the EMS 2030 is permitted to transmit a request to activate an asset to the CSP.

In another example, a commercial service provider (CSP B) manages drone (e.g., unmanned aerial vehicles) assets that carry automated external defibrillators (AEDs). AEDs can be used to diagnose and treat cardiac arrhythmias (e.g., irregular heartbeats) through defibrillation, wherein an electrical current is passed through the body to reset the heart. The chance of survival for a person in cardiac arrest can drop by as much as ten percent for each minute the person goes without successful defibrillation. Accordingly, it is imperative during such an emergency that a person receives an AED as quickly as possible. In this example, CSP B can register a drone 2069B and an associated AED 2069C managed by CSP B by providing the EMS with a geofence 2010B of a region serviced by the drone 2069B. If an ESP 2050 transmits an emergency communication regarding an emergency that includes an associated emergency location 2024B, the EMS 2030 can determine that emergency location 2024B falls within the geofence 2010B of the region serviced by the drone 2069B. In response, the EMS 2030 can provide a graphical user interface (GUI) to the ESP 2050 through an emergency response application that the ESP 2050 can use to remotely activate the drone 2069B. In some embodiments, the GUI includes one or more access controls for controlling the asset (e.g., the drone 2069B or the AED 2069C). For example, if a call taker at ESP 2050 determines that the emergency caller is suffering from cardiac arrest or is calling on behalf of a person suffering from cardiac arrest, the call taker can use the access controls within the GUI to dispatch the drone 2069B carrying the AED 2069C to the emergency location 2024B. In some embodiments, after receiving selection(s) of the access controls through the GUI, the EMS 2030 can directly activate the asset(s) (e.g., the drone 2069B or AED 2069C) according to the selection(s) of the access controls. In some embodiments, in response to receiving selection(s) of the access controls through the GUI, the EMS 2030 can then transmit a request to CSP B to activate the drone 2069B and AED 2069C according to the selection(s) of the access controls made by the ESP 2050 through the GUI.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" is a digital processing device designed with one or more functionality. A "triggering device" refers to a communication device with a communication component, which will allow it to send and receive information over a wireless channel, a wired channel, or any combination thereof (e.g., sending/receiving information over the Internet). Examples of triggering devices include a mobile phone (e.g., a smartphone), a laptop, a desktop, a tablet, a radio (e.g., a two-way radio), and a vehicular communication system. In some embodiments, a triggering device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a triggering device is an Internet of Things (IoT) device. In some embodiments, the triggering device is a sensor for sensing environmental or health indicators. In some embodiments, the sensor may include a sensing component and a communication component. In some embodiments, the triggering device is a sensor in a sensor network or a device that controls a sensor network.

In some embodiments, a triggering device is a wearable device (e.g., a communication device worn by a user). In some embodiments, a triggering device (e.g., a wearable device) comprises one or more sensors. As used herein, a "mobile wireless device" refers to a device that is portable and communicates wirelessly. In some embodiments, a user wears or carries the mobile wireless device on the user's person or in the user's vehicle. Examples of mobile wireless devices include mobile or cellular phones, wearable devices (e.g., smart watch, fitness tracker, wearable sensor, smart glasses, etc.).

As used herein, Internet of Things (IoT) refers to a network of physical devices, buildings, vehicles, and other objects that feature an IP address for internet network connectivity for exchanging data. In many cases, IoT devices are embedded with electronics, software, one or more sensors, and network connectivity. As used herein, a IoT device can be a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, IoT devices feature an IP address for internet connectivity. In addition to an IP address, the IoT device can be associated with a MAC address or an SSID. In some embodiments, IoT devices connect with other devices through Wi-Fi, Blue-Tooth®, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, or other technologies which allow for transfer of data. In some embodiments, IoT devices form a mesh network allowing information to be efficiently routed between the devices. Examples of IoT devices include a home thermostat, intelligent home monitors, baby monitors, smoke or carbon monoxide detectors, home security camera systems, and other network-enabled devices. In some embodiments, a triggering device is an IoT device (e.g., a Nest® device).

As an example, a vehicular on-board console is triggered upon detection of an emergency. In some embodiments, the console contains a built-in microphone and uses the car speakers. In some embodiments, the console is connected to a Device Communication & Interface Module (DCIM), which uses an antenna to connect to the cellular network. When the car is in a crash, sensors can transmit information to the Sensing Diagnostic Module (SDM). In some embodiments, the SDM comprises an accelerometer, which measures the severity of the event based on gravitational force. The SDM sends this information to the DCIM, which uses the cellular antenna to send the emergency alert.

As used herein, an "account" refers to contact information for a user, including emergency contacts of the user. In some embodiments, the account is registered by the user to include a list of contact information for the user such as, for example, a list of associated devices. Examples of contact information on an account include phone number, email address, home address, work address, emergency contacts (e.g., name, phone number, email, etc.), and associated devices (e.g., other communication devices of the user aside from the device or triggering device sending an emergency alert). In some embodiments, the account includes contact information for organizational representatives. For example, in some cases, a social media application installed on the user's electronic device is used to send an emergency alert. The communication session can be established with the user/user device, emergency service provider personnel, and an organizational representative for the social media entity. This scenario can occur when analysis of the user's social media activity indicates a possible emergency situation such as, for example, a suicide attempt by the user. In response, the social media application on the user device sends an emergency alert to an emergency management system. Since the user did not choose to request help, a representative of the social media entity is connected to the 3-way communication session to help explain the emergency situation to the emergency service provider.

As used herein, an "associated device" refers to a communication device that is associated with the triggering device. For example, a user may be using several communication devices such as a mobile phone, a wearable, a home security system, a car computer. The user may have registered these devices with his or her account and linked these devices with a user name, user number(s), email address(es), home or other physical address(es). In some embodiments, associated devices may include communication devices of a second user who is associated with user, e.g., a husband and wife, a father and son, a patient and doctor, friends, work colleagues, etc. In some cases, the user may have added the second user as an emergency contact, a member of a group, etc. In some cases, user may have agreed to share location and other data with the second user. In some embodiments, the second user may be someone who is frequently contacted by the user and the communication device identifies the second user from the "Recently called" or "Frequently called" list. In some embodiments, the associated devices may be devices that are proximal or near-by to the triggering device such as obtained through a Wi-fi scan. In some embodiments, an associated device is proximal to the triggering device when the location of the associated device is within 1, 5, 10, 15, 20, 25, 30, 35, 40, 45, 50, 60, 70, 80, 90, 100, 200, 300, 400, or 500 meters of the location of the triggering device.

As used herein, the "list of associated devices" refers to a list of communication devices that are associated with the user or the triggering device (e.g., a second resident in a smart home). The list of associated devices may be listed by user name, phone number, email address, physical address, coordinates etc. The device entry in the list may include phone number, email address, physical address, coordinates, BSSID, SSID or MAC address. The list may be user defined or generated by the device or the EMS.

As used herein, a "request for assistance" refers to a request or message sent to a recipient asking for help. In some embodiments, a request for assistance is an emergency request for assistance (e.g., the request is associated with an emergency situation) such as, for example, an emergency alert. In some embodiments, an emergency alert comprises a request for assistance. In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency. In some embodiments, a request for assistance is associated with a non-emergency situation (e.g., request for a tow truck after car breaks down). In some embodiments, a request for assistance is associated with a device sending the request. In other embodiments, a request for assistance is associated with a device not sending the request (e.g., a proxy request on behalf of a second device and/or a member device in a group of devices). As used herein, a request is "associated" with a device or user when the request relates to an emergency or non-emergency situation involving the device or user. In some embodiments, a request comprises data associated with a device (or user thereof). In some embodiments, a request comprises a data set associated with a device. For example, in some embodiments, a request comprises a data set associated with a device, wherein the data set comprises current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency.

As used herein, a "emergency responder" refers to any person or persons responsible for addressing an emergency situation. In some embodiments, an emergency responder refers to government personnel responsible for addressing an emergency situation. In some embodiments, an emergency responder is responsible for a particular jurisdiction (e.g., a municipality, a township, a county, etc.). In some embodiments, an emergency responder is assigned to an emergency by an emergency dispatch center. In some embodiments, an emergency responder responds to a request for emergency assistance placed by a user via a user communication device. In some embodiments, an emergency responder includes one or more fire fighters, police officers, emergency medical personnel, community volunteers, private security, security personnel at a university, or other persons employed to protect and serve the public and/or certain subsets of the population.

As used herein, an "emergency service provider" (ESP) is a public or private organization or institution responsible for providing emergency services. For example, in some embodiments, an EDC (e.g., a public safety answering point (PSAP)), a fire department, a police department, and a hospital may all be considered emergency service providers. In some embodiments, an emergency responder is a member of an ESP. In some embodiments, an ESP personnel is a person who works at an ESP. For example, an ESP personnel may be a call-taker at a PSAP or a first responder at a fire department.

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when the request for assistance pertains to an emergency (e.g., a tier 2 emergency). In some embodiments, a recipient is an emergency management system. In some embodiments, a recipient is an emergency dispatch center. In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is a non-emergency service or personnel, for example, a relative or friend. In such situations, a user of a communication device (or member device or second device) does not require emergency assistance, but does need help. As an example, a user of a member device in a group of devices is a child who is lost in a theme park. The parent of the child has a communication device in the same group of devices as the child's member device. The parent uses the communication device to send a request for assistance on behalf of the child's member device to theme park security guards who are closer to the child than the parent. Security is then able to pick up the child quickly using the data set associated with the member device, which they are given authorization to access by the parent's communication device.

As used herein, a "user" refers to one or more person or persons associated with a device (e.g., communication device, member device, second device, device of a first responder, etc.). In some embodiments, a user utilizes a device to place a request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "data" refers to a collection of information about one or more entities (e.g., user of a user communication device) and/or an environment that pertains to characteristics of the one or more entities. In some embodiments, an entity is a person. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location information from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

As used herein, "communication link" refers to a communication pathway from a device (e.g., communication device) to another device or to an intermediate device (e.g., a router) on a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). A communication link refers to the point-to-point communication channels, point-to-point and end-to-end data sessions, and the physical hardware facilitating the communication channel(s) (e.g., antennas used to communicate/transmit information). In some embodiments, a data session comprises session parameters and the network route taken from one device to another device.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g., a previously agreed upon protocol). In some embodiments, the data session is routed through an EMS, which stores the multi-media, voice, and/or other data from any of the devices that are part of the data session. In further embodiments, the EMS shares the data from the data session with the other device (e.g., device of a first responder). In some embodiments, the EMS manages the data session.

As used herein, a "Received Signal Strength Indicator (RSSI)" refers to a measurement of the power present in a received radio signal. In some embodiments, the RSSI refers to a number assigned to the signal levels (e.g., power level) of packets as detected by a device receiving the packets from a device sending the packets. For example, an RSSI value may be a number within an arbitrary range such as from 0 to 100. In some embodiments, the RSSI refers to the decibel level of the power of the received data packets. In other embodiments, the RSSI refers to the actual power, for example measured in mW, as detected by the receiver. In some embodiments, RSSI is replaced with received channel power indicator (RCPI), which is a measure of the received radio signal power in a selected channel over the preamble and the entire received frame.

As used herein, "voice or speech recognition software" refers to computer programs that can recognize a person's speech to identify trigger phrases (e.g., iListen, Voice Navigator, Google Now, LilySpeech, etc.). In some embodiments, the software may be able to recognize the identity of the speaker. As used herein, "voice command" refers to words or phrases that a user may use to give command to the triggering device. The trigger phrases may be user-defined or may be from a library of phrases on the trigger device or at a remote server.

As used herein, "sound detection software" refers to computer programs for detecting trigger sounds in and around the triggering device. The trigger sounds may be user-defined or may be from a library of phrases on the trigger device or at a remote server. The trigger sounds may be sounds (alarms, breakage, gunshots, explosion, fire, car crash, etc.) or absence of sound (e.g., no heartbeat, etc.). For example, a glass break detector software may use the microphone in the trigger device to monitor any noise or vibrations to detect burglaries in a smart home. If the vibrations exceed a baseline, they may be analyzed by the software. The software may analyze frequencies typical of glass shattering and trigger an emergency alert if the sound is above a trigger threshold. In some cases, the software may compare detected sounds with glass-break profiles analysis and trigger an alert if the amplitude threshold and/or statistically expressed similarity threshold are breached. In some embodiments, an emergency is detected or triggered when a trigger sound exceeds a threshold. In some embodiments, a trigger sound threshold is about 50, 55, 60, 65, 70, 75, 80, 85, 90, 95, 100, 110, 120, 130, 140, 150, 160, 170, 180, 190, or 200 decibels. In some embodiments, a trigger sound threshold is at least about 50, 55, 60, 65, 70, 75, 80, 85, 90, 95, 100, 110, 120, 130, 140, 150, 160, 170, 180, 190, or 200 decibels. In some embodiments, a trigger sound threshold is no more than about 50, 55, 60, 65, 70, 75, 80, 85, 90, 95, 100, 110, 120, 130, 140, 150, 160, 170, 180, 190, or 200 decibels.

In some embodiments, voice recognition and speech recognition use recordings of the human voice, but differ in approach. Speech recognition strips out the personal differences between speakers to detect the words. Voice recognition typically disregards the language and meaning to detect the physical person behind the speech. Speech recognition is language dependent, while voice recognition is independent of language. In essence, voice biometrics provides speaker recognition rather than speech recognition. In some embodiments, speech recognition is the inter-disciplinary sub-field of computational linguistics that develops methodologies and technologies that enables the recognition and translation of spoken language into text by computers. It is also known as "automatic speech recognition" (ASR), "computer speech recognition", or "speech to text" (STT). In some embodiments, some speech recognition systems require "training" (also called "enrollment") where an individual speaker reads a text or isolated vocabulary into the system. The system analyzes the person's specific voice and uses it to fine-tune the recognition of that person's speech, resulting in increased accuracy. Systems that do not use training are called "speaker independent" systems. Systems that use training are called "speaker dependent". In some embodiments, speech recognition applications include voice user interfaces such as voice dialing (e.g., "Call home"), call routing (e.g., "I would like to make a collect call"), domotic (e.g., home automation) appliance control, search (e.g., find a podcast where particular words were spoken), simple data entry (e.g., entering a credit card number), preparation of structured documents (e.g., a radiology report), speech-to-text processing (e.g., word processors or emails), and aircraft (usually termed direct voice input).

In some embodiments, speech recognition systems use powerful and complicated statistical modeling systems. These systems use probability and mathematical functions (e.g., Hidden Markov Model and neural networks) to determine the most likely outcome.

As used herein, the term "voice recognition" or "speaker identification" refers to identifying the speaker, rather than what they are saying. Recognizing the speaker can simplify the task of translating speech in systems that have been trained on a specific person's voice or it can be used to authenticate or verify the identity of a speaker as part of a security process. In some embodiments, to convert speech to on-screen text or a computer command, a computer or device has to go through several complex steps.

As used herein, an "audio detector" refers to a device that can detect audio inputs (e.g., voice commands, trigger sounds). In some cases, the audio detector is a separate device (e.g., a smart speaker). In some cases, the audio detector is a component of another device (e.g., microphone inside of a smart phone). In some embodiments, sound may be detected "sound sensors", "sound detectors" or microphones. For example, a sound is a board that combines a microphone and some processing circuitry. The sound detector provides an audio output, but also a binary indication of the presence of sound, and an analog representation of its amplitude. In some embodiments, the microphone turns sound energy into electrical energy. When a user speaks, sound waves created by a user's voice carry energy toward the microphone. Inside the microphone, the diaphragm and coil move back and forth upon contact with the sound waves. A permanent magnet produces a magnetic field that cuts through the coil and an electric current is produced. The electric current flows out from the microphone to an amplifier on the sound recording device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EXAMPLES

The following illustrative examples are representative of embodiments of the subject matter described herein and are not meant to be limiting in any way.

Example 1—Wearables & Parallel Flows

John, an elderly man, lives in a nursing home. He suffers from a medical condition that makes him susceptible to falls and is given a smartwatch by the nursing home to provide health monitoring and to allow him to request help in case of an accident. Other residents of the nursing home are also assigned various similar devices (panic buttons, smartphones, etc.). The nursing home administrator has used an emergency flow editor software to create an emergency flow script for handling emergency alerts sent by the various smartwatches and other devices used by the nursing home. The editor software provides a graphic user interface with an interactive space that allows the administrator (an authorized user) to select graphical representations of emergency flow building blocks and drag them over to a desired location within the interactive space. The administrator is easily able to generate the customized emergency flow script by dragging and dropping the building blocks and connecting them. Although the editor software provides some standard premade building block templates, the administrator is able to customize and configure selected building block templates. In this case, the administrator adds a building block that sorts emergency alerts based on the type of device sending the alert. The building block is connected to multiple downstream emergency flows, which are executed based on the device type that is identified. In this case, a downstream emergency flow associated with smartwatches has building blocks that open a text and/or chat-based communication channel with an operator at the nursing home. The downstream emergency flow includes a first parallel emergency flow that obtains data from the smartwatch, including heart rate sensor data and current location data (either received through the emergency alert or by querying the smartwatch). The downstream emergency flow also includes a second parallel emergency flow that has a building block that determines whether the emergency is a personal emergency (e.g., health emergency such as a heart attack) or an environmental emergency (e.g., fire, earthquake), and responsive to detecting an environmental emergency, obtains sensor data from any sensors (e.g., fire alarms and/or temperature sensors) that are in the vicinity of the smartwatch (in this case, within 10 meters). In addition, the administrator sets the second parallel emergency flow to attempt detection of an environmental emergency by obtaining sensor data in vicinity of the smartwatch even in the case of a personal emergency. Once the emergency flow script has been finished, the administrator assigns the script to an emergency flow identifier for the nursing home. This identifier is programmed into the smartwatches and other nursing home devices. Finally, the administrator activates the server software that runs the emergency response server application.

A week later, John is getting out of bed when he falls and breaks his hip. John immediately presses a panic button on his smartwatch, which sends an emergency alert (which contains the emergency flow identifier) over the Wi-Fi network to the emergency response server application. The server application detects the emergency alert, extracts the emergency flow identifier, and queries the identifier against a database storing emergency flow scripts and corresponding emergency flow identifiers to identify the emergency flow script to execute in response to this emergency alert. The server application then executes the emergency flow script setup by the administrator a week earlier. The script executes instructions of the initial emergency flow building block to determine the source of the emergency alert. Upon identifying the smartwatch as the source of the emergency alert, the initial building block then branches off to a smartwatch downstream emergency flow. This downstream emergency flow has a series of building blocks forming a parallel flow for obtaining location and sensor data from the smartwatch (this custom flow takes advantage of the enhanced sensor functionality of smartwatches) by transmitting data requests to the smartwatch over the Wi-Fi network. A second parallel data flow is activated as part of this script that determines whether the emergency alert pertains to a personal or environmental emergency. In this case, the emergency alert is sent when John pressed a panic button for a personal medical emergency. Accordingly, an initial building block of the second parallel data flow determines based on the emergency alert that this is a personal emergency. However, this second parallel data flow includes a building block for assessing sensor data throughout the nursing home to determine the possibility of an environmental emergency. In this case, the building block queries thermometers and smoke/$CO_2$/CO detectors located throughout the nursing home that communicate with the server over the Wi-Fi network. The sensor data from these thermometers and detectors indicates no abnormal readings. This result causes the second parallel data flow to terminate since there is no need to provide environmental sensor data associated with the emergency request when there is no indication of an environmental emergency. In parallel, the main emergency flow calls a smartphone belonging to John and bridges the call with an operator for the nursing home. Although the smartphone is out of John's reach, it is paired with John's smartwatch via Bluetooth. John is able to answer the call by pressing a button on his smartwatch. The operator asks John the nature of his medical emergency, and John indicates that he has fallen and cannot get up. The emergency flow script provides an interactive element that bridges the communication session with a local public safety answering point when the operator interacts with the interactive element. In this case, the operator realizes that John needs urgent medical attention and presses the interactive element. This activates a building block in the emergency flow script that calls the PSAP and bridges the call with the communication session between the nursing home operator and John (e.g., creating a conference call including the PSAP dispatcher, nursing home operator, and John). John is in great pain and is unable to coherently respond to the PSAP dispatcher's questions. Thankfully, the nursing home operator has medical information and sensor data for John and is able to relay this information to the PSAP dispatcher. In addition, the emergency flow script executes a parallel emergency flow that transmits the location data, medical information, and sensor data to the PSAP (since the administrator customized the emergency flow script to take advantage of the fact that this local PSAP is equipped with the technology to receive enhanced data/meta-data). The PSAP dispatcher is able to assign first responders (EMTs from the local hospital) to John's location based on the location data received. In this scenario, the PSAP dispatcher does not have authorization to view John's medical information but has the ability to forward medical and sensor data to the first responders to keep them apprised of John's current medical condition. In the meantime, orderlies working at the nursing home have reached John and kept him stable and still while waiting for the EMTs to arrive.

Finally, the EMTs arrive and transport John to the local hospital for treatment. Upon their arrival, John uses his smartwatch to hang up on the phone call. The nursing home operator and the PSAP dispatcher also terminate their connections to the emergency communication session, thus terminating the session. Meanwhile, the emergency flow script has finished executing and terminates. Fortunately, John makes a full recovery thanks to the prompt emergency response.

Example 2—Social Media Suicide Prevention

Jane, a freshman as a top tier university, is finishing up her first semester. Jane has been struggling to fit in socially on-campus and is experiencing problems with her roommate. Moreover, Jane is double majoring in analytical chemistry and computer science and is feeling overwhelmed by the course load. For the past month, Jane has fallen into a deep depression as finals week approached. She is not alone, and administrators have been cognizant of the rise of mental health problems in the student body. In response, the university has launched a digital campaign to detect and head off mental health crises. The university partnered with a popular social media platform to monitor publicly available user postings for early detection of mental health crises such as suicide attempts. In this case, mental health crises are detected by dynamic web analysis of user postings for all university students using keywords indicative of suicidal thoughts or tendencies. In this case, Jane posts on the social media platform that she is saying farewell to her friends and is ready to end it all tonight. This post is analyzed and leads to detection of a mental health crisis. Next, an emergency alert is sent to an emergency response server along with an emergency flow identifier associated with the emergency flow script for the university's mental health emergency management campaign. The emergency flow identifier is used to determine the customized emergency flow script comprising various building blocks for managing emergency communications between all entities in this particular emergency flow. In this case, the emergency flow script is executed by the emergency response server. A first building block attempts to locate contact information for Jane associated with the mental health crisis by querying the university server database storing student information. The first building block retrieves a cell phone number, which is passed onto a second building block that calls the number. Jane does not pick up. The second building block passes on the "no pickup" output to a third building block that attempts to locate Jane's roommate Mary who does pick up her phone. Upon successfully reaching Mary, a fourth building block initiates a call to a university dispatcher and bridges the calls with Mary and the dispatcher to enable two-way communications. A fifth building block running parallel to the fourth building block provides the emergency alert to the dispatcher via a data connection to the dispatcher's computer console. The dispatcher than speaks with Mary to explain the situation and asks for Jane's whereabouts. Mary has not seen Jane all night. Fortunately, another parallel building block is attempting to locate Jane's whereabouts by searching university Wi-Fi routers to determine if any Jane's cell phone is connected to any of those routers. This building block successfully identifies two routers in the basement of the library as having detected Jane's cell phone Wi-Fi signal in the past 20 minutes and provides this output to the dispatcher. The university dispatcher then connects to campus security and requests a guard to be sent to investigate. Upon connection to the campus security, another building block is activated that transfers all collected information pertaining to this emergency to a cell phone of the security guard (which is running a mobile application in communication with the emergency response server). The guard is able to enter the router location information into a campus map application on his phone and soon finds Jane sleeping on the couch in the library basement. The guard wakes up Jane and assesses her condition. She insists she is okay but agrees to meet with the school counselor for a mental health checkup.

Example 3—Emergency Calling Using On-Board Console in a Smart Vehicle

Lisa, while driving home during a snowstorm, gets hit from behind by a truck. Lisa is badly injured and is not able to move her hands to make a call for emergency help. Lisa is in a smart car with an intelligent on-board console capable of receiving voice command and making cellular calls. Lisa does not remember the trigger words, but says "Please call emergency . . . Hmmm . . . Please help . . . ". Because Lisa's voice instructions were not clear and her voice was low, the console prompts Lisa to confirm that she would like to make an emergency call, but she has become unresponsive.

Fortunately, the event data recorder in the smart vehicle has been activated due to the crash. The event data recorder system in the on-board console includes four components: various sensors (camera, RADARs and LIDARs), the SDM (which includes the event data recorder), the DCIM and the cellular antenna. When Lisa's car got hit, the air bags deploy, and the sensors are activated. The sensors transmit the data to the SDM, which measures the severity of the accident using an accelerometer. The SDM's assessment is sent to the DCIM, which uses the cellular antenna to send an alert (attaching Lisa's voice command and the assessment of the severity of the accident) to a private call center.

When a customer service representative at the call center receives the call, she uses the built-in GPS to find the vehicle's location (or get a location through the cellular network) and calls the car to check-in with Lisa. Since Lisa is unresponsive and reviewing the severity of the accident, the representative calls 9-1-1 makes a proxy call on behalf of Lisa using the Lisa's location. Fortunately, paramedics are sent to the scene immediately and Lisa is taken to the hospital for treating her injuries.

Example 4—PSAP Trigger Example

Just In Time, an emergency response company, aids emergency service providers (such as public safety answering points, or "PSAPs") by gathering emergency data from a variety of sources and delivering the data to the emergency service providers. Traditionally, PSAPs are only technologically capable of receiving telephone calls (e.g., 9-1-1 emergency calls) with no additional data. Thus, when an emergency call is made to a PSAP from a mobile phone (with a dynamic and uncertain location), PSAP operators or call-takers must speak directly to the caller to determine the caller's location and the nature of the caller's emergency. Unfortunately, many people involved in emergency situations are unable to articulate their location or may not even know—and even if they do, the time spent articulating their location to the PSAP operator can often be the difference between life and death. Similarly, PSAP operators are forced to respond to emergencies with little or no information about the persons involved (e.g., health data or medical histories) or context of the emergencies (e.g., type of emergency, audio/video of the surroundings, etc.). Just In Time knows just how critical it is to quickly and accurately provide locations and situational/contextual information during emergencies to emergency service providers.

To aid emergency service providers (hereinafter, "ESPs"), Just In Time maintains and provides an emergency management system (hereinafter, "EMS") that receives and stores data, information, and multimedia from a plurality of sources, such as mobile phones and mobile applications, internet of things (IoT) devices, intelligent vehicle systems, and other electronic devices before and during emergencies. In many places around the world, when a person experiences an emergency they can call an emergency number (e.g., an emergency call) to be connected to an emergency service provider. For example, in the United States, a person can call 9-1-1 to be connected to a PSAP. In many cases, when an emergency service provider receives an emergency call, the emergency service provider also receives a phone number from which the emergency call was placed. The emergency service provider can then send a query including the phone number to the EMS for emergency information, which can then search its databases for emergency data or information associated with the phone number.

Elise, a thirtysomething professional living in San Francisco has two elderly grandparents that live alone in Oakland. Concerned about them, she accesses Just In Time's registration website and signs up for a notification procedure for her grandparents. She submits both of her grandparents' cell phone numbers as well as their home phone number (a landline) as user identifiers to be associated with the notification procedure. Elise then submits herself and both of her parents (along with their cell phone numbers) as emergency contacts. As part of the registration process, the EMS sends an SMS text message to Elise, her parents, and her grandparents' cell phones to confirm the registration. All of them respond to the text message in the affirmative. Additionally, the EMS delivers an interactive call to Elise's grandparents' home phone number that verbally requests verbal confirmation, which her grandparents provide, thus completing the registration process.

A week later, Elise's grandfather forgets to turn off the stove after preparing his breakfast and a fire ignites in the kitchen. In response, Elise's grandmother calls 9-1-1 from their landline home phone and is connected to a local PSAP. After receiving the emergency call, the PSAP sends a query including the home phone number to the EMS for emergency information. In response to receiving the query including the home phone number, the EMS checks if the home phone number has been associated with a notification procedure. The EMS determines that the home phone number has indeed been associated with the notification procedure that Elise registered for and, accordingly, executes the notification procedure by sending an SMS text message to Elise and her parents that an emergency call has been made from Elise's grandparents' home phone. Elise's mother is then able to drive to the grandparents' house immediately and check on her parents.

What is claimed is:

1. A method for notifying one or more recipients of an emergency by an emergency management system (EMS), the method comprising:

a) receiving an electronic communication from an emergency service provider (ESP), wherein the electronic communication comprises an indication of an emergency alert received by the ESP and comprises a user identifier;
b) gathering a set of emergency data associated with the emergency alert, wherein the set of emergency data comprises the user identifier;
c) determining, using the set of emergency data, an appropriate notification procedure to be executed; and
d) executing the notification procedure to initiate communication with the one or more recipients.

2. The method of claim 1, wherein the notification procedure defines a pathway of execution based at least in part upon input received from the one or more recipients.

3. The method of claim 1, wherein the one or more recipients are specified by the notification procedure.

4. The method of claim 1, further comprising:
a) receiving a definition of the notification procedure through a graphical user interface of an emergency response application provided by the EMS, wherein the notification procedure defines the one or more recipients and an order of contacting the one or more recipients;
b) associating the notification procedure with the user identifier; and
c) storing the notification procedure in a notification procedure database.

5. The method of claim 1, wherein the appropriate notification procedure is determined using at least one of the user identifier, a location associated with the emergency alert, or an emergency type associated with the emergency alert comprised within the set of emergency data associated with the emergency alert.

6. The method of claim 1, wherein determining the appropriate notification procedure using the set of emergency data comprises identifying the notification procedure as associated with the user identifier from a notification procedure database.

7. The method of claim 6:
a) wherein the set of emergency data further comprises an emergency type associated with the emergency alert; and
b) wherein executing the notification procedure comprises:
i) identifying a set of emergency types required for notification procedure to be executed;
ii) determining that the emergency type associated with the emergency alert is included within the set of emergency types; and
iii) executing the notification procedure in response to determining that the emergency type associated with the emergency alert is included in the set of emergency types.

8. The method of claim 1:
a) wherein the set of emergency data comprises a location; and
b) wherein determining the appropriate notification procedure using the set of emergency data comprises:
i) accessing a set of geofences associated with a plurality of third-party accounts;
ii) determining that the location is within a geofence associated with a first third-party account; and
iii) identifying a notification procedure associated with the first third-party account.

9. The method of claim 8:
a) wherein the set of emergency data further comprises an emergency type; and
b) wherein executing the notification procedure comprises:
i) identifying a set of emergency types selected for the first third-party account;
ii) determining that the emergency type is included in the set of emergency types selected for the first third-party account; and
iii) executing the notification procedure in response to determining that the emergency type is included in the set of emergency types selected for the first third-party account.

10. The method of claim 1, wherein executing the notification procedure comprises obtaining a location associated with the user identifier and sharing the location with the one or more recipients according to the notification procedure.

11. The method of claim 10, wherein the location associated with the user identifier is a device-based hybrid location generated by an electronic device associated with the user.

12. The method of claim 1, wherein the electronic communication is received through an application programming interface (API).

13. The method of claim 1, wherein the ESP is a public safety answering point (PSAP) and wherein the emergency alert is an emergency call received by the PSAP.

14. An emergency management system (EMS) comprising a processor and non-transitory computer readable storage medium including instructions executable by the processor to create a program comprising:
a) a software module receiving an electronic communication from an emergency service provider (ESP), wherein the electronic communication comprises an indication of an emergency alert received by the ESP and comprises a user identifier;
b) a software module gathering a set of emergency data associated with the emergency alert, wherein the set of emergency data comprises the user identifier;
c) a software module determining, using the set of emergency data, an appropriate notification procedure to be executed; and
d) a software module executing the notification procedure to initiate communication with the one or more recipients.

15. The system of claim 14, wherein the notification procedure defines a pathway of execution based at least in part upon input received from the one or more recipients.

16. The system of claim 14, wherein the program further comprises:
a) a software module receiving a definition of the notification procedure through a graphical user interface of an emergency response application provided by the EMS, wherein the notification procedure defines the one or more recipients and an order of contacting the one or more recipients;
b) a software module associating the notification procedure with the user identifier; and
c) a software module storing the notification procedure in a notification procedure database.

17. The system of claim 14, wherein the appropriate notification procedure is determined using at least one of the user identifier, a location associated with the emergency alert, or an emergency type associated with the emergency alert comprised within the set of emergency data associated with the emergency alert.

18. The system of claim 14, wherein determining the appropriate notification procedure using the set of emergency data comprises identifying the notification procedure as associated with the user identifier from a notification procedure database.

19. The system of claim 18:
a) wherein the set of emergency data further comprises an emergency type associated with the emergency alert; and
b) wherein executing the notification procedure comprises:
   i) identifying a set of emergency types required for notification procedure to be executed;
   ii) determining that the emergency type associated with the emergency alert is included within the set of emergency types; and
   iii) executing the notification procedure in response to determining that the emergency type associated with the emergency alert is included in the set of emergency types.

20. The system of claim 14:
a) wherein the set of emergency data comprises a location; and
b) wherein determining the appropriate notification procedure using the set of emergency data comprises:
   i) accessing a set of geofences associated with a plurality of third-party accounts;
   ii) determining that the location is within a geofence associated with a first third-party account; and
   iii) identifying a notification procedure associated with the first third-party account.

* * * * *